United States Patent
Irino et al.

(10) Patent No.: US 6,675,140 B1
(45) Date of Patent: Jan. 6, 2004

(54) MELLIN-TRANSFORM INFORMATION EXTRACTOR FOR VIBRATION SOURCES

(75) Inventors: Toshio Irino, Kyoto (JP); Roy D. Patterson, Great Shelford (GB)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/493,661

(22) Filed: Jan. 28, 2000

(30) Foreign Application Priority Data

Jan. 28, 1999 (JP) .......................................... 11-020137

(51) Int. Cl.[7] .............................................. G10L 21/00
(52) U.S. Cl. ...................... 704/203; 704/206; 704/211; 382/100
(58) Field of Search ................................ 704/203, 206, 704/211, 216, 219; 381/320; 382/100, 190

(56) References Cited

U.S. PATENT DOCUMENTS

| | | | |
|---|---|---|---|
| 4,762,132 A | 8/1988 | Nicolas et al. ............... | 128/660 |
| 5,422,977 A | 6/1995 | Patterson et al. ........... | 704/500 |
| 6,178,261 B1 * | 1/2001 | Williams et al. ............ | 382/190 |
| 6,408,082 B1 * | 6/2002 | Rhoads et al. .............. | 382/100 |
| 6,424,725 B1 * | 7/2002 | Rhoads et al. .............. | 382/100 |
| 6,535,617 B1 * | 3/2003 | Hannigan et al. ........... | 382/100 |

FOREIGN PATENT DOCUMENTS

| | | |
|---|---|---|
| EP | 0 473 664 | 3/1992 |
| JP | 11-24696 | 1/1999 |
| JP | 11-119797 | 4/1999 |

OTHER PUBLICATIONS

Nelson, D (ICASSP), IEEE, 1995, pp. 1101–1104 XP002061433.
Sheng, Y Optical LEngineering, US, Soc. of Photo–Optical pp. 494–500 XP000039296.
Yunlong Sheng, et al: Journal of Optics, Fr, Masson Editeur. Paris, pp. 223–228 XP000249346.
Irino, T. IEEE Trans, Signal Proc., vol. 41, No. 12 pp. 3549–3554 XP002136102.
"A Mathematical Framework for Auditory Processing: A Mellin Transform of a Stabilized Wavelet Transform?", by Irino et al., ATR Technical Report, Jan. 29, 1999.
"Mathematical Formula", Iwanami Shoten.
"Onsei (voice)".
"Introduction to the Theory of Fourier Integrals", by E.C. Titchmarch, pp. 7–9. 46–47.
"Frequency–Warping and Speaker–Normalization", by Umesh et al., pp. 983–986.
"The Fourier–Mellin Transform and Mammalian Hearing", by Altes, J. Acoust. Soc. Am., vol. 63, No. 1, Jan. 1978, pp. 174–183.
"A Novel Robust Feature of Speech Signal Based on the Mellin Transform for Speaker–Independent Speech Recognition", by Chen et al., IEEE ICASSP '98, pp. 629–632.
"Wavelets: Time–Frequency Methods and Phase Space", Proceedings of the International Conference, Marseille, France, Dec. 14–18, 1987, pp. 1–21.
"A Time–Domain, Level–Dependent Auditory Filter: The Gammachirp", by Irino, J. Acoust. Soc. Am., vol. 101, No. 1, Jan. 1997, pp. 412–419.
"Temporary Asymmetry in the Auditory System", by Irino, J. Acoust. Soc. Am., vol. 99, No. 4, Apr. 1996, pp. 2316–2331.

(List continued on next page.)

Primary Examiner—Susan McFadden
(74) Attorney, Agent, or Firm—McDermott, Will & Emery

(57) ABSTRACT

The signal processing method includes the steps of: wavelet-transforming an input signal in a computer; and extracting features of the signal by Mellin-transforming the output of the wavelet transform step in synchrony with the input signal in a computer.

20 Claims, 30 Drawing Sheets

OTHER PUBLICATIONS

"Improved Scale–Cepstral Analysis in Speech", by Umesh et al., ICASSP International Conference on Acoustics, Speech and Signal Processing, May 12–15, 1998.

"Modeling Temporal Asymmetry in the Auditory System", by Patterson, J. Acoust. Soc. Am., vol. 104, No. 5, Nov. 1998, pp. 2967–2979.

"Pitch Determination of Speech Signals: Algorithms and Devices", by Hess, pp. 471–482.

"Time–Domain Modeling of Peripheral Auditory Processing: A Modular Architecture and a Software Platform", by Patterson et al., J. Acoust. Soc. Am., vol. 98, No. 4, Oct. 1995, pp. 1890–1894.

"The Scale Representation", by Cohen, IEEE Transaction on Signal Processing, vol. 41, No. 12, Dec. 1993, pp. 3275–3293.

"An Optimal Auditory Filter", by Toshio, 1995 IEEE ASSP Workshop on Applications of Signal Processing to Audio and Acoustics, Oct. 15–18, 1995.

"A 'Gammachirp' Function as an Optimal Auditory Filter with the Mellin Transform", by Irino, IEE ICASSP96, May 7–10, 1996, pp. 981–984.

"Theory of Communication", By Gabor et al., J. of the IEE, vol. 93, pp. 429–457.

"Dimensional Differences in the Vocal Tract Shapes Measured from MR Images Across Boy, Female and Male Subjects", by Yang et al., J. Acoust. Soc. Jpn. (E), vol. 16, No. 1, 1995, pp. 41–44.

* cited by examiner

MELLIN-TRANSFORM INFORMATION EXTRACTOR FOR VIBRATION SOURCES

TITLE OF THE INVENTION

A Mellin-Transform Information Extractor for Vibration Sources.

BACKGROUND OF THE INVENTION

This application is based on the inventors' work, "A Mathematical Framework for Auditory Processing: A Mellin Transform of a Stabilized Wavelet Transform?" (Irino et al., ATR Technical Report, Jan. 29, 1999), the description of which is incorporated herein by reference in its entirety.

1. Field of the Invention

The present invention relates to an improvement of time sequential data analysis which has been conventionally conducted by the Fourier transform or statistical approach such as a self regression model. The present invention is applicable to tone recognition, individual recognition by voice, speech recognition, analysis of architectural acousticity as well as signal analysis, encoding, signal separation and signal enhancement processes of voice or music, for example. Besides acoustic signals and the like, the present invention is widely applicable to analysis of mechanical vibration such as mechanical sound and seismic waves, analysis of biotic signals such as brain waves, cardiac pulse sounds, ultrasonic echoes and nerve cell signals as well as analysis of signals from sensors for collecting general time sequential data.

2. Description of the Background Art

Conventionally, the fundamental step in information processing was to find the spectrogram, that is, a "time-frequency representation" of the signal. What is obtained using a fast digital transform (for example, a fast Fourier transform) or using linear predictive analysis, is always a vector which directly corresponds to a spectrum of a frequency representation at a certain time point, and a time sequence of such vectors constitutes a representation corresponding to a spectrogram. Such a representation derives from the spectral representation of signals originated from the Fourier transform. The sound spectrogram is the most popular representation for features of a voice signal, for example. The sound spectrogram is a visual representation of time change in the voice spectrum using a density representation, level contour representation or color representation for easier understanding.

Because this spectral representation is a better representation for signal features than the waveform, because the human auditory system is not very sensitive to relative phase relationships between signals consisting solely of a plurality of sine waves and because a method of efficient calculation of such relations has been established, the spectral representation was thought to be the most suitable for information processing of voice and the like, and therefore the spectral representation has come to be widely used.

Conventionally, the performance of various signal processing systems has been improved to the extreme by applying the spectral representation described above to almost anything. It seems, however, that the improvement in performance by this approach has almost reached the limit. In the field of speech recognition apparatus, for example, it is generally necessary to train the system on a number of human speakers in advance. However, even speech recognition apparatus which has already gone through the learning process with a large number of adult male and female speakers would not recognize the voice of a child. The basic reason for this is that vocal tracts, vocal cords and the like of an adult and a child are different in physical size, and therefore spectral structures and the pitch of the speech are different, and as a result, feature vectors extracted from the respective speakers are different.

As a solution of this problem, the speech recognition apparatus may be trained with the speech of a large number of children, or speech recognition apparatus designed especially for children may be prepared together with the apparatus for discriminating an adult from a child. At present, however, large scale data bases of children's speech are not available, and hence such speech recognition apparatus for children only cannot readily be constructed. Further, even if such a large scale data base of children's speech is built up taking much time and labor, the above described solution could not be very efficient.

In order to solve this problem, a representation is indispensable which is capable of automatically normalizing the physical size of a vocal tract or vocal cord, which is difficult using a spectrogram. Though an example of speech recognition only has been described, there are various and many situations which require acoustic feature extraction which is invariant regardless of the physical size of a sound source, for example, analysis of sounds from musical instruments and analysis of combustion engine sound. The solution to the problem is necessary in wide and various fields including analysis of not only acoustic signals but also mechanical vibration such as mechanical sounds and seismic waves, analysis of biotic signals such as brain waves, cardiac pulse sounds, ultrasonic echoes and nerve cell signals and analysis of signals from sensors for collecting general time sequential data.

SUMMARY OF THE INVENTION

Therefore, an object of the present invention is to provide a method of signal processing which can overcome the essential limit imposed by spectral representation described with reference to the examples above using a representation not dependent on physical size of the signal source, as well as to provide an apparatus utilizing the method.

Another object of the present invention is to provide a method of signal processing capable of extracting a signal feature invariant regardless of the physical size of the signal source using a representation not dependent on the physical size of the signal source, as well as to provide an apparatus using the method.

A still further object of the present invention is to provide a method of signal processing capable of extracting a signal feature invariant regardless of the physical size of a signal source using a representation of which shape is invariant regardless of expansion or reduction along a time axis of a signal waveform, as well as to provide an apparatus utilizing the method.

An additional object of the present invention is to provide a method of signal processing capable of extracting a signal feature invariant regardless of physical size of a signal source by obtaining and utilizing a representation of which shape is invariant regardless of expansion or reduction along a time axis of a signal waveform, using the Mellin transform, and to provide an apparatus utilizing the method.

A still further object of the present invention is to provide a method of signal processing capable of extracting a signal feature invariant regardless of physical size of a signal source by obtaining and utilizing a time expression of which shape is invariant regardless of expansion or reduction along a time axis of a signal waveform using the Mellin transform, overcoming the "shift varying" characteristic of the Mellin transform, as well as to provide an apparatus utilizing the method.

The method of signal processing in accordance with an aspect of the present invention includes the steps of: wavelet-transforming an input signal in a computer; and extracting features of the signal by performing a Mellin transform to the output of the wavelet transform step in synchrony with the input signal in a computer.

As the output of the wavelet transform step is synchronized with the input signal, a start point for the Mellin transform analysis is determined, and hence the Mellin transform of the input signal becomes possible despite the shift varying nature of the Mellin transform. The Mellin transform is characterized by the fact that the magnitude distribution of the output thereof is unchanged regardless of expansion or reduction of a signal waveform on the time axis. Therefore, the Mellin transform used in signal processing enables extraction of a feature invariant regardless of the physical size of the signal source from the signal.

Preferably, the feature extraction step includes the steps of: transforming a representation corresponding the running spectrum obtained from the wavelet transform step to a time-interval/logarithmic-frequency representation by stabilizing the representation in time with signal synchronization while maintaining the fine structure of the response waveform; and performing a process corresponding to the Mellin transform on the time-interval/logarithmic-frequency representation along a line on which a product or ratio between the time interval and the frequency is constant.

As the process corresponding to the Mellin transform is performed along a line on which the product or ratio between the time interval and the frequency is constant, a Mellin image is obtained which is a representation invariant regardless of expansion or reduction of periodicity and the physical size of the sound source. The sound source image can be represented by the Mellin image.

According to another aspect, the signal processing apparatus of the present invention includes a wavelet transform unit for wavelet transform of an input signal which has been transformed to a predetermined format allowing processing by a computer; and a feature extraction unit for extracting a signal feature by Mellin-transforming the output of the wavelet transform unit in synchronization with the input signal.

As the output of the wavelet transform unit is synchronized with the input signal, an origin for the Mellin transform analysis is determined, and hence the Mellin transform of the input signal becomes possible regardless of the shift varying nature of the Mellin transform. The Mellin transform has a property that the magnitude distribution of its output is invariant regardless of expansion or reduction of the signal waveform on the time axis. Therefore, use of Mellin transform in signal processing enables extraction of features which are invariant regardless of the physical size of the signal's source.

Preferably, the feature extraction unit includes a unit for transforming a representation corresponding to a running spectrum obtained by the wavelet transform unit to a time-interval/logarithmic-frequency representation that is stabilized in time in synchrony with the signal while maintaining the fine structure of the response waveform, and a unit for performing a process corresponding to the Mellin transform on the time-interval/logarithmic-frequency representation along a line on which the product or ratio between the time interval and the frequency is constant.

As a process corresponding to Mellin transform is performed along the line on which the product or ratio between the time interval and the frequency is constant, a Mellin image is obtained which is a representation invariant regardless of expansion or reduction of the physical size and periodicity of the sound source. Sound source information can be represented by the Mellin image.

According to a still further aspect, the signal processing apparatus in accordance with the present invention includes: a wavelet filter bank including a plurality of wavelet filters performing transform by wavelets having the same wavelet kernel function and frequencies different from each other, each connected to receive an input signal; an auditory figure extracting unit connected to receive an output of the wavelet filter bank for extracting an auditory figure from the output of the wavelet filter bank; a size-shape image generating unit for generating a size-shape image of an input signal from the auditory figure extracted by the auditory figure extracting unit; and a feature extracting unit for extracting features of the input signal from the size-shape image.

The auditory figure is a time-stabilized output of the wavelet filter bank, and as the size-shape image is generated therefrom, subsequent Mellin transform is facilitated. As Mellin transform enables generation of a representation not dependent on the physical size or periodicity of the signal's source, and therefore the signal from the signal's source can be analyzed based on a feature not dependent on the the physical size or periodicity of the signal's source.

Preferably, the feature extracting unit includes a Mellin-image generating unit for generating the Mellin image by performing the Fourier transform on the size-shape image along an impulse response line of each wavelet filter.

As the process corresponding to the Fourier transform is performed along the impulse response line, a Mellin image which is a representation invariant regardless of expansion or reduction of the physical size or periodicity of the sound source can be obtained. The sound source information can be represented by the Mellin image.

Preferably, the auditory figure extracting unit includes: a strobed temporal integrating unit for performing strobed temporal integration of the output of each channel of the wavelet filter bank to generate a stabilized auditory image, by detecting periodicity included in the output of the wavelet filter bank; and a stabilized auditory image extracting unit for extracting, as the auditory figure, one period of a prescribed order of the stabilized auditory image obtained by strobed temporal integration, based on the periodicity detected by the strobed temporal integrating unit.

As the output of the wavelet filter bank does not have a fixed starting point, the Mellin transform is not applicable to the output as it is. When a signal having periodicity or quasi-periodicity such as a voiced sound of speech or constant musical sound is input, the output of the wavelet filter bank involves periodicity, and by strobed temporal integration using the periodicity, the output of the wavelet filter bank can be stabilized in time to generate a stabilized auditory image. Once the stabilized auditory image is generated, one period of a prescribed order selected therefrom as needed, whereby a representation invariant regardless of expansion or reduction of the physical size and periodicity of the sound source can be obtained by subsequent Mellin transform.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
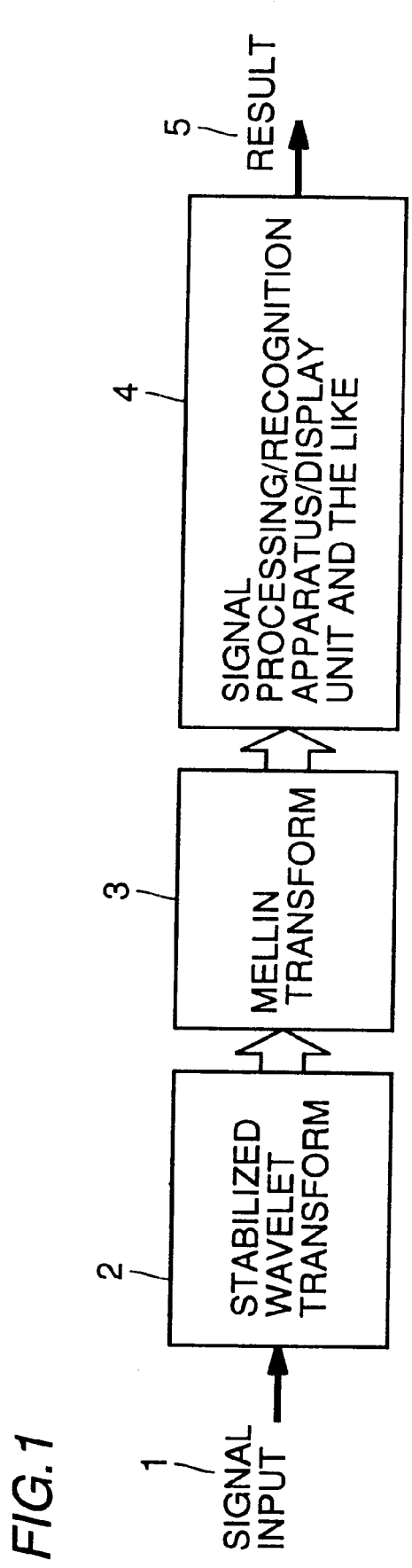
FIG. 1 is a schematic block diagram representing a principle of the present invention.

Basic Matters as a Background of the Embodiments

First, the Mellin transform and acoustic physics will be described so as to clarify the present invention, especially the problems to be solved by the embodiments which will be described later.

1. Mellin Transform

The Mellin transform is a type of integral transformation similar to the Fourier transform, and defined by the equation shown in Appendix A attached at the end of the description of the invention (Moriguchi et al., *Mathematical Formula, Iwanami Shoten*, 1957, Titchmarsh, "Introduction to the Theory of Fourier Integrals," Oxford U.P., London, 2nd ed.). As is represented by the equation (A2) of Appendix A, it is an important feature of the Mellin transform that even when the response of a signal to be analyzed is expanded or reduced in time, the absolute value of the profile obtained by Mellin transform is invariant, although multiplied by a constant in most cases. The present invention realizes appropriate signal processing utilizing this feature of the Mellin transform, which allows speech recognition regardless of difference in spectral structure and difference in pitch periods derived from the difference in size of the vocal tract, for example.

2. Physics of an Acoustic Tube

A solution to the propagating wave of a lossless acoustic tube can be obtained using a plane wave approximation. Analytic solution of the propagating wave for horns with uniform cross section is so popular as to be found in any introductory text book of physics. Even when cross section of the acoustic tube changes, the wave propagating through the acoustic tube can still be solved numerically using an approximation involving a set of micro-cylinders. Solution of a vocal tract by such method of approximation is taught by a text book of a voice generation model (for example, Nakada, ONSEI (voice), Coronasha, revised, 1995).

Consider an impulse response at one end of an acoustic tube when the other end of the acoustic tube is driven by an impulse. The important feature here is the correspondence between the size of the acoustic tube as it expands or contracts and the duration of the impulse response which expands or contracts linearly in time with the size of the acoustic tube.

We hear phonemes produced by men, women and children as approximately the same although the size of the vocal tract varies considerably. Any phonetic textbook describes the shape of the vocal tract in terms of the position of the tongue. They do not mention the scale of the vocal tract. Since the , such shape of the vocal tract is common to men, women and children regardless of the difference in size of the articulation organs. More specifically, when the position of articulation is similar, similar phonemes are produced regardless of the difference in the size of the articulators. In other words, the same phoneme is produced when similar vocal-tract cross-section functions are used, even when the physical size of the vocal tract is different.

If the vocal tract cross section function is physically similar and the total length is different, the impulse response of the vocal tract would be expanded or reduced in time. Therefore, the voice of a child as compared with the voice of an adult corresponds to driving by a voice pulse and acoustic tube in which the impulse response of the vocal tract is reduced on the time axis. This is clearly a description of an ideal case because it ignores individual differences. The reduction on the time axis of the impulse response described above, however, is a good, first order approximation of a child's voice based on physical consideration. Such analogy is justifiable not only because it is relevant in case of voice but also from observation of events other than voice. For example, a violin, a cello and a base, which are much different in size, produce similar sounds as musical instruments of the same group, or family, and combustion engines having the same shape but different sizes produce similar sounds.

3. The General Problem

If an internal representation which is invariant regardless of the above described expansion or reduction of the vocal tract impulse response on the time axis can be generated directly, it becomes unnecessary to normalize by expansion or reduction calculation utilizing higher order Formant, of which extraction is difficult by spectral analysis. In that case, the same phonemes can always be processed as one same phoneme no matter whether it is produced by an adult or a child. The feature that it is invariant regardless of expansion and reduction of the waveform on the time axis is nothing but the feature of Mellin representation which can be obtained through the Mellin transform described above. It is understood that the Mellin transform and Mellin representation have significance essentially different from the conventional analysis derived from spectral representation in analyzing signals such as voice that is strongly desired at present.

Mellin transform, however, has not been much used practically in the field of signal processing. The reason for this is that the Mellin transform is shift varying, and therefore it is difficult to handle as compared with the Fourier transform whose amplitude is shift invariant, for example, as will be described in the following. As can be seen from equation (A1) of Appendix A, in the Mellin transform, it is necessary that a starting point of integration (in the following, referred to as "origin of analysis") is fixed, and when the origin of analysis moves, the results differ. This is the "shift varying" nature. In the Fourier transform, in contrast, integration may be performed in the range of $(-\infty, \infty)$, and hence there is no problem such as the movement of the scope of integration. This is the "shift invariant" property.

As to the study of the Mellin transform, Umesh proposes transform of frequency axis only, based on the nature of the Mellin transform. (Umesh, Cohen, and Nelson, "Frequency-warping and speaker-normalization," IEEE Int. Conf. Acoust., Speech Signal Processing (ICASSP-97), 1997; Umesh, Cohen, and Nelson, "Improved scale-cepstral analysis in speech," IEEE Int. Conf. Acoust., Speech Signal Processing (ICASSP-98), 1998). Altes proposes combination of the Fourier transform and the Mellin transform (Altes, "The Fourier-Mellin transform and mammalian hearing," J. Acoust. Soc. Am., 63, pp. 174–183, 1978)). Further, application of the Mellin transform to speech recognition is also proposed (Chen, Xu, and Huang, "A novel robust feature of speech signal based on the Mellin transform for speaker-independent speech recognition," ICASSP '98, 1998)).

These studies are all directed to perform the Mellin transform in the direction of the frequency axis using frequency amplitude information, but phase information, that is, time base information, has not been considered. Therefore, these articles are silent about the problem of specifying the origin of analysis in order to overcome the problem of "shift varying". Therefore, a representation which maintains stable fine structure in time for a sound is not sought in these studies. Tonal sound information is revealed by the fine time structure. Therefore, a method which can normalize the physical size of the sound source while maintaining the information is desirable.

In order to overcome the limitations of the signal processing in present speech recognition apparatus and the like, it is necessary to use the Mellin transform, which is superior in connection with the essential features of voice and acoustic vibration, to enable exact calculation for signal processing, while overcoming the defect of "shift varying". An object of the present invention, especially the object of the method and apparatus in accordance with the embodiments described in the following is to find a representation that is stable in time to enable calculation of the Mellin transform and to obtain Mellin representation.

Principle of the Present Invention

In order to clarify the principle of the structure and operation of the embodiments of the present invention, the basic idea of the invention will be described.

1. Outline of the Invention

In order to overcome the defect of the Mellin transform, that is, "shift varying" nature described above, it is necessary to calculate the Mellin transform in a representation that has a stable origin at any time point. Referring to FIG. 1, the general apparatus implementing the solution of the present invention includes a stabilized wavelet processing unit 2 for performing a stabilized wavelet transform, which will be described later, on an input signal 1; a Mellin transform processing unit 3 for performing the Mellin transform on the input signal which has been subjected to stabilized wavelet processing, output from the stabilized wavelet unit 2; and a signal processing unit 4 for performing signal processing such as speech recognition, voice encoding or the like on the output of the Mellin transform unit 3 and providing a result 5. The stabilized wavelet transform performed by the stabilized wavelet unit 2 includes time frequency analysis of the input signal through a wavelet filter bank and determines the origin of analysis. As the origin of analysis is determined by the stabilized wavelet unit 2, it becomes possible to Mellin transform the output of stabilized wavelet unit 2 by the Mellin transform unit 3.

In this apparatus, the input signal 1 is subjected to a stabilized wavelet transform by the stabilized wavelet unit 2, the output therefrom is subjected to the Mellin transform with the origin of analysis determined by the stabilized wavelet unit 2 being used as a starting point of integration, and thus Mellin representation is obtained. The resulting Mellin representation is a feature representation of the voice signal normalized with respect to the size of the sound source and variation in periodicity of the waveform. The representation can also be given as a vector similar to the spectrum or linear prediction coefficients which has been mainly used in the conventional voice analysis. Therefore, the Mellin representation can be applied as an input for any conventional signal processing, and corresponding result 5 can be obtained. In speech recognition apparatus, for example, speech recognition is possible by preparing a large number of feature vectors in Mellin representation and performing matching with an input feature vector in exactly the same manner as in the prior art, and the conventional hardware can be used therefor.

2. Wavelet Transform

Figure 2:
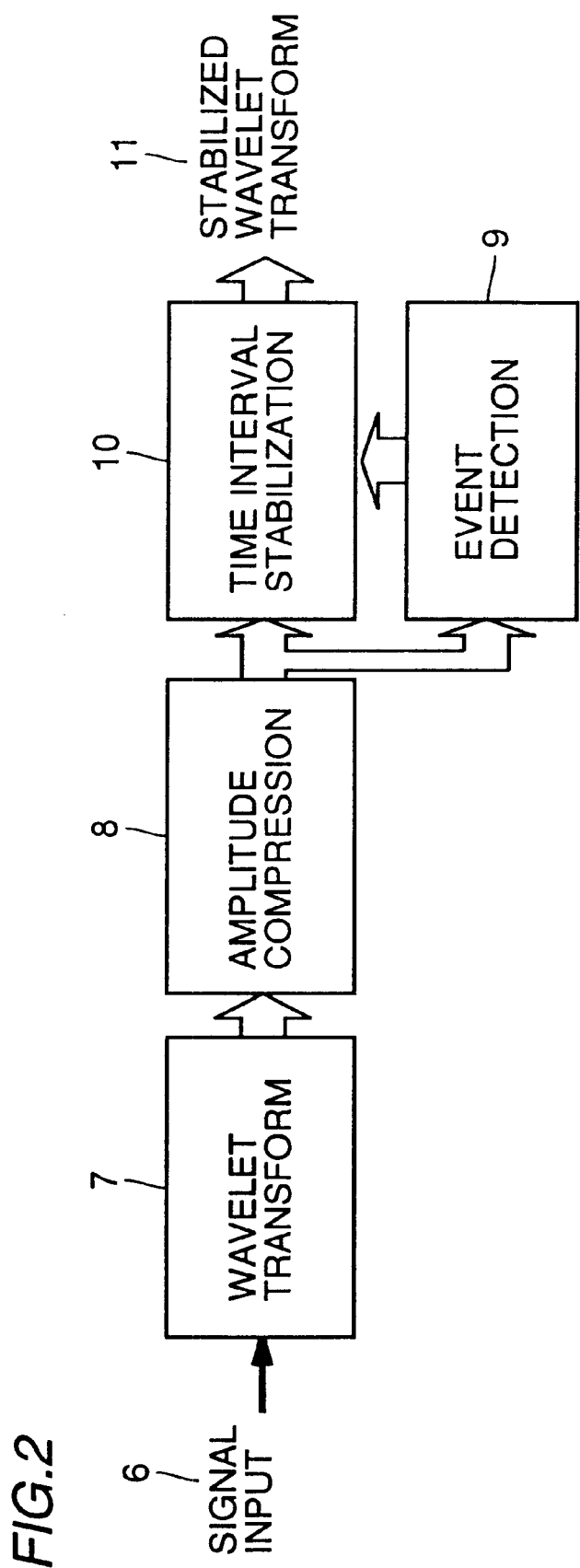
FIG. 2 is a block diagram of a stabilized wavelet unit 2 of FIG. 1.

Referring to FIG. 2, the stabilized wavelet unit 2 for calculating a stabilized wavelet transform in the present invention includes: a wavelet transform unit 7 consisting of a filter bank for performing the wavelet transform on an input signal 6 (which is the same as input signal 1 of FIG. 1, and generally assumed to have periodicity); an amplitude compressing unit 8 for compressing the amplitude of the output from the wavelet transform unit 7 by logarithmic compression or exponential compression; an event detection unit 9 receiving the output of the amplitude compression unit 8, detecting an event representing periodicity and generating a detection output; and a time interval stabilizing unit 10 responsive to the output of event detection unit 9, stabilizing the time interval of the output waveform of the amplitude compression unit 8 to determine the origin of the analysis as described above and providing the result as a stabilized wavelet transform 11.

Equations B1 to B7 of Appendix B at the end of the description of the embodiments are definitions of the wavelet transform performed by the wavelet transform unit 7. In the wavelet transform, in place of a sine wave which is the basis of the Fourier transform, a function determining a small piece of wave referred to as a wavelet kernel (or "mother wavelet") is used. By examining to what extent waveforms (of different frequencies) obtained by expanding or reducing the wavelet kernel on the time axis are included in the waveform to be analyzed, it becomes possible to analyze the object waveform in two dimensions, that is, time and frequency.

In the Fourier transform, a sine wave is used. The sine wave is a periodic function uniformly extending in the range $(-\infty, \infty)$ on the time axis. Therefore, in the Fourier transform, local information regarding the frequencies in a signal cannot be obtained. In contrast, in the wavelet transform, local information as to which wavelet of what frequency is included, and to what extent at what position, can be obtained. Therefore, the wavelet transform allows two dimensional analysis of the input signal, in time and frequency.

In the wavelet transform, it is known that any wavelet kernel may be adopted dependent on the purpose. For example, Daubechie's wavelet, the Mexican hat, the French hat, the Shannon wavelet, the Haar wavelet, the Gabor wavelet and the Meyer wavelet have all been used. Though a specific wavelet is used in the embodiments below, the aforementioned wavelets or various other wavelets not listed here may be used dependent on the application and what is optimal.

The input signal 1 which has periodicity in most cases (equation B1) is subjected to a wavelet transform and analyzed by the wavelet transform unit 7 (Combes et. al (Eds.), "Wavelets", Springer-Verlag, Berlin, 1989). As a wavelet kernel, a gammachirp function (equation B2) which is frequency modulated at a prescribed frequency and has a gamma distribution as an envelope may be selected. The gammachirp function is known to be an optimal function in the sense of minimal uncertainty in the Mellin transform (Irino and Patterson, "A time-domain, level-dependent auditory filter: The gammachirp," J. Acoust. Soc. Am., 101, pp. 412–419, 1997). The wavelet kernel is not limited to the gammachirp function described above, and a waveform determined by a suitable function may be used in accordance with which feature is to be given priority in the analysis, as described above.

By using a set of wavelet filters (equation B3) in which the wavelet kernel is expanded/reduced on the time axis, the filter bank of the wavelet transform unit 7 can be implemented. Here, convolution between the signal and each filter of the filter bank arranged at an equal distance on a logarithmic frequency axis is performed, in constant Q manner in which maximum frequency and bandwidth are in proportion (equation B4).

Even if an external signal is compressed or expanded in time, the wavelet transform does not cause any distortion in the output waveform. The signal output is simply moved to the position of a filter having higher or lower maximum frequency. This is because the wavelet filter itself is the expanded or reduced version of the original wavelet kernel function on the time axis and thus has the same filter shape.

The amplitude value of each filter output thus obtained is subjected to logarithmic compression (equation B5) or exponential compression (equation B6) by the amplitude compression unit 8 of FIG. 2. At this time, both positive and negative portions of the waveform may be left, or half wave rectification may be performed to leave only the positive portion, dependent on the purpose. Subsequent processing when both positive and negative portions are left is basically the same as the process described in the following.

3. Premise of the Mellin transform and the Stabilized Wavelet Transform

As already described, and as can be derived from equation A1, it is necessary to specify the origin of analysis. That is, the transform is shift varying, in that when the origin shifts, the expression changes. The fact that the Mellin transform is shift varying is disadvantageous when compared with the shift invariant Fourier transform. This is the reason why the Mellin transform has not been popular to this point in time. The Mellin transform, however, has attractive properties for speech processing because it is tolerant to variation in the physical size of the source. Therefore, if the origin of the analysis can surely and stably be determined, the disadvantage of the shift varying property of the Mellin transform can be overcome, and the Mellin transform can effectively be used in speech signal processing. The present invention is a solution therefor.

The signal is always flowing in time, and therefore, the "wavelet spectrum" after the wavelet transform corresponds to the "running spectrum." Therefore, the origin of analysis cannot be found solely from the wavelet spectrum. The origin of analysis must be determined by an event detection unit 9. In the following, details of the process performed by the event detection unit 9 will be described.

For periodic (equation B2) and quasi-periodic signals, each wavelet filter output has one maximum per cycle of the wave. The present invention uses the fact that the sound source is represented as a waveform with a maximum fixed value. In the present invention, the periodicity of the filter output is detected by the event detection unit 9 and the Mellin transform is performed using the detected result as the origin, so that the time intervals of the signal from the frequency compression unit 8 is stabilized.

The method of detecting the maximum has been already reported (Irino and Patterson, "Temporal asymmetry in the auditory system, "J. Acoust. Soc. Am., 99, pp. 2316–2331, 1996; Patterson and Irino," Modeling temporal asymmetry in the auditory system," J. Acoust. Soc. Am., 104, pp. 2967–2979, 1998). Further, there have been many reports related to pitch periodicity detection (for example, Hess, "Pitch Determination of Speech Signals," Springer-Verlag, N.Y., 1983).

Figure 10:
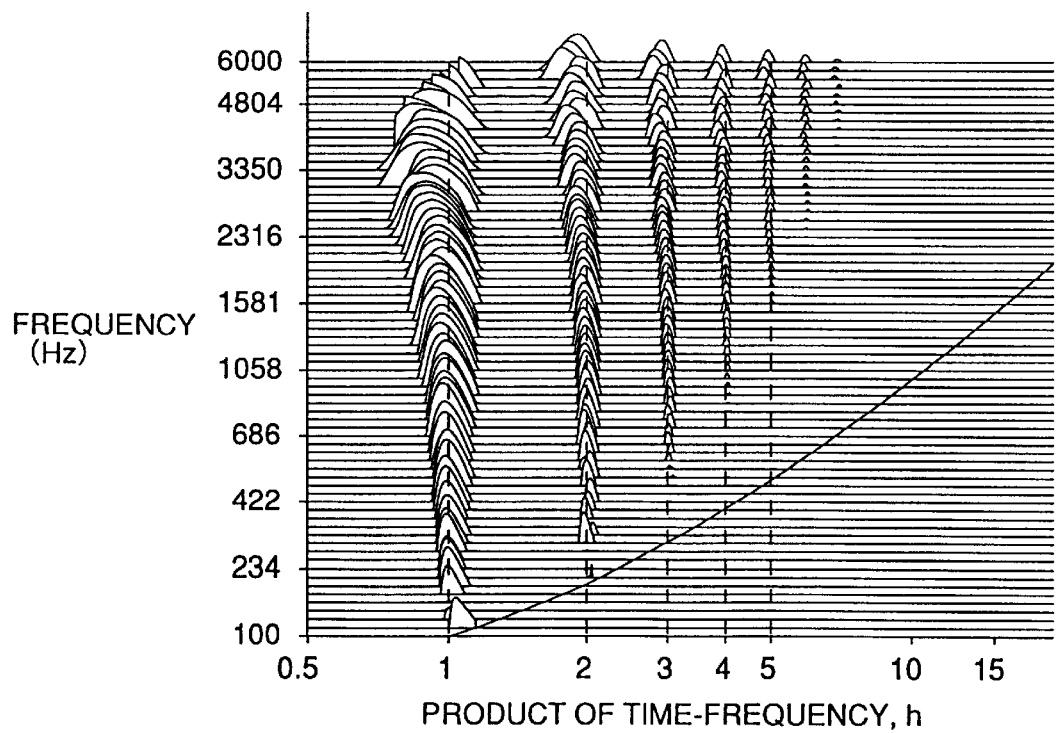
FIG. 10 shows a stabilized auditory image corrected such that impulse responses of wavelet filters are aligned in the longitudinal direction in every channel.

In the present invention, the time point of the maximum in each channel is regarded as the starting point of the temporal integration performed by the time interval stabilizing unit 10 of FIG. 10. In the temporal integration performed by the time interval stabilizing unit 10, each wavelet filter output is copied with a certain starting point to the next starting point being considered as one period, and the copied output is added point by point to an already existing representation of one period of the corresponding channel of an image buffer, whereby a new representation is generated. This operation is referred to as strobed temporal integration (Patterson, Allerhand and Giguere, "Time-domain modelling of peripheral auditory processing: a modular architecture and a software platform", J. Acoust. Soc. Am., 98,1890–1894, 1995; Patterson and Holdsworth, "Apparatus and methods for the generation of stabilized images from waveforms," United Kingdom Patent: 2232801 (1993), U.S. Pat. No. 5,422,977 (1995), European Patent: 0473664 (1995)), and the overall operation up to this point is referred to as the stabilized wavelet transform.

Using the stabilized wavelet transform, the values of respective points constituting the wavelet output of the next period, the wavelet output of the second next period and the wavelet output of still further periods are added to the same section of the image buffer, and therefore signal flow is fixed and a stabilized representation is obtained. In this representation, the time interval from the last peak is used as the abscissa, and therefore the origin is zero.

The stabilized wavelet transform (equation B7) of the periodic signal (equation B2) or quasi-periodic signal contains sound source information in the fine structure, and it is a periodically repeated pattern. Here, the stabilized time-interval pattern of one period obtained by the stabilized wavelet transform will be referred to as the 'sound source information figure (equation B8) or an auditory figure. The sound source information figure is stabilized with the starting point always fixed, and therefore it is possible to calculate the Mellin transform of the figure, avoiding the problem of shift varying. Thus, the, stabilized wavelet transform satisfies the presupposition of the analysis of sound source information by the Mellin transform.

4. Calculation of the Mellin transform

It is known that the Mellin transform can be represented by operators used in quantum mechanics (Cohen, "The scale representation," IEEE Trans. Acoust. Speech and Signal Processing, 1993; Irino, "An optimal auditory filter," IEEE Workshop on Applications of Signal Processing to Audio and Acoustics, 1995; Irino, "A 'gammachirp' function as optimal auditory filter with the Mellin transform," IEEE Int. Conf. Acoust., Speech Signal Processing (ICASSP-96), 1996). In that case, the Mellin transform is in the form of a product of a time operator and a frequency operator suggested by Gabor (Gabor, "Theory of communication," J. IEE (London), 93,42–457,1946). More specifically, the product of time and frequency is an important concept for the Mellin transform. Equations B8 to B12 of Appendix B at the end of the embodiments define the Mellin transform.

In the present invention, in principle, the Mellin transform (equation B10) is performed along a contour on the sound source information figure (equation B9) on which the product of time and frequency is constant, (equation B8). Here, a parameter P of the Mellin transform is a complex number (equation B11), and therefore equation B10 can be rewritten as B12. Thus, as a Mellin transform of the sound source information figure, a two-dimensional representation is obtained in which the abscissa is the product of time interval and frequency and the ordinate is a complex variant of the Mellin transform kernel. This representation will be referred to as a Mellin image.

In this representation, the sound source information is normalized and invariant regardless of expansion or reduction of the physical size, or the periodicity of, the sound source. Therefore, by presenting the normalized sound source information to the signal processing unit 4 in accordance with conventional signal processing methods, superior signal processing is realized.

Figure 3:
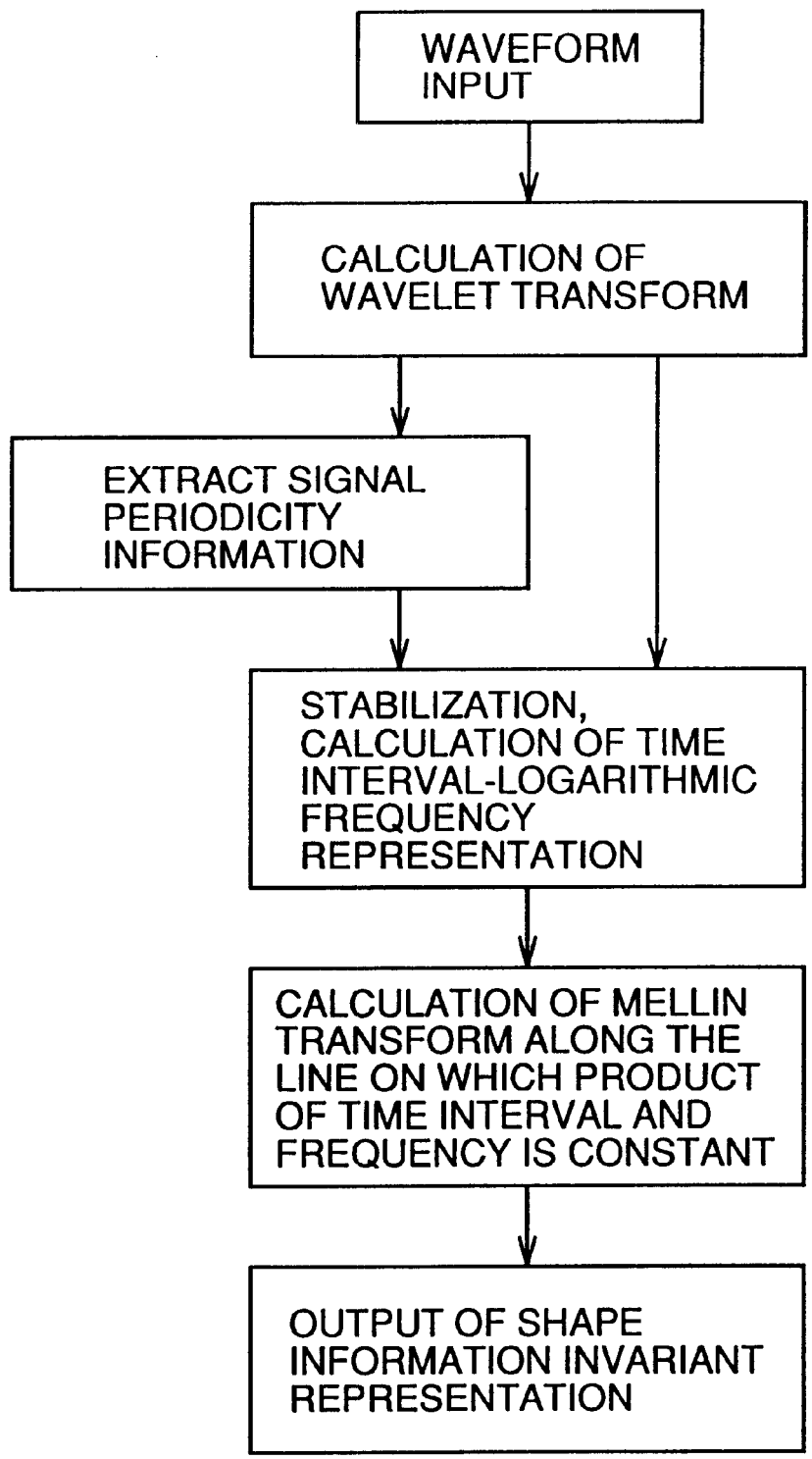
FIG. 3 is a flow chart related to FIGS. 1 and 2.

FIG. 3 is a flow chart showing the process flow. The calculation of the Mellin transform will be described in greater detail with respect to the first embodiment. Referring to FIG. 3, when input is received, it is passed through the filter bank of the wavelet transform, and the wavelet transform calculation takes place.

From the output of the wavelet transform, signal periodicity information is extracted, the output of the wavelet transform is stabilized based on the information, and calculation of the time-interval/log frequency-representation from the last peak is performed, whereby a sound source information figure is obtained.

On the thus obtained sound source information figure, the Mellin transform calculation is performed along the contour on which the product of time interval and frequency is constant. Thus the Mellin image which is a representation invariant regardless of expansion or reduction of the physical size, and periodicity, of the sound source can be obtained.

5. Time Sequence of Mellin Image

In the preceding section, a method of calculating the Mellin image from the stabilized wavelet transform at a certain time point has been described. As the signal changes with time, the corresponding sound source information figure obtained from the stabilized wavelet transform also changes. Therefore, sound source information figures are extracted at a sequence of intervals, and Mellin images are calculated based on the respective figures. From each Mellin image, one feature vector can be extracted. Thus, a representation is obtained in which the Mellin image vectors are aligned, with the abscissa being time and the ordinate being the axis of the Mellin image, just like a spectrogram. Though it is very much different from the spectrogram, the resulting representation is similar in its form, and therefore the resulting representation can be input as it is to signal processing systems which conventionally used the spectrogram. Therefore, such representation can be readily applied to various and wide fields.

Function and Effects

Even when the waveform to be analyzed is expanded or reduced in time dependent on the physical size of the sound source, the magnitude distribution of the Mellin image is invariant. This is not the case with the Fourier spectrum. At the same time, though the representation is different from the Fourier spectrum, the representation provided by the Mellin image vector can explicitly represent differences other than the expansion or reduction of the waveform to be analyzed. In the case of speech, phonemes produced through vocal tracts of different lengths can be handled in the same manner when the Mellin image vector representation is employed. Therefore, using the representation of the Mellin image vector, it becomes possible to enhance the difference in phonemes only.

For example, when the representation by the Mellin image vector is used, a speech recognition apparatus which has been trained on adult data may possibly be used directly for recognizing the speech of children. There are many other problems to which the representation of the Mellin image vector is applicable, and improvement in the performance of speech recognition apparatus and the like is expected. Further, using the representation of the Mellin image vector combined with the conventionalspectral profile, speech signal processing far superior in performance to the prior art can be realized. The object waveform may be any time sequential data, and therefore the method in accordance with the present invention is applicable not only to acoustic signals such as voice or music but also to mechanical vibration, biotic signals and time sequential measurement data.

The basic method of the embodiments of the present invention and the background have been described. In the following, specific embodiments of the present invention will be described in detail.

First Embodiment

Figure 4:
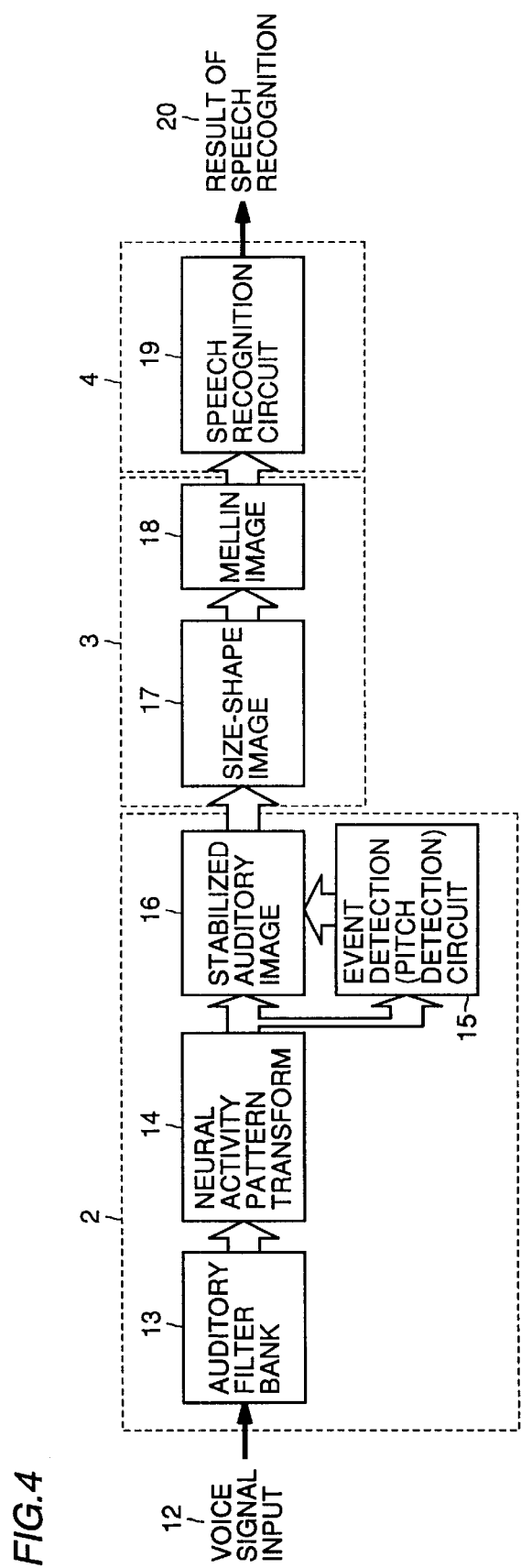
FIG. 4 is a schematic block diagram of a pitch recognizing apparatus in accordance with a first embodiment of the present invention.

Referring to FIG. 4, the speech recognition apparatus in accordance with the first embodiment of the present invention includes, similar to the example of FIG. 1, a stabilized wavelet unit 2, a Mellin transform unit 3 and a signal processing unit 4.

The stabilized wavelct unit 2 includes an auditory filter bank 13 receiving a speech signal 12 as an input, performing the wavelet transform on the speech signal 12 and performing frequency analysis; a neural activity pattern transforming unit 14 for performing a transformation to obtain an output similar to neural activity of auditory nerve; an event detection (pitch detection) circuit 15 for detecting a maximum value in a certain local area for controlling temporal integration; and a stabilized auditory image unit 16 performing the above described temporal integration by taking out the prescribed section from the neural activity pattern unit 14 to generate and output a stabilized auditory image. These components will be described in detail later.

The Mellin transform unit 3 includes a size-shape image unit 17 transforming the stabilized auditory image from the stabilized auditory image unit 16 and outputting a size-shape image as a new representation, and a Mellin image processing unit 18 calculating a Mellin image from the size-shape image produced by the size-shape image unit 17 and outputting the results as a representation based on the Mellin image vector.

The signal processing unit 4 includes a speech recognition circuit 19 for performing speech recognition by comparing and matching the representation based on the Mellin image vector output from the Mellin image unit 18 with a template prepared in advance and outputting the result 20 of the speech recognition.

In the apparatus shown in FIG. 4, the input voice signal 12 is converted to a stabilized auditory image, SAI, by the Mellin transform unit 3. The stabilized auditory image is an auditory version of the representation obtained by the stabilized wavelet transform 2. The stabilized auditory image is converted to a size-shape image 17 by the size-shape image unit 17, and further transformed to a Mellin image 18 by the Mellin image unit 18. This process corresponds to the process performed by the Mellin transform unit 3. Expressions and the like representing the stabilized wavelet-Mellin transform based on the auditory image model, which will be described in the following, are given in Appendix C at the end of the description of the embodiments.

1. Structure of the Stabilized Auditory Image

In this section, the operation of each component of the stabilized wavelet unit 2 will be described. The input voice signal 12 is subjected to frequency analysis by the auditory filter bank 13. In the apparatus of this embodiment, each auditory filter of the auditory filter bank 13 may be approximated by a gammachirp (equation C1) having a carrier in which frequency is modulated by an envelope which is a gamma distribution function. The auditory filter bank 13 is a constant Q type filter bank in which the maximum frequency and bandwidth are in proportion in the region beyond approximately 500 Hz (equation C2). More specifically, the auditory filter bank is an implementation of the wavelet transform (equations C3, C4) with the gammachirp (equation C1) serving as a kernel, and the parameter of the function can be set to imitate a human auditory filter (Irino and Patterson, "A time-domain, level-dependent auditory filter: The gammachirp," J. Acoust. Soc. Am., 101, pp. 412–419, 1997). The auditory filter bank 13 having an array of auditory filters can be provided by an IIR filter (see Japanese Patent Laying-Open Nos. 11–24696 and 11–119797, for example).

The output of the auditory filter bank is converted to a neural activity pattern, NAP, by the neural activity pattern unit 14. More specifically, the output of auditory filter bank 13 is subjected to half wave rectification, so that the amplitude is logarithmically compressed (equation C5) or exponentially compressed (equation C6), and further, by adaptive thresholding, the rising portion of the signal is enhanced, so that an output similar to the neural activity of auditory nerve is obtained.

The event detection (pitch detection) circuit 15 monitors the activity of each channel, detects a maximum value in a certain local area and controls temporal integration. The processing in the event detection (pitch detection) circuit 15 is, for example, as follows. First, activity is smoothed to calculate an envelope. The differential of the obtained envelope is calculated, and a peak time point having the highest activity near a time point at which the value (gradient of the envelope) changes from positive to negative is regarded as a local maximum time point (Irino and Patterson, 1996). The local maximum time point is generated continuously in a signal having periodicity or quasi-periodicity such as voiced speech or the sustained sounds of musical instruments. Using the local maximum time point as a strobe, a prescribed period of the neural activity pattern is extracted and added to the corresponding channel of the buffer of the auditory image 16 with the time points of local maximum values aligned. These operations are repeated for each section, and thus temporal integration is performed. Such integration is referred to as Strobed Temporal Integration, STI.

The STI processing serves to transform the time axis of the neural activity pattern (NAP) into the time interval axis whose origin is the immediately preceding local maximum value (equation C7). When strobed temporal integration is performed on every channel of the auditory filter bank 13, a stabilized auditory image 16 (equation C7) is obtained while preserves the value of the ordinate (logarithmic frequency axis) of the auditory filter bank 13. The stabilized auditory image decays as a unit with a half life of about 30 ms, and therefore the image naturally disappears when the input signal ceases.

By integrating the stabilized auditory image in the direction of time, a spectral profile is obtained. The spectral profile is similar to the spectral vector of the conventional spectrogram, and therefore an auditory spectrogram can be formed, which can be applied to speech recognition (for example, see the article above of Patterson et. al. 1995).

2. Formation of the Size-Shape Image

In this section, details of the process performed by the size-shape image unit 17 will be described. The stabilized auditory image from the stabilized auditory image unit 16 is a representation in which the abscissa is a linear time interval axis and the ordinate is a logarithmic frequency axis. The size-shape image unit 17 produces a size-shape image which is a new representation, by transforming the representation. This is an important step to facilitate the calculation of the Mellin image 18 in the subsequent stage. Details of the size-shape image unit 17 that performs this process are shown in the block diagram of FIG. 5. The process flow is as shown in the flow chart of FIG. 6. In the following description, FIGS. 5 and 6 will be referred to as needed.

Figure 5:
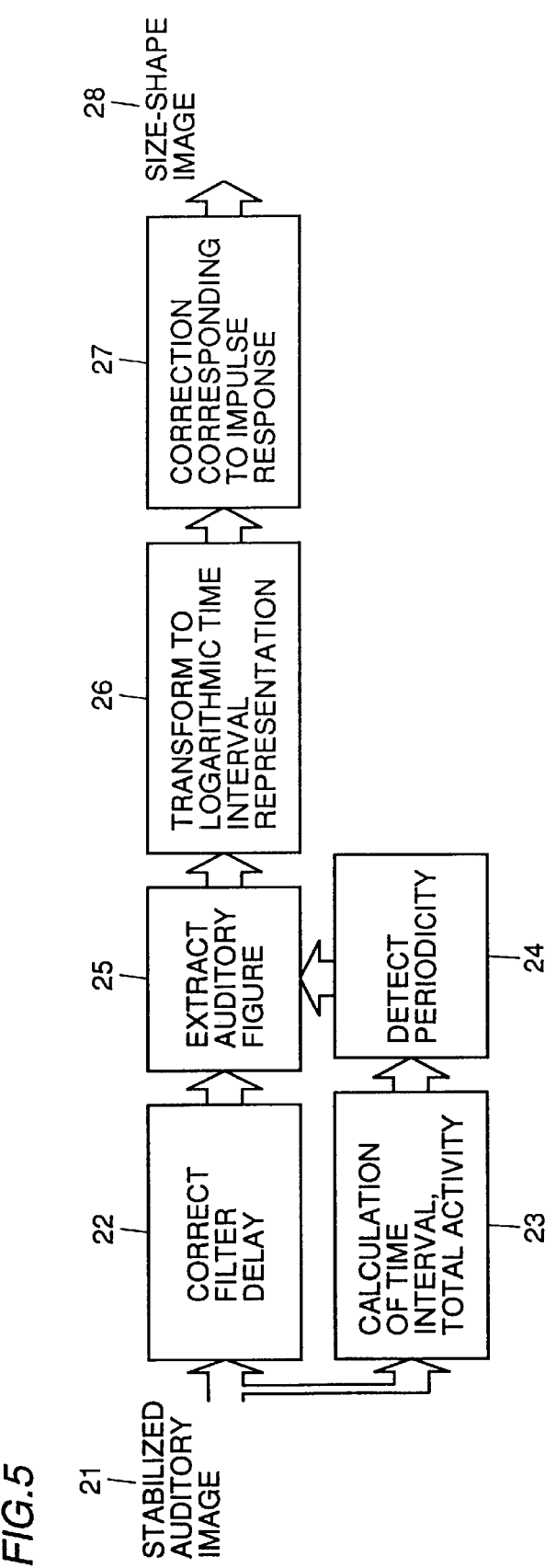
FIG. 5 is a block diagram of an event detection (pitch detection) circuit 15 and a stabilized auditory image unit 16 of FIG. 4.
Figure 6:
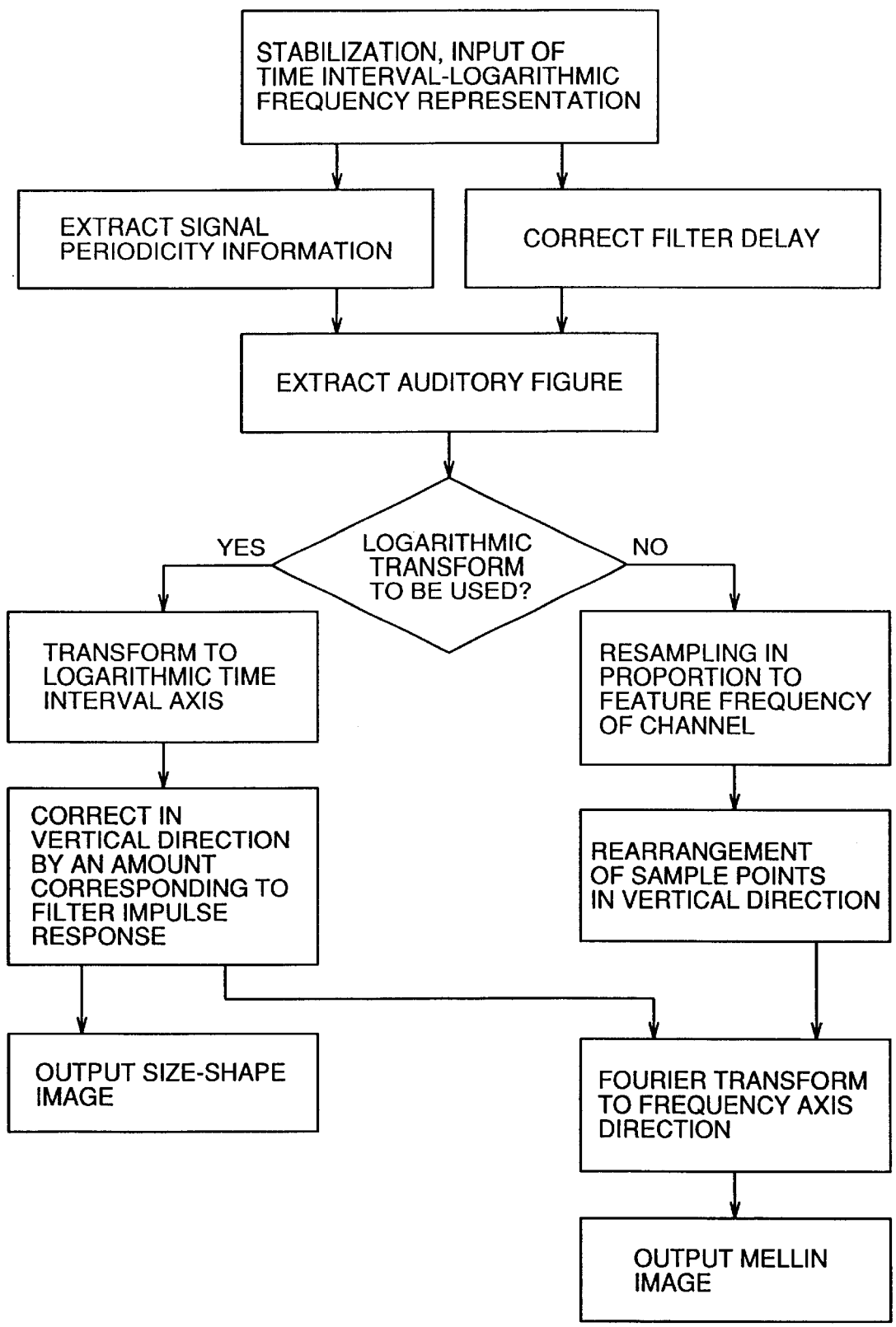
FIG. 6 is a flow chart related to FIGS. 4 and 5.

Referring to FIG. 5, the size-shape image unit 17 includes a filter delay correcting unit 22 for correcting the filter delay in the stabilized auditory image 21; an activity calculating unit 23 for calculating the total activity on the time interval axis by adding, in the vertical direction, the auditory images for all the channels; a periodicity detecting unit 24 for detecting the periodicity of the auditory image based on the magnitude of the activity calculated by the activity calculating unit 23; an auditory figure extracting unit 25 using the periodicity detected by the periodicity detecting unit 24 for extracting an auditory figure, which will be described later, from the auditory image; a transforming unit 26 to produce the logarithmic time interval representation, for transforming the abscissa of the auditory figure extracted by the auditory figure extracting unit 25 from the time interval axis to a logarithmic time interval axis; and an impulse response correction unit 27 to shift the abscissa for each channel such that a linear impulse response line in the auditory figure has the abscissa transformed by the logarithmic transform unit 26 to make it parallel to the ordinate.

Figure 7:
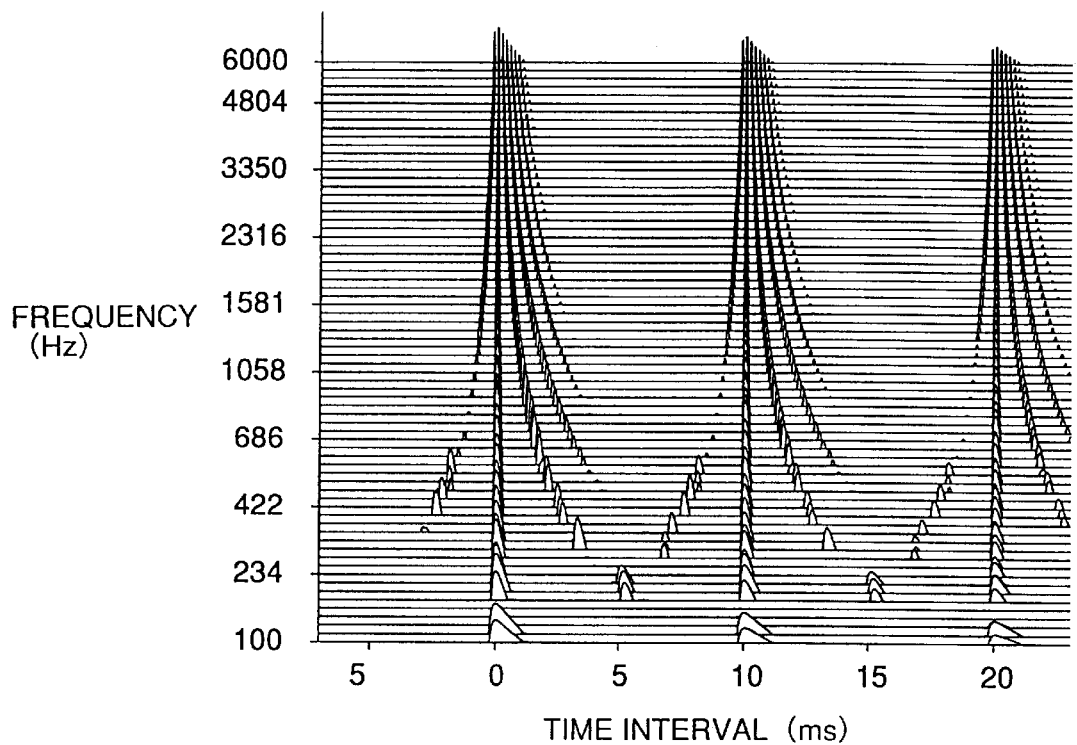
FIG. 7 represents an example of a stabilized auditory image of a click train.

FIG. 7 shows a stabilized auditory image 21 as an example of the stabilized auditory image obtained in accordance with the auditory image model, AIM (Patterson et. al. 1995). FIG. 7 shows the auditory image over two periods of a click train generated with an interval of 10 ms, that is, at a frequency of 100 Hz. The ordinate represents each channel of the filter by its centre frequency Hz, and hence it is a quasi-logarithmic frequency axis. The abscissa is the time interval from the local maximum value time point at which strobed temporal integration is started, in units of milliseconds. Here, time interval is a linear axis.

Referring to FIG. 7, portions of high level activity along three vertical lines are arranged in the same period as the periods of the original waveform. The portion of 0 ms on the abscissa represents a portion where the activity of the local maximum value is transferred, by strobed temporal integration. The local maximum value specifies each period for a periodic signal, and specifies the starting point of features for a non-periodic signal. Thus, strobed temporal integration specifies the starting point or zero point of the analysis of the Mellin transform.

In the Mellin transform, it is desirable theoretically that the wavelet filters constituting the auditory filter bank 13 of the initial stage are aligned along a reasonable reference. For example, the time points of the rise of the envelope (the time point of $t=0$ in equation C1) of the auditory filters are desirably the sane in all the channels. The rise of the envelope of auditory filter itself is not detected by the strobed temporal integration, and the strobe corresponds to the maximum value of the response. Therefore, there is an unavoidable a delay with respect to the rise of the envelope. This delay can be observed in the activity of the curve on the left side of the vertical position of dense activities in FIG. 7. Correction of the time delay corresponding to the filter is desirable to simplify the process.

Figure 8:
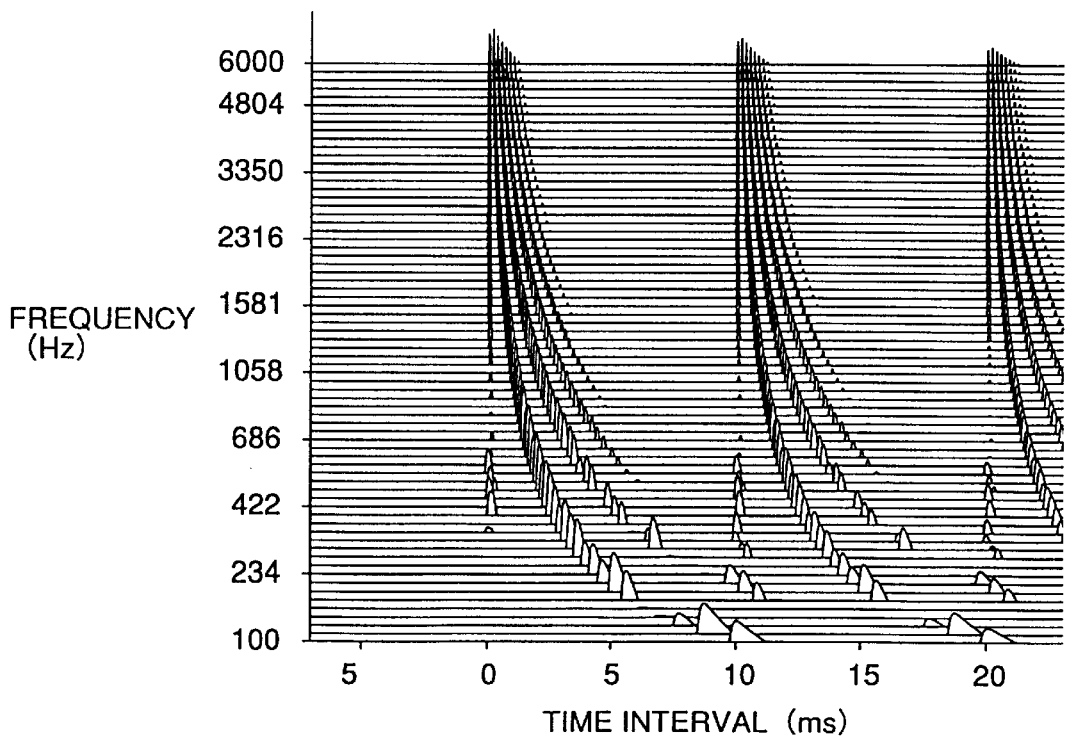
FIG. 8 represents a stabilized auditory image corrected by an amount corresponding to filter delay from FIG. 7.

The filter delay correcting unit 22 performs this correction. For the correction, what is necessary is to simply move the activity of each channel to the right, by the amount corresponding to the period of the inverse of the centre frequency of the auditory filter (equation C8). FIG. 8 is the auditory image obtained by correcting the image of FIG. 7. Thus, the vertical arrangement is a good approximation to the correvt starting point for the Mellin transform. It is known, as will be described later, that the output of the Mellin transform is not much affected by the absence of this correction.

The strobed temporal integration (STI) performed by the stabilized auditory image unit 16 stabilizes the time interval pattern which appears repeatedly in the neural activity patterns produced by a periodic sound, as described above, and generates portions where the activity is concentrated in the vertical direction in the auditory image (SAI) as represented at the time intervals of 0, 10 and 20 of FIG. 7. As is apparent from FIG. 7, the vertical activity line divides the auditory image into several similar sections by the same interval as the period of the original signal. One such section will be referred to as an auditory figure, AF, corresponding to the sound source signal (equation C9).

The activity calculating unit 23 adds the auditory images of respective channels in the vertical direction, and calculates the total activity of the profile on the time interval axis. The frequency detecting unit 24 can determine pattern periodicity based on the magnitude of the activity. Using the periodicity information, the auditory figure extracting unit 25 can extract an auditory figure corresponding to one period of the auditory image from the auditory images which have been subjected to correction corresponding to the filter delay (FIG. 8, corresponding to the result of the correction of the filter delay 22).

Figure 9:
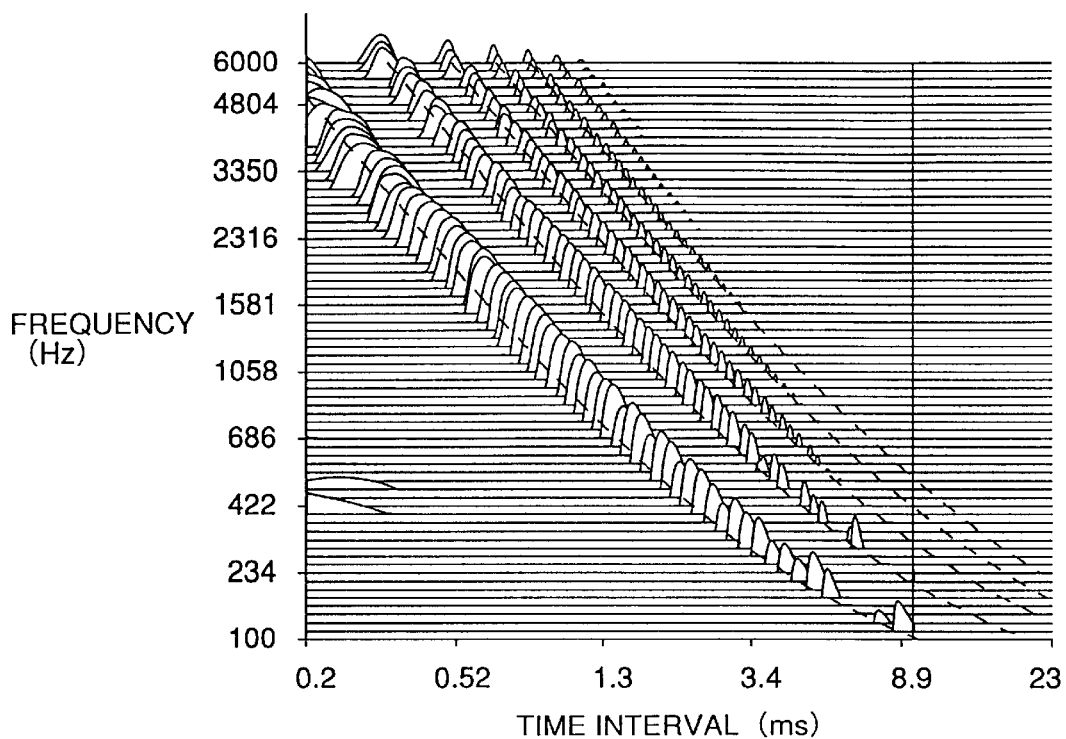
FIG. 9 shows a stabilized auditory image displayed with the time interval axis as the abscissa of FIG. 8 logarithmically transformed.

The auditory figure extracted by auditory figure extracting unit has a linear time interval axis as the abscissa. When the time interval of the abscissa is subjected to logarithmic transformation, the subsequent processes are facilitated. The transforming unit 26 for logarithmic time interval representation performs this logarithmic transformation. More specifically, unit 26 transforms the abscissa of the auditory figure to a logarithmic time interval axis (equation C10). By this transformation, contours in the auditory figure corresponding to successive periods of the impulse response of the auditory filter can be transformed to regularly arranged lines which are approximately parallel to each other as shown in FIG. 9. FIG. 9 represents the leftmost auditory figure of FIG. 8 transformed to a logarithmic time interval axis using spline interpolation.

Referring to FIG. 9, the linear impulse response lines each have a negative gradient, and are inclined similar to the diagonal of the auditory figure. This representation has logarithmic time interval as the abscissa and logarithmic frequency as the ordinate, and hence facilitates the Mellin transform calculation.

To help understand the expression representing sound source information and the Mellin transform calculation, the logarithmic, time-interval auditory figure (equation C10) of FIG. 9 is corrected to obtain FIG. 10 (equation C11) such that the impulse response line of FIG. 9 is modified to a line parallel to the ordinate (as it becomes vertical to the abscissa, the line will be referred to as "normal" hereinafter.). This correction is performed by the transforming unit 26 to the logarithmic time interval representation, and this correction corresponds to movement of the logarithmic time interval axis to the right by the amount proportional to the logarithm of the centre frequency for each channel. The new abscissa in FIG. 10 is represented by the logarithm of a product h (equation B9) of the time interval and the channel centre frequency. The coordinate is the center frequency of the logarithmic axis representation as in the prior art.

Referring to FIG. 10, the leftmost dotted normal represents the position in the auditory figure where the product h of time interval and channel centre frequency attains 1. In FIG. 10, normals corresponding to the values 1 to 5 of h are drawn in dotted lines, and on each of the normals, activity is concentrated. More specifically, in the representation of FIG. 10, impulse responses of all the wavelet filters are concentrated on the normals where the value h assumes an integer, and therefore it is understood that the representation is not dependent on expansion or reduction of the wavelet filter. To facilitate understanding of this fact, the abscissa is changed to a linear axis of h, as shown in FIG. 11.

Figure 11:
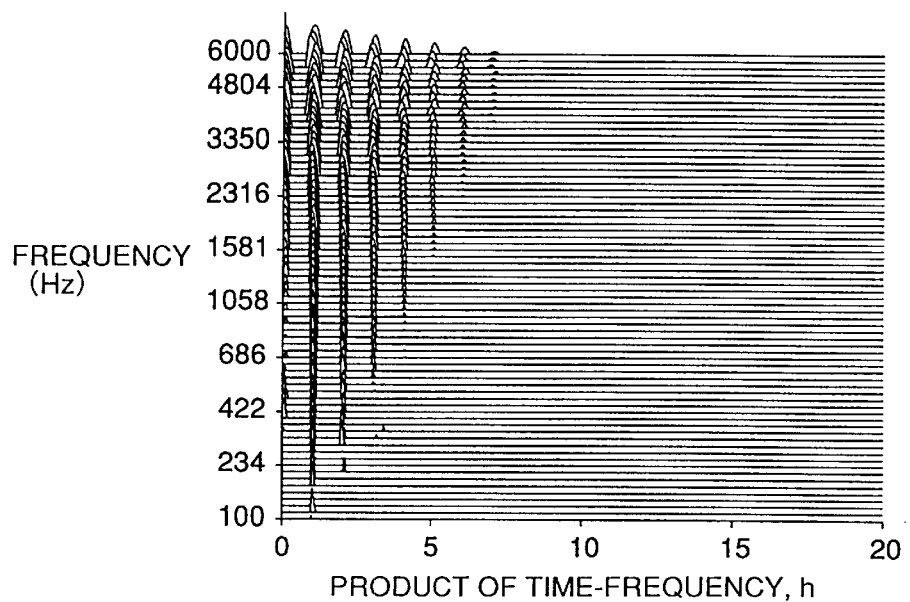
FIG. 11 shows the stabilized auditory image of FIG. 10 transformed such that the product h of time interval and frequency of the abscissa is transformed to be a linear axis.

In the example shown in FIG. 11, the activity is directly calculated from the auditory image of FIG. 8 not using the logarithmic transformation, and therefore activity on the normal corresponding to h=0 is also included. For this process, what is necessary is to re-sample the activity by the sampling frequency proportional to the center frequency of each channel in the auditory image of FIG. 8 and to simply arrange the sample points two-dimensionally.

As already described in the preceding section, in this representation, the wavelet filter provides the same representation in any channel. Therefore, if the sound source is similar and the resulting waveform is expanded/reduced in terms of wavelets, representation of the same shape can always be obtained. Expansion or reduction of the waveform is, in this representation, represented as simple translation of the activity profile in the direction of the vertical frequency axis. Therefore, in the sense that information of both size and shape of the sound source is represented, this representation will be referred to as size-shape image, SSI. As will be described later, this representation is particularly effective when the auditory figure of a vowel is to be represented. The process flow described above is as shown in the flow chart of FIG. 6.

The auditory figure of the size-shape image of FIGS. 10 and 11 is obtained by the above described series of procedures from the leftmost auditory figure of the auditory image shown in FIG. 7. It is not, however, restricted to the leftmost auditory figure. For example, the second auditory figure may be used, or any auditory figure representing any one period of any signal (equation C9).

It should be noted, however, that though any portion may be selected to obtain the same result, if the object is a simple click train as in this example, when there is noise added to the speech or musical tone, it may be more advantageous, to extract the signal component only, to select the second auditory figure. This is because the noise and signal components are both concentrated on the first auditory figure.

The profile along the h axis, as the abscissa of the size-shape image, is mainly the impulse response of the wavelet filter having the same shape in each channel, and therefore it will be referred to as impulse profile (equation C12). The profile along the ordinate is the auditory spectral profile (equation C13). The impulse profile has sound source information different from the conventional spectrum vector. As each profile is a vector representing the size-shape image at a certain time point, when the vectors are calculated at a prescribed interval (for example, every 5 to 30 ms) and aligned in the form of a time sequential spectrogram, the result may be applied to speech recognition. This representation may be referred to as a size-shape image spectrogram.

3. Formation of Mellin Image

In this section, the reason and process steps of calculating Mellin image by Mellin image unit 18 from the size-shape image output from size-shape image unit 17, and the fact that the Mellin image corresponds to the Mellin image output from the Mellin transform unit 3 of FIG. 1 will be described.

The output from the size-shape image unit 17 has a profile almost fully occupied by the response of the auditory wavelet filter. The sound source information which would be output on the right side of this impulse response line for a sound other than the click train is relatively small. What should be extracted is the sound source information itself, and therefore, the auditory filter information should be removed by any means using some inverse convolution. For this purpose, consider the Fourier transform of the vertical vector for each h of the size-shape image and the representation of each vector by the amplitude of spatial frequency components thereof. The auditory wavelet filter information in the size-shape image does not much change channel by channel as can be seen in FIG. 10. Therefore, the information will be concentrated where the spatial frequency is extremely low. In contrast, sound information from a sound source other than the click train causes forced excitation of the wavelet filter, generating ringings at various frequencies, and therefore such information will appear where the spatial frequency is relatively high. Accordingly, the sound source information can be separated from the information of the wavelet filter itself.

This calculation can be implemented by replacing the weight function W ($\alpha f_b$, h) in equation C12 of the impulse profile by a weighted complex sine wave defined on logarithmic frequency as represented by equation C14. Then, the spatial angular frequency $c/2\pi$ is introduced as a parameter to obtain W ($\alpha f_b$, h, c) and substituted for equation C12, equation C15, which is a two dimensional representation, is obtained. The output Mi (h, c) obtained from the equation C15 will be referred to as Mellin image 18. At this point, the abscissa is the same h as in the size-shape image, while the ordinate is the spatial frequency $c/2\pi$ of the Fourier transform. Translation in the vertical direction in the size-shape image appears simply as a change in phase of the Fourier transform, and hence amplitude information is invariant. In the size-shape image, the periodicity of the sound source has already been removed, and the magnitude is invariant in the direction of the x axis. Therefore, the auditory figure represented by the Mellin image represents the shape information of the sound source independent on the size of the sound source or the periodicity of the source excitation.

Figure 12:
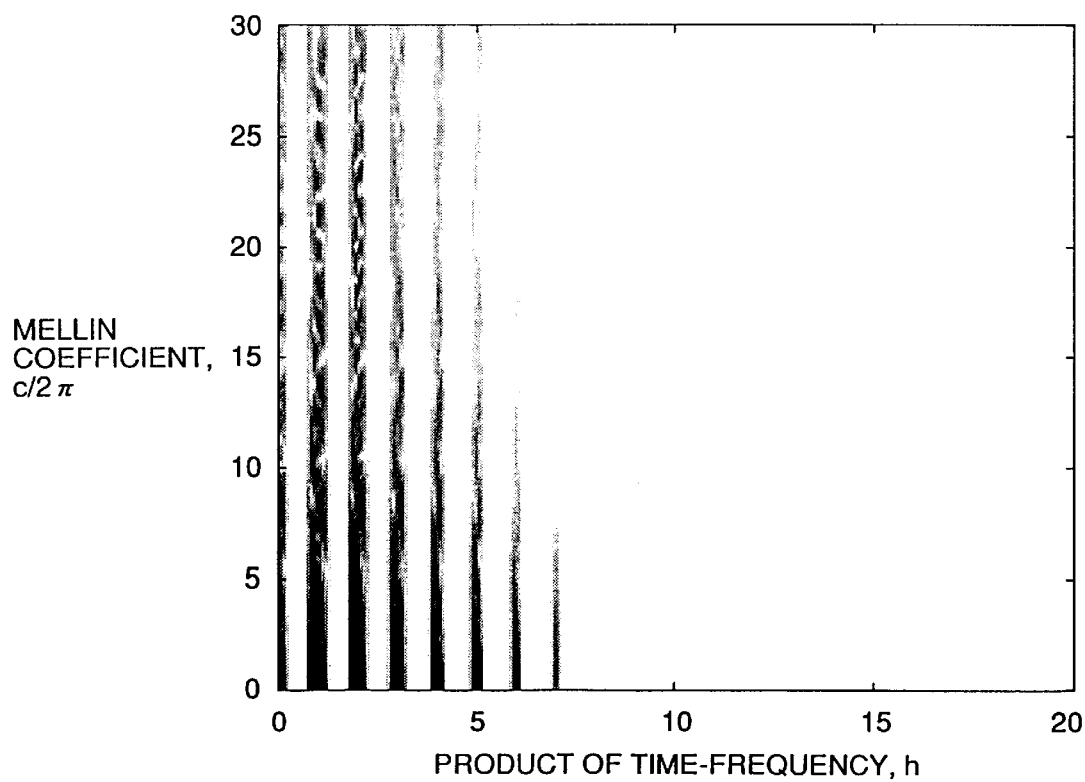
FIG. 12 represents a Mellin image of the click train.

FIG. 12 is a Mellin image obtained from the size-shape image of the click train shown in FIG. 11. As can be seen from FIG. 12, in the Mellin image of the click train, activity is concentrated only on the very low spatial frequency, and activity is hardly observed high frequencies. This reflects the fact that the click sound generates activity that is almost flat except for the low frequency channels in the size-shape image. As the size-shape image is the impulse response of the wavelet filter normalized to have the same shape in every channel, theoretically, the amplitude value exists only where the spatial frequency is zero, if a single click only is input.

4. Correspondence Between Mellin Image and Mellin Transform

Before turning to the analysis of attenuated vibrating waves or vowels, let us consider the relation between the Mellin image (equation C15) represented as the integration in the frequency range of the present example obtained as an output of the Mellin image unit 18 and the Mellin image (equation B10) output from the Mellin transform unit 3 represented as an integration in the time interval range described as a basic concept. When the logarithm of the basic restricting condition (equation B9) that the product of time interval and centre frequency is constant is calculated, the result is given by equation C16, and the differential thereof provides equation C17. By substitution of this relation for equation C15 and applying equations C10 and C11, equation C18 results. This is an equation of integration in time interval similar to equation B10 except for the constant. This fact shows that the Mellin image (equation C15) represented as an integration of the frequency range of the present example obtained as an output of Mellin image unit 18 is the same as the Mellin image (equation B10) output from the Mellin transform unit 3 represented as an integration of the time interval range described as the basic concept.

Figure 13:
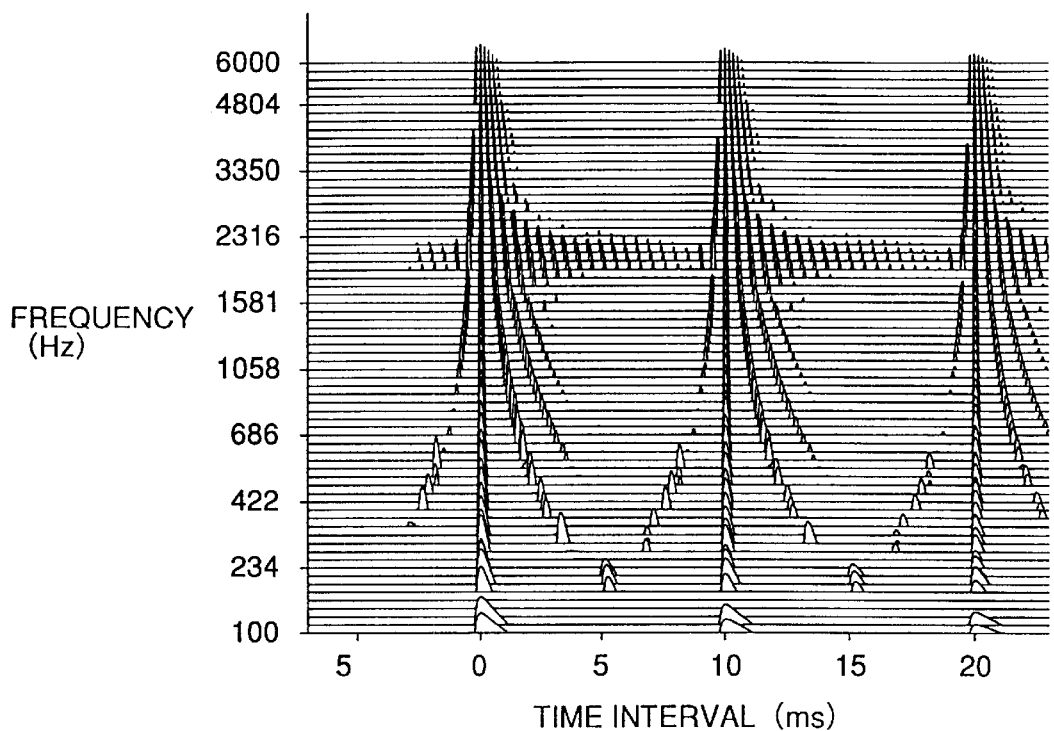
FIG. 13 represents an auditory image of an exponentially attenuated sine wave.

5. Auditory Image, Size-Shape Image, and Mellin Image of Attenuated Vibration Wave FIG. 13 shows an auditory image of a repetitive exponentially attenuated sine wave. The exponentially attenuated sine wave has an exponential envelope whose half life is 2 ms, a sine wave carrier with frequency 2 kHz and a repetition frequency of 100 Hz. The attenuated sine wave having such parameters is similar to a vowel with a single Formant. The repeated rising portions generate responses similar to clicks at portions 2 kHz distant in the frequency range as activities on the normal, and the interval between two vertical activities represent the periodicity of the signal. From the auditory image of FIG. 13, it is understood that a response is enhanced and extended by resonance having attenuated an envelope in the range of 2 kHz. This is a common feature observed in natural sound, including speech.

Figure 14:
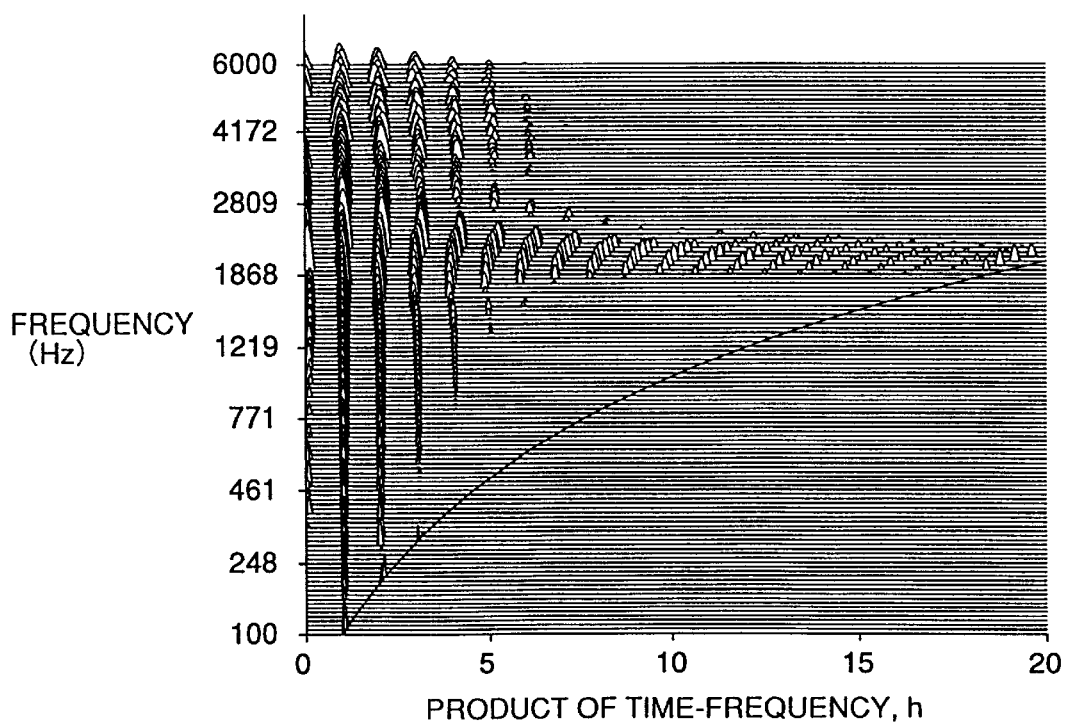
FIG. 14 represents a size-shape image of the exponentially attenuated sine wave.

FIG. 14 is the size-shape image of the auditory figure of the attenuated sine wave. The activity at portions away from 2 kHz is not much different from that of the click train shown in FIG. 11. However, at a channel near 2 kHz, the activity extends to a high h value, and the columns of neighboring activities come to have increased inclination as the value h increases. This represents the fact that the instantaneous frequency at a channel other than the channel of 2 kHz is not the frequency of the wavelet filter, that is, not the carrier frequency of the filter.

Figure 15:
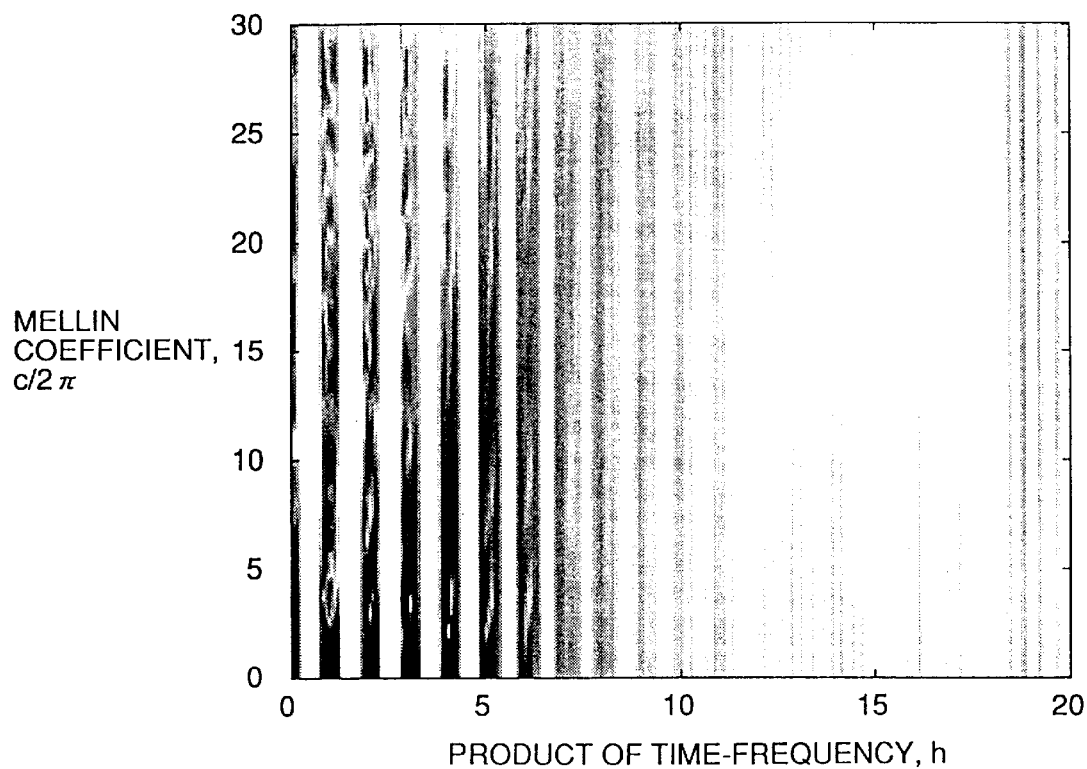
FIG. 15 represents a Mellin image of the exponentially attenuated sine wave.

FIG. 15 shows the Mellin image of the attenuated sine wave. As the rising portion is similar to a click, activity is constantly at portions of extremely low spatial frequency, as in the case of the click train (FIG. 11). The activity related to resonance in the 2 kHz range of the size-shape image further increases the vertical-strip-shaped active regions in the Mellin image, representing the fact that responses of wide spatial frequencies exist where h is large. The width of the strip-shaped active region becomes wider as h increases, which corresponds to the fact that the inclination between adjacent activity monitored in the fine structure increases as h increases. This is a feature of a single resonance or single formant. The strip-shaped structure of the Mellin image of the attenuated sine wave having parameters other than that described above is not much varied by the frequency of the carrier, the half life of the envelope or the repetition frequency of the signal. More specifically, the change in the stlip-shaped structure described above serves to extract information about the sound source shape independent of the size or the repetition frequency. The strength or width of the vertical strip-shaped region increases moderately as the half life of the attenuated sine wave increases. In the next section, the example will be further expanded and a vowel synthesized with a vocal-tract cross-section function will be analyzed in a similar manner.

6. Auditory Images, Size-Shape Images, and Mellin Images of Four Different Vowels 'a'

In order to show the invariant characteristic of the size-shape image and the Mellin image with respect to the size of the sound source, four different synthesized vowels 'a' were produced. The synthesized vowels are produced from a vocal tract model using a vocal tract cross section function of a male subject (Yang C-S and Kasuya, H. (1995). "Dimension differeces in the vocal tract shapes measure from MR images across boy, female and male subjects," J. Acoust. Soc. Jpn (E), 16, pp. 41–44.). Consider extraction of the feature of the vocal tract shape by a size-shape image and a Mellin image.

Figure 16:
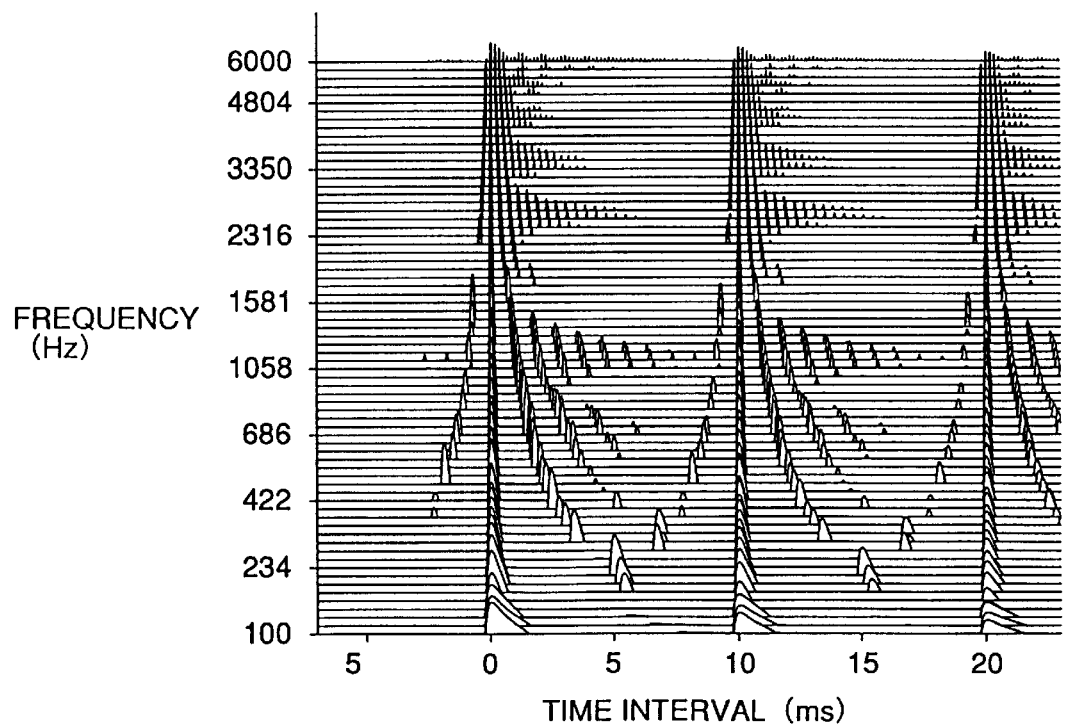
FIG. 16 represents an auditory image of a Japanese vowel 'a' (repetition frequency of vocal cord pulse being 100 Hz), synthesized from a vocal tract model using a measured vocal tract cross section function of a male speaker.
Figure 17:
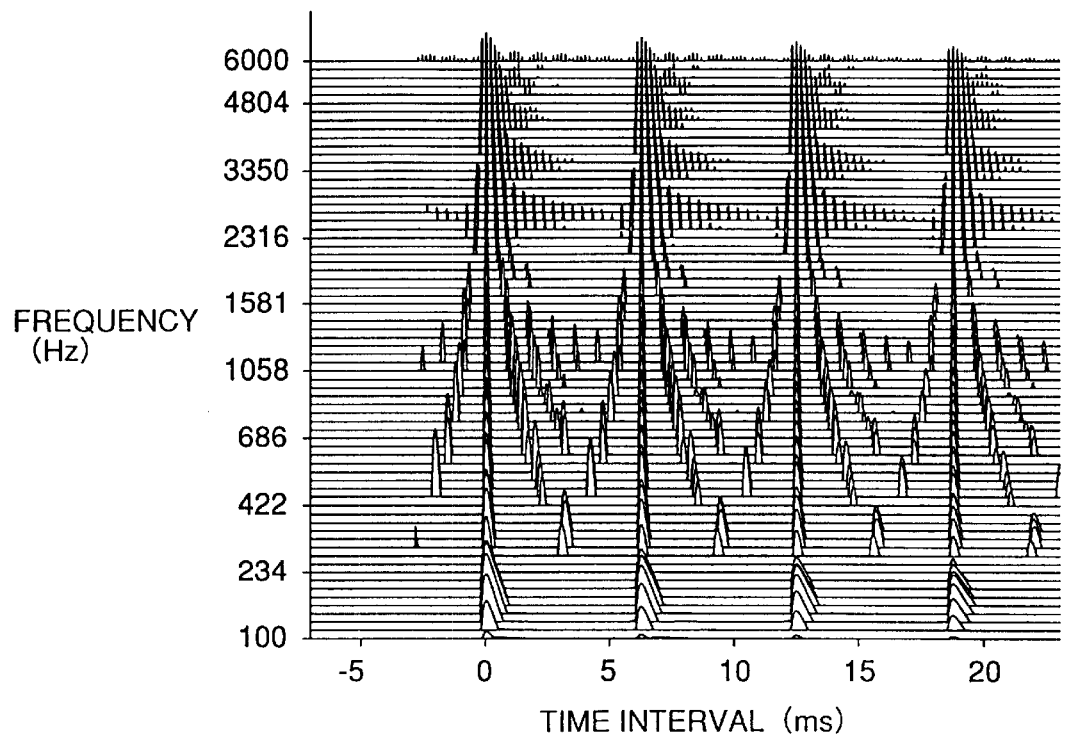
FIG. 17 represents an auditory image of the Japanese vowel 'a' under the same condition as FIG. 16, with the repetition frequency of vocal cord pulse being 160 Hz.

A set of four synthetic 'a' vowels were constructed. The first pair of vowels had the identical vocal tract length, and diffred in being excited by streams of glottal pulses with different rates, i.e., 100 Hz and 160 Hz. Their auditory images are shown in FIGS. 16 and 17, respectively. The resonances in the vocal tract extend the impulse response in the auditory figure in the frequency region of the resonance. These resonances are referred to as Formants in speech research. The second and third Pormants have center frequencies of about 1000 Hz and 2200 Hz, respectively. Portions where the vertical activity is concentrated are closer to each other in FIG. 17 than in FIG. 16. Note, however, that the position of the Formants do not change with glottal rate.

Figure 18:
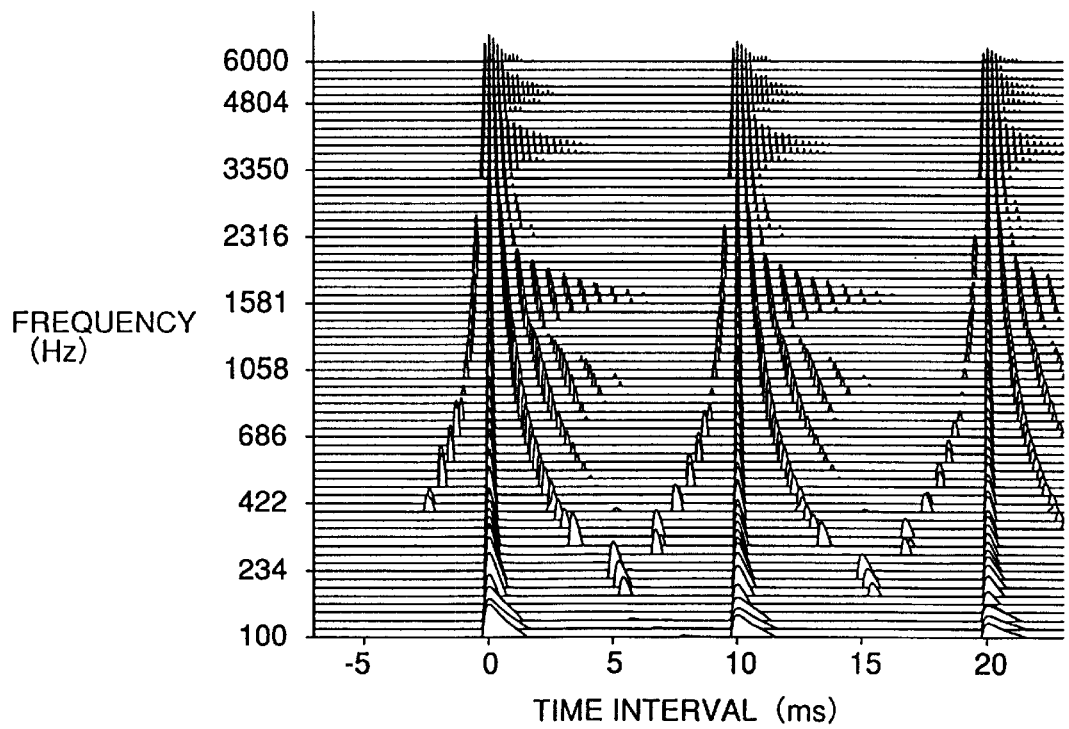
FIG. 18 represents an auditory image of the Japanese vowel 'a' (repetition frequency of vocal cord pulse being 100 Hz) synthesized from the vocal tract model, with the length of the vocal tract reduced to ⅔ of the vocal tract cross section function of FIG. 16.
Figure 19:
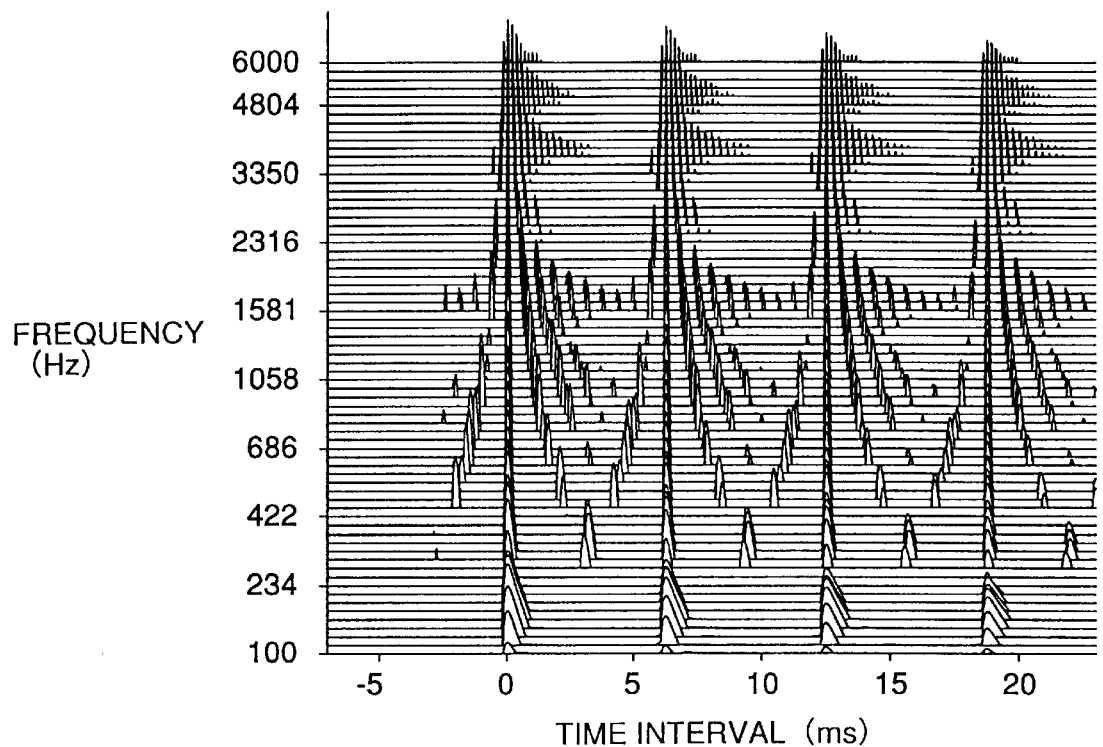
FIG. 19 represents an auditory image of the Japanese vowel 'a' synthesized under the same condition as FIG. 18 with the repetition frequency of vocal cord pulse being 160 Hz.
Figure 20:
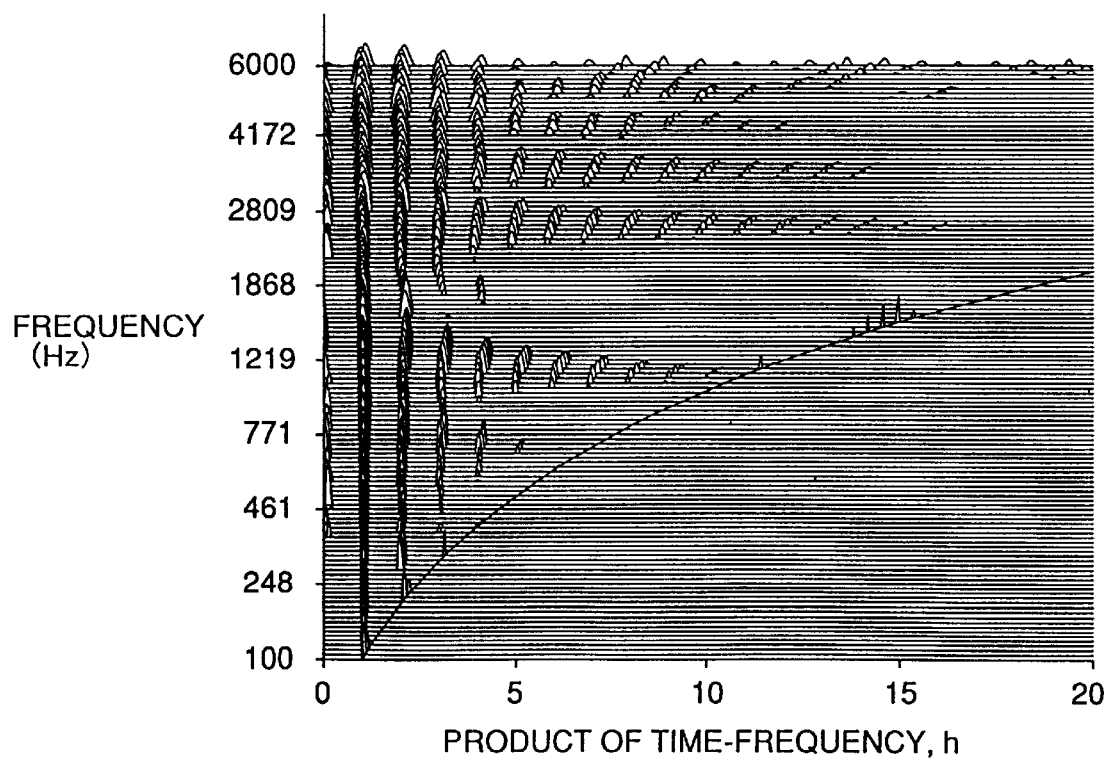
FIG. 20 represents a size-shape image for FIG. 16.
Figure 21:
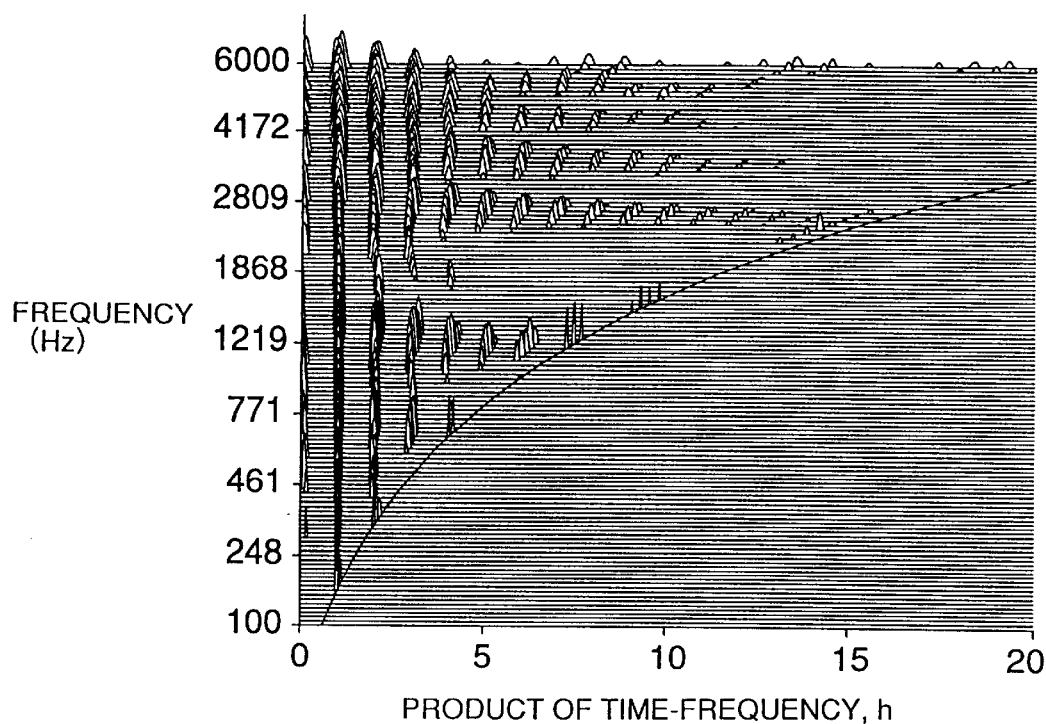
FIG. 21 represents a size-shape image for FIG. 17.
Figure 22:
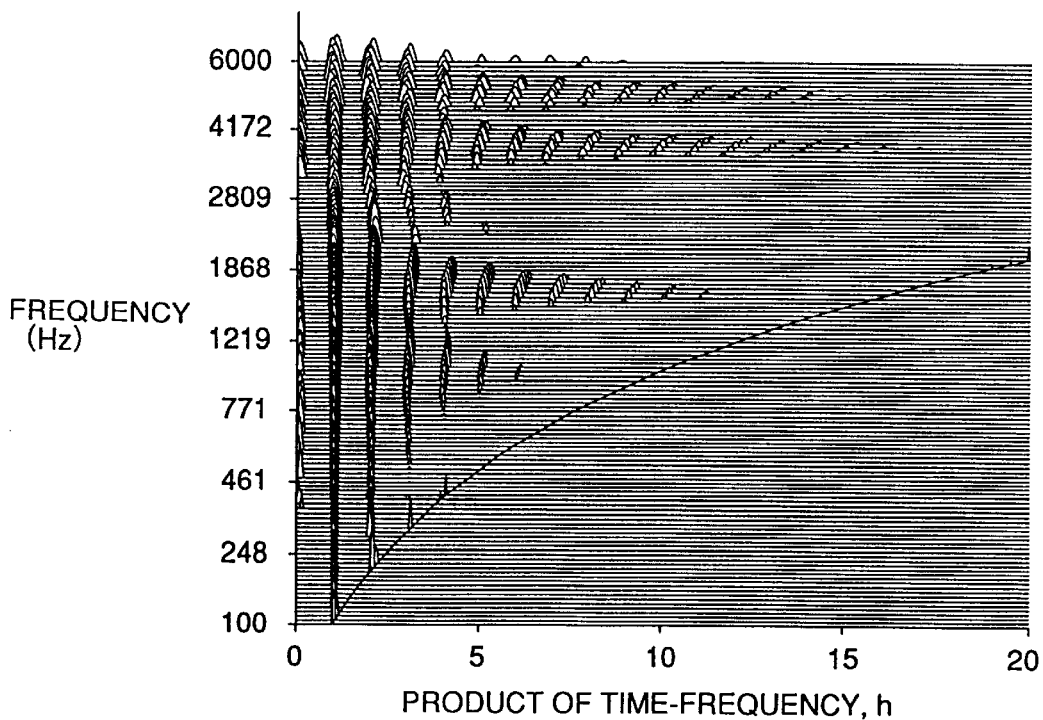
FIG. 22 represents a size-shape image for FIG. 18.
Figure 23:
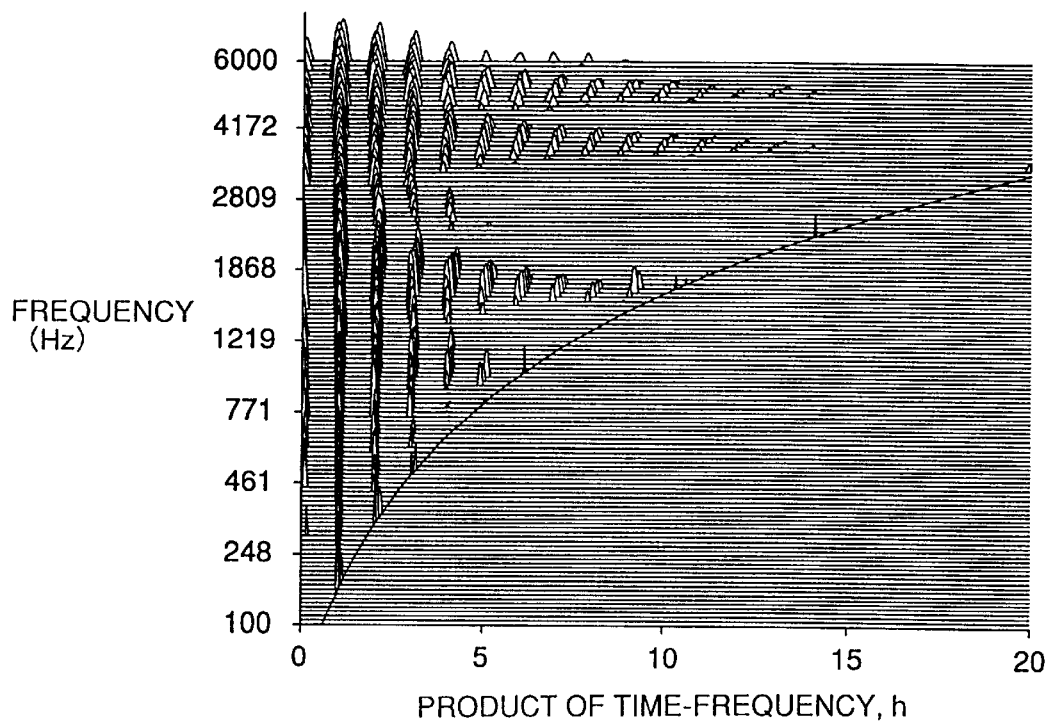
FIG. 23 represents a size-shape image for FIG. 19.
Figure 24:
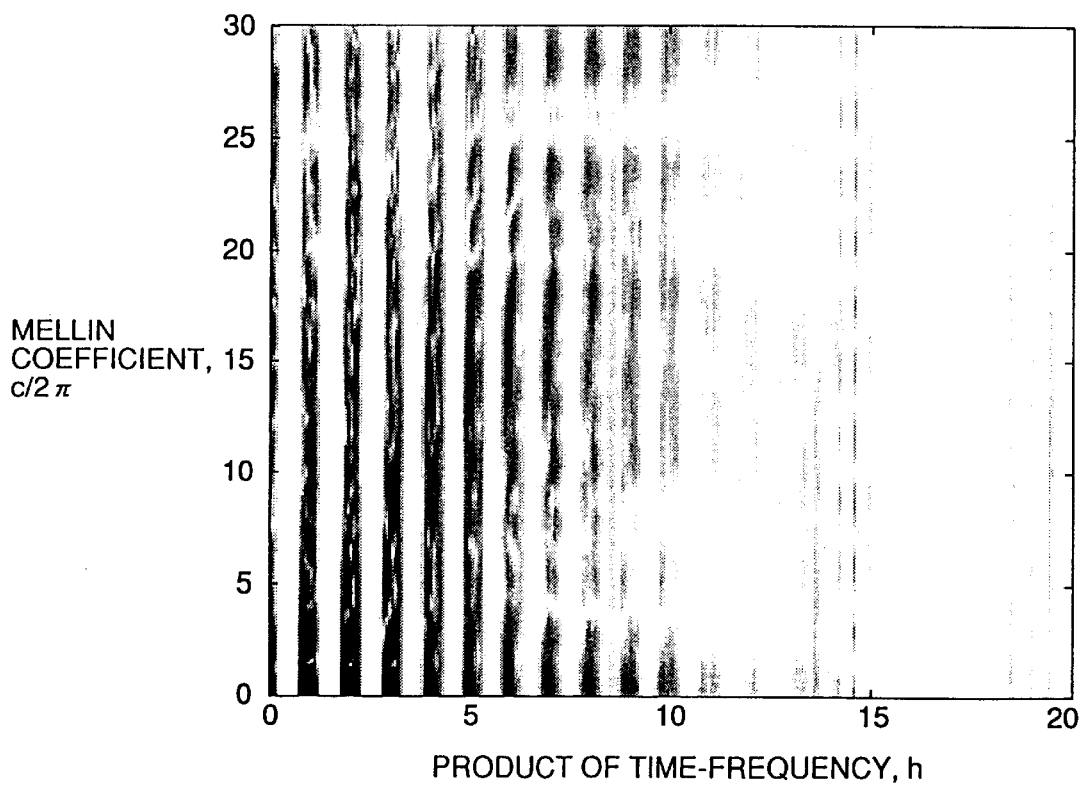
FIG. 24 represents a Mellin image for FIG. 16.
Figure 25:
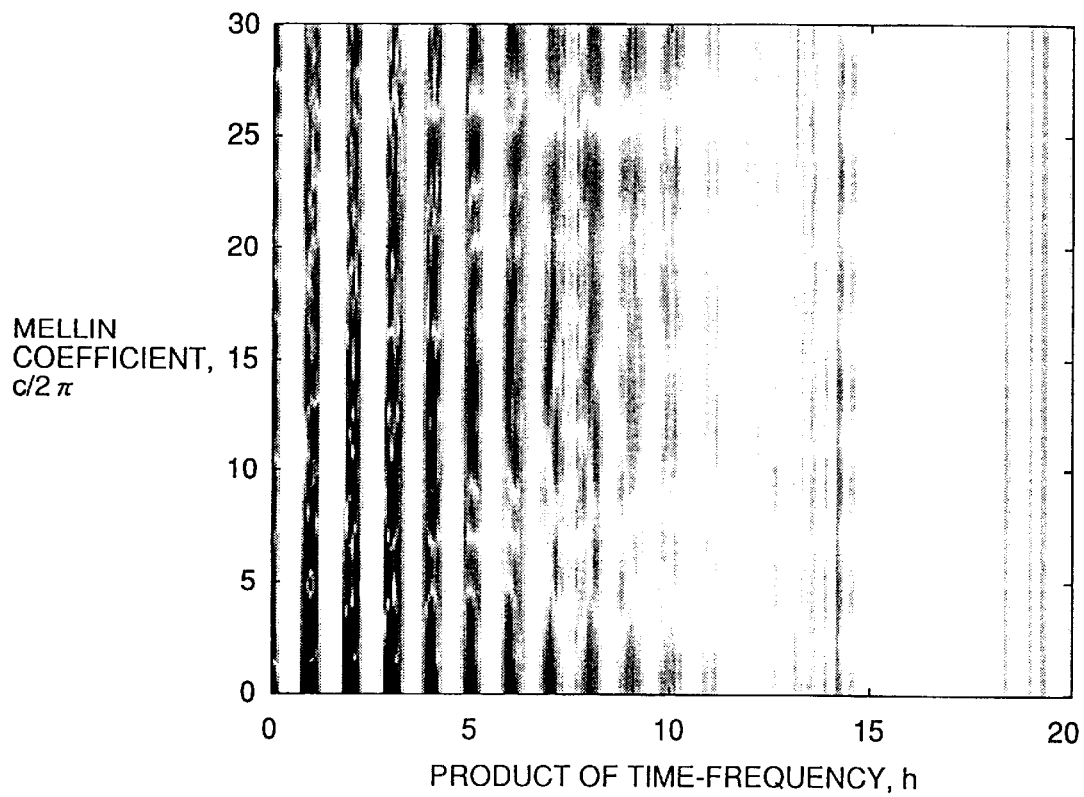
FIG. 25 represents a Mellin image for FIG. 17.
Figure 26:
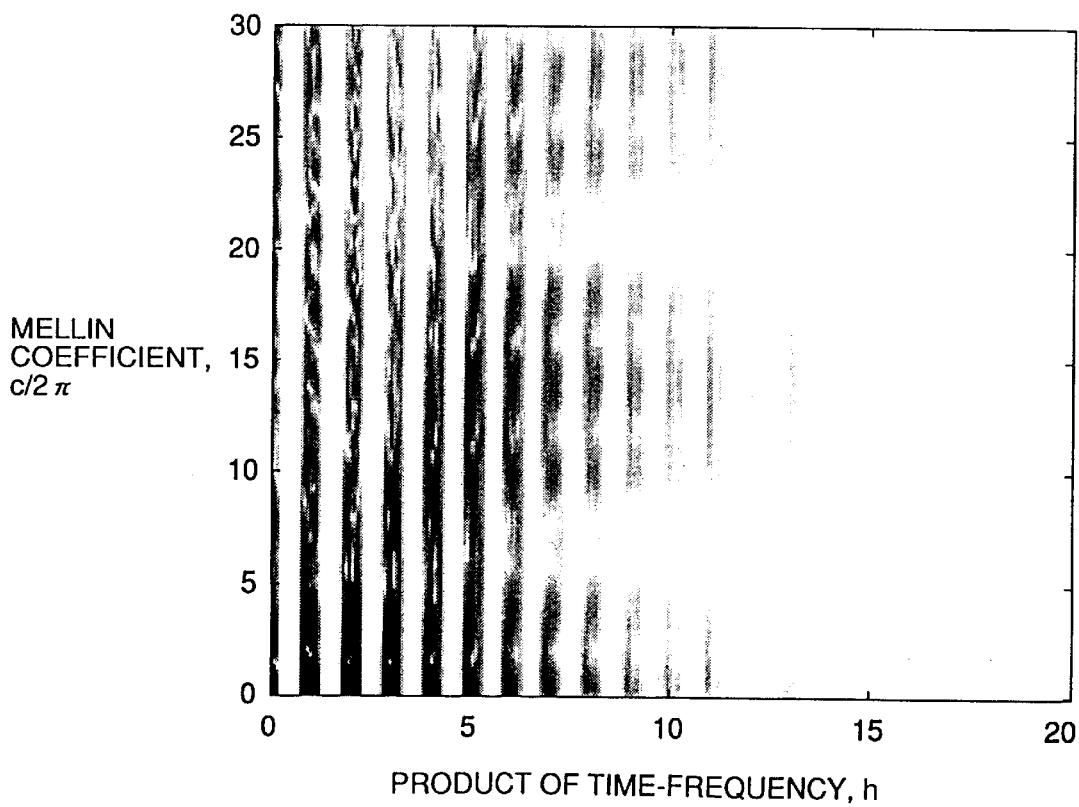
FIG. 26 represents a Mellin image for FIG. 18.
Figure 27:
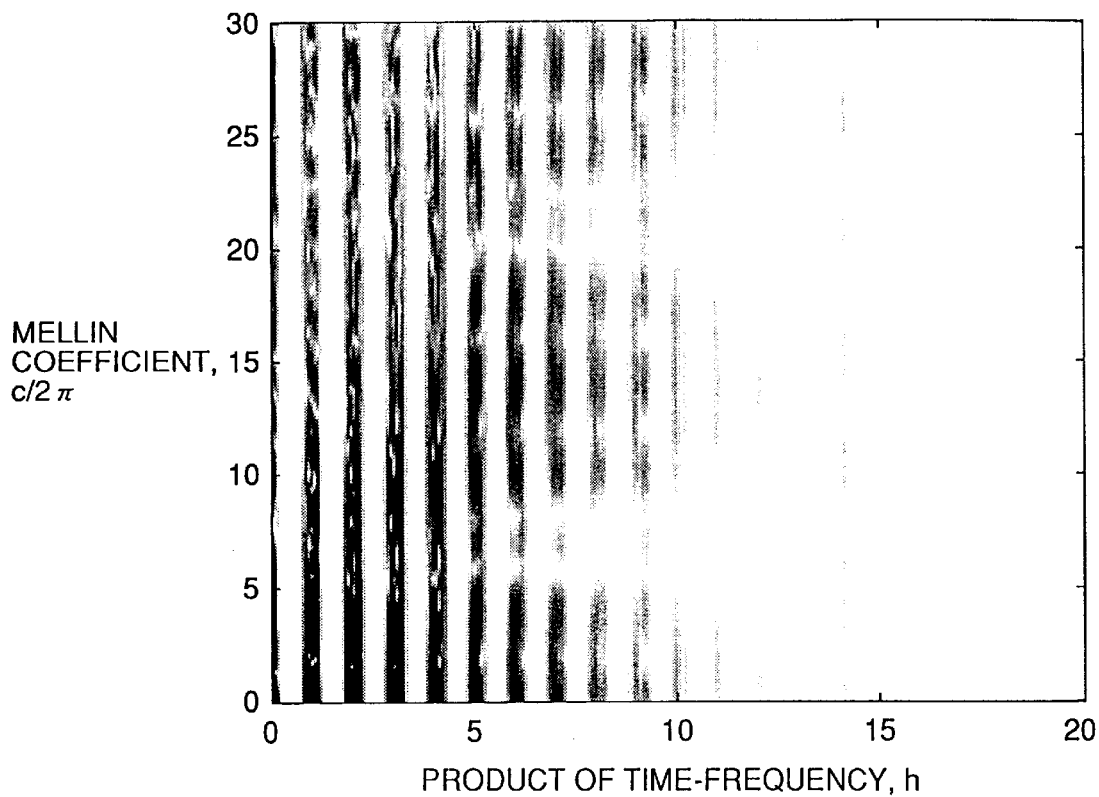
FIG. 27 represents a Mellin image for FIG. 19.
Figure 28:
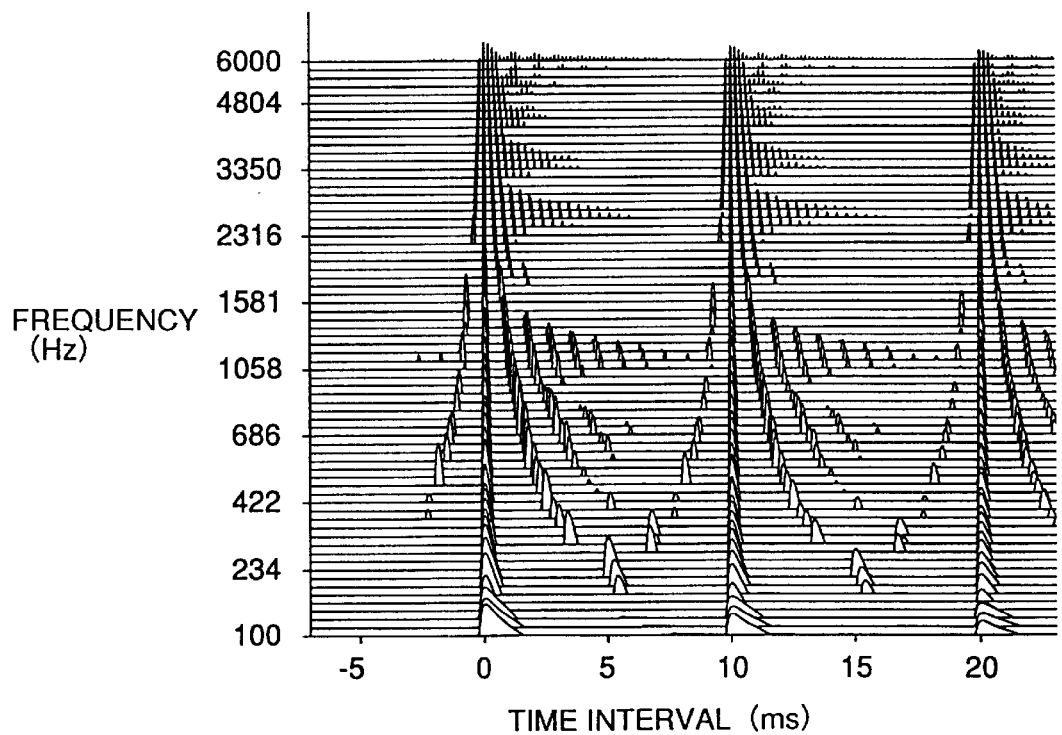
FIG. 28 is the same figure as FIG. 16, representing an auditory image of a Japanese vowel 'a' (repetition frequency of vocal cord pulse being 100 Hz) synthesized from a vocal tract model using measured vocal tract cross section function.
Figure 29:
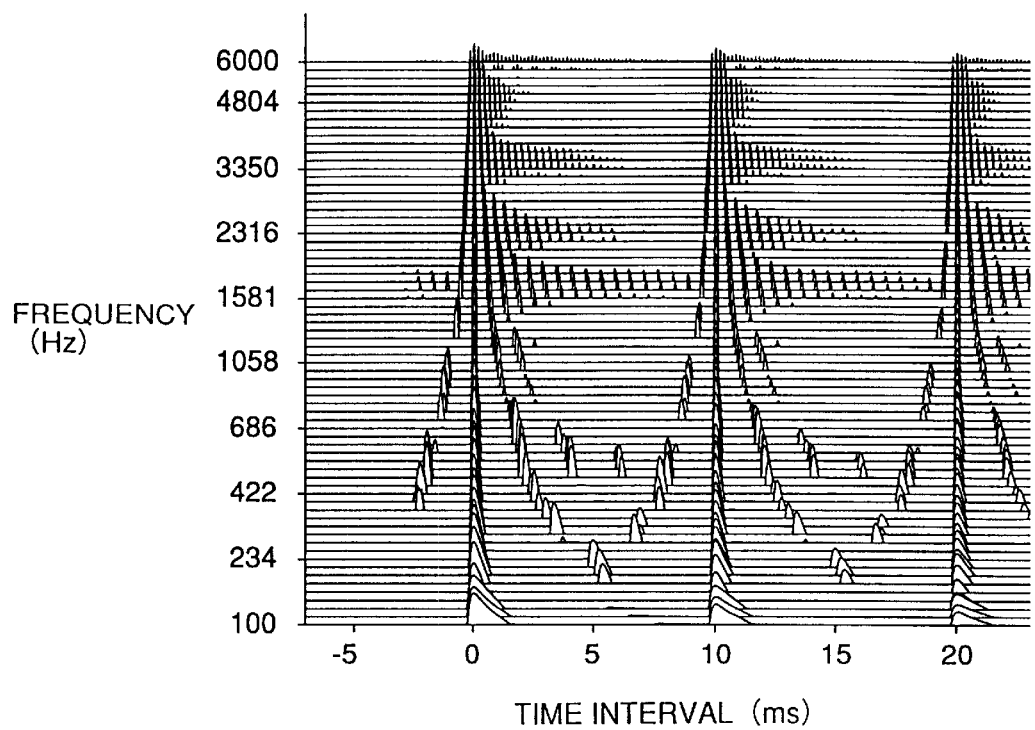
FIG. 29 represents an auditory image of a Japanese vowel 'e' (repetition frequency of vocal cord pulse being 100 Hz) synthesized from the vocal tract model using the vocal tract cross section function of 'e' measured for the same male speaker as FIG. 28.
Figure 30:
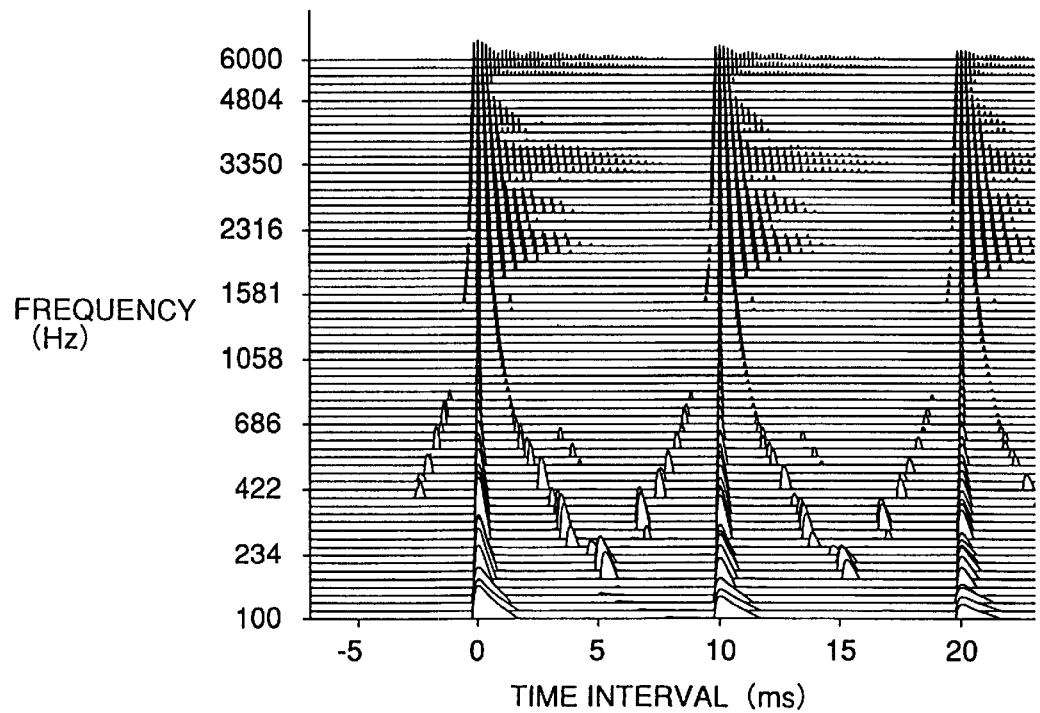
FIG. 30 represents an auditory image of a Japanese vowel 'i' (repetition frequency of vocal cord pulse being 100 Hz) synthesized from a vocal tract model using the vocal tract cross section function of 'i' measured for the same male speaker as FIG. 28.
Figure 31:
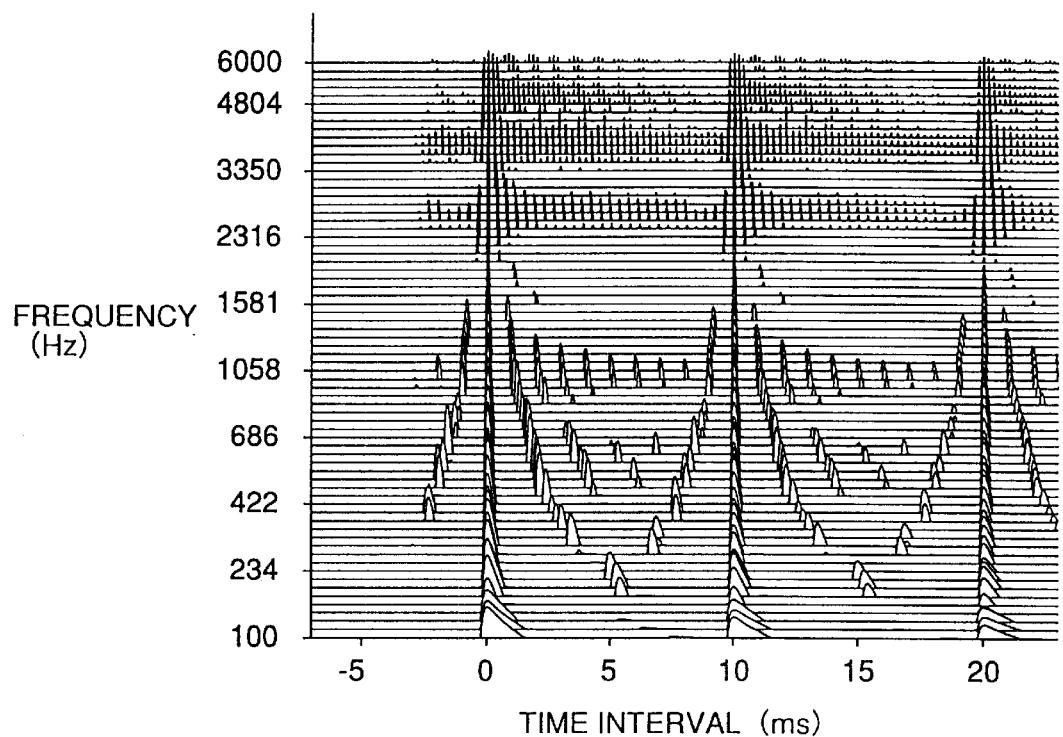
FIG. 31 represents an auditory image of a Japanese vowel 'o' (repetition frequency of vocal cord pulse being 100 Hz) synthesized from a vocal tract model using the vocal tract cross section function of 'o' measured for the same male speaker as FIG. 28.
Figure 32:
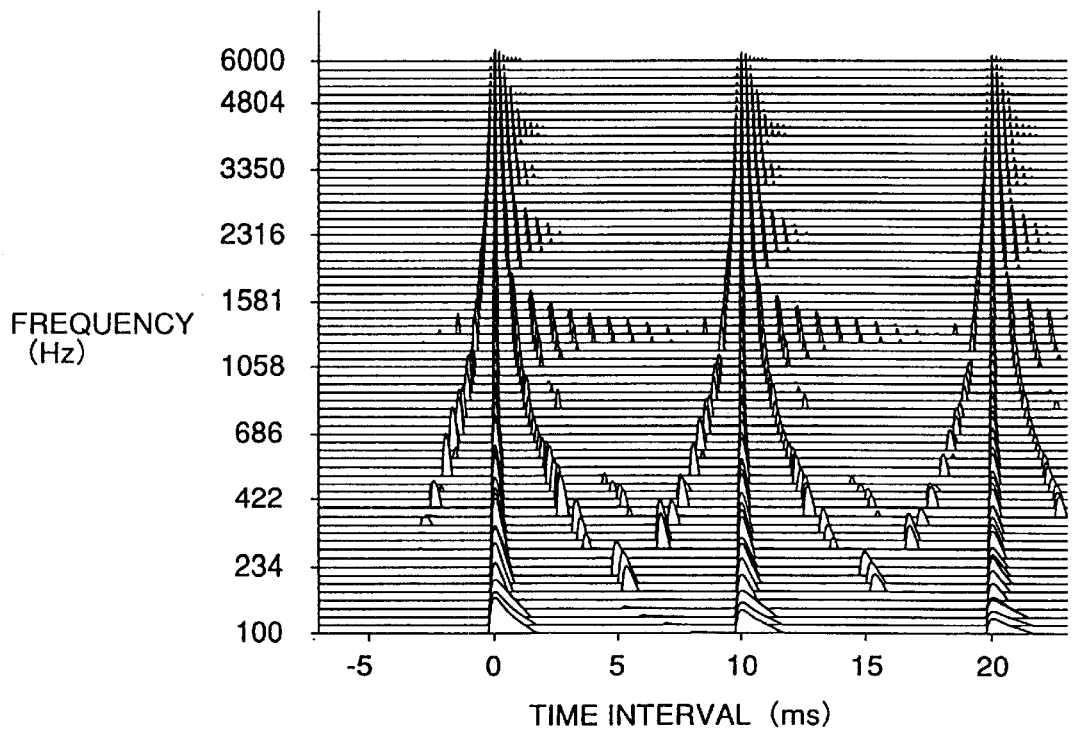
FIG. 32 represents an auditory image of a Japanese vowel 'u' (repetition frequency of vocal cord pulse being 100 Hz) synthesized from a vocal tract model using the vocal tract cross section function of 'u' measured for the same male speaker as FIG. 28.
Figure 33:
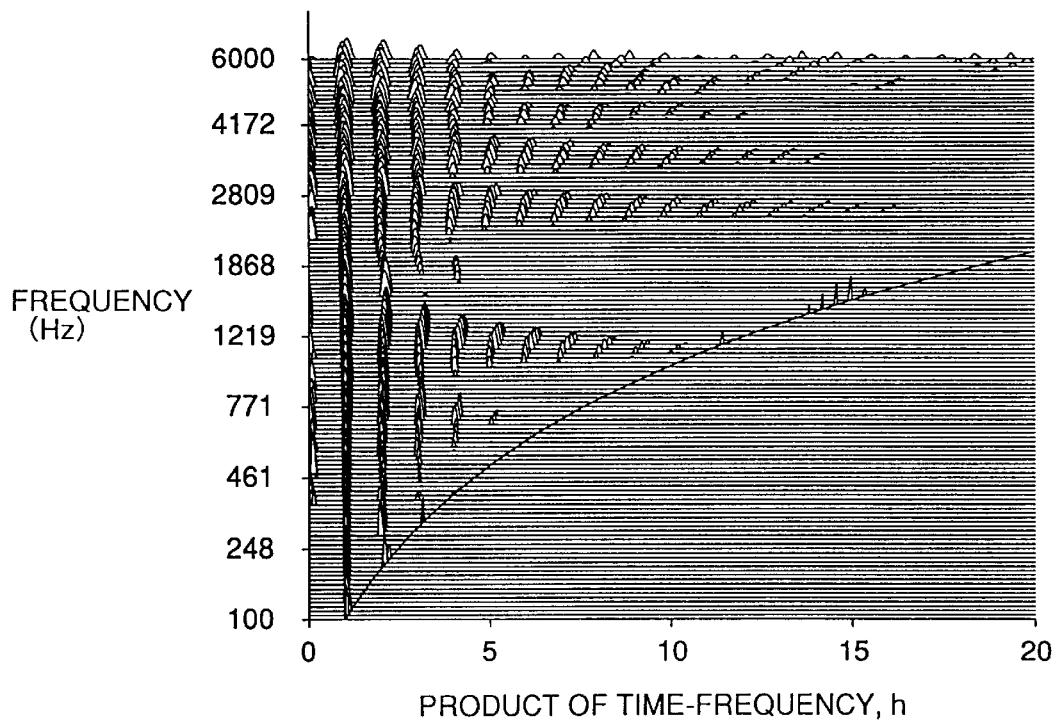
FIG. 33 represents a size-shape image for FIG. 28.
Figure 34:
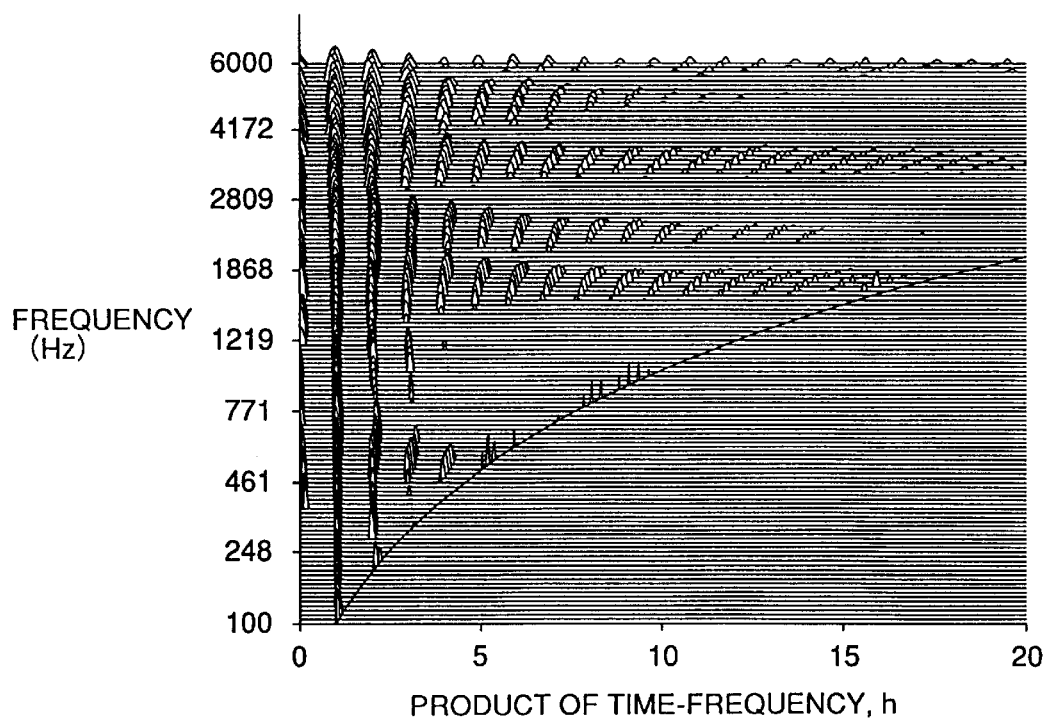
FIG. 34 represents a size-shape image for FIG. 29.
Figure 35:
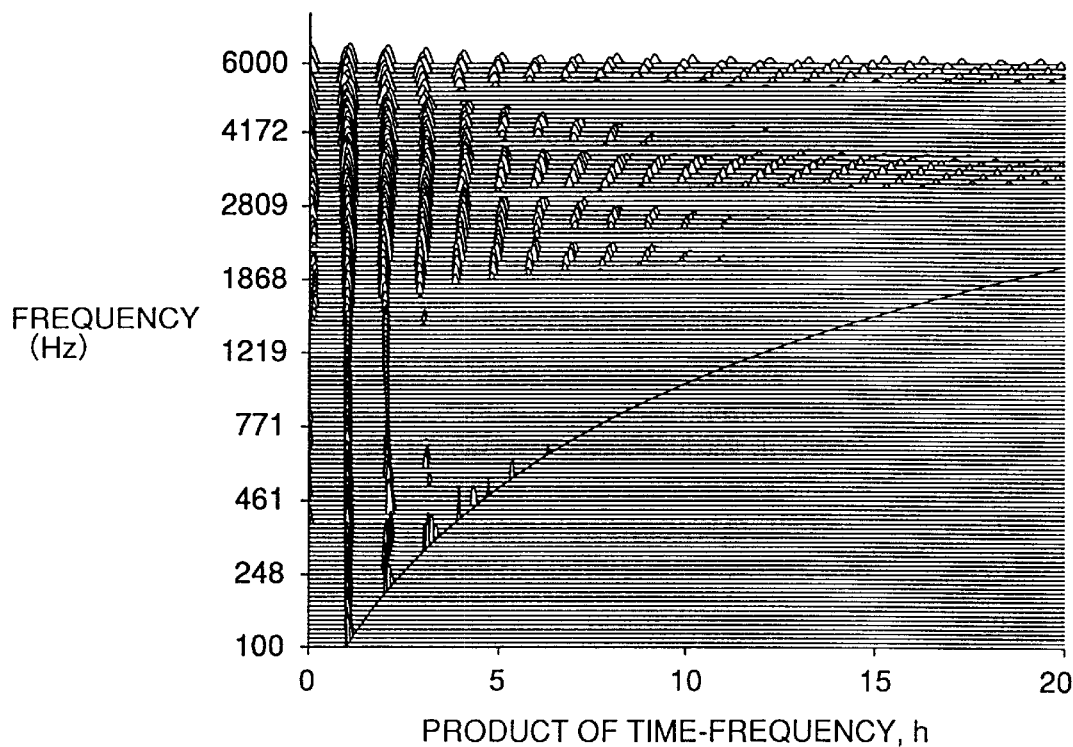
FIG. 35 represents a size-shape image for FIG. 30.
Figure 36:
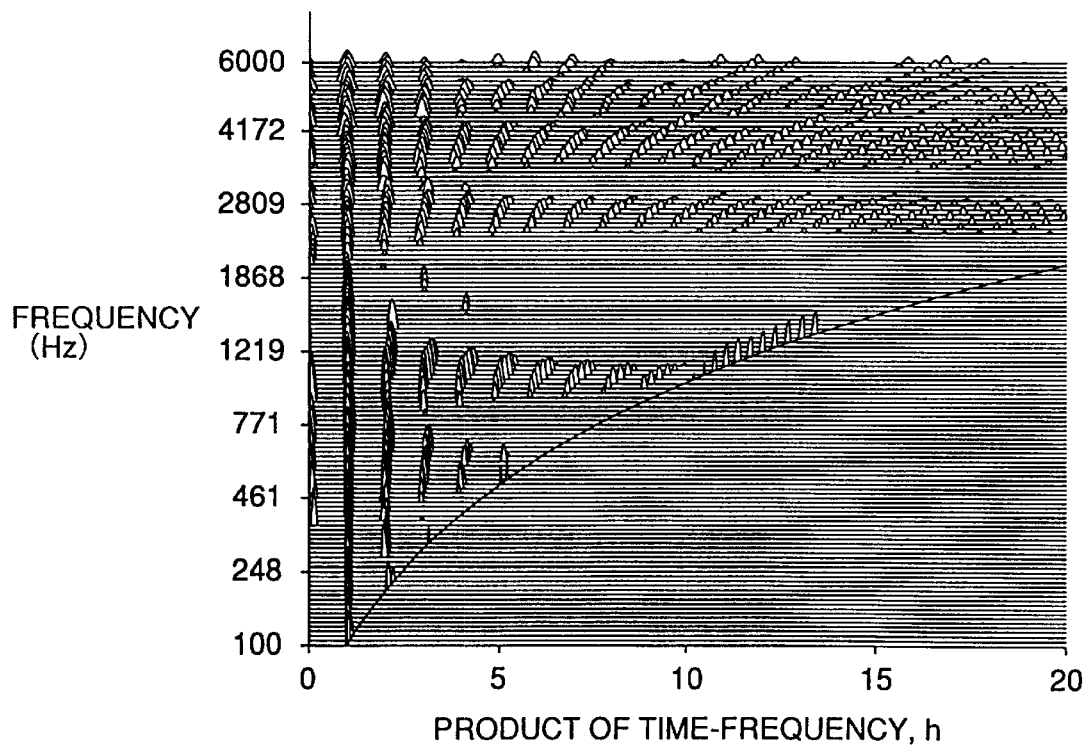
FIG. 36 represents a size-shape image for FIG. 31.
Figure 37:
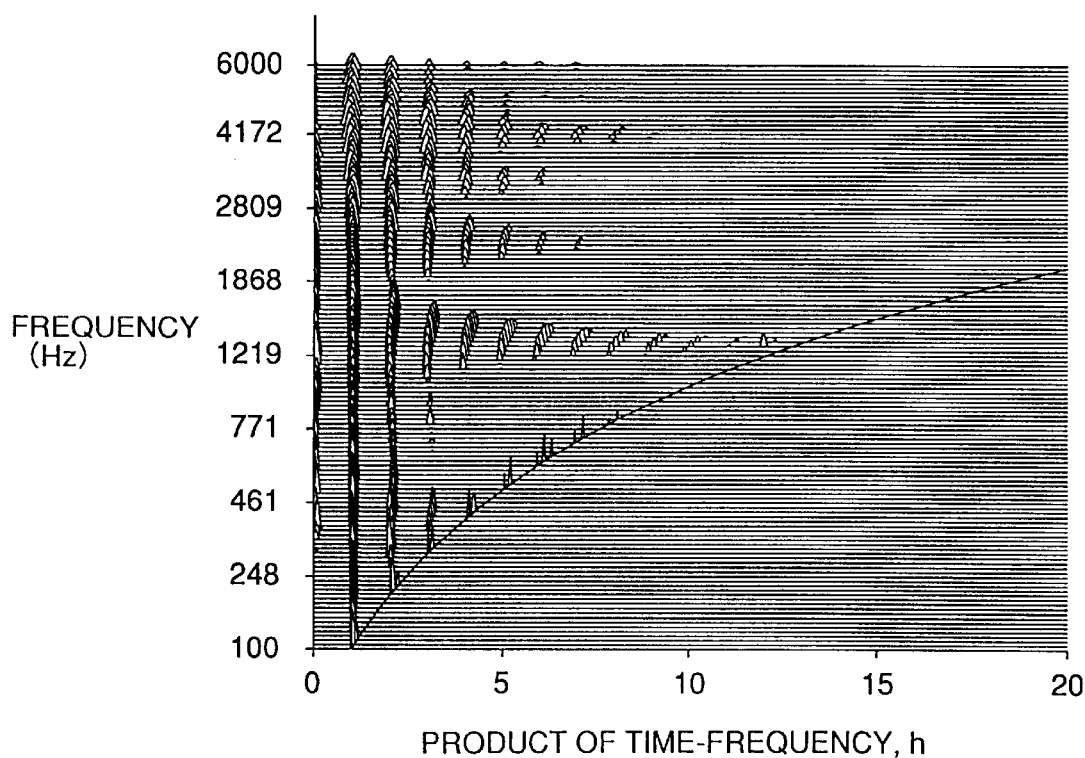
FIG. 37 represents a size-shape image for FIG. 32.

The second pair of 'a's are produced from a vocal tract having the same set of cross-area functions but the length of the vocal tract is shortened by ⅔. The glottal rates are 100 Hz and 160 Hz as in the previous case. FIGS. 18 and 19 are auditory images of these two vowels, respectively. Though the second and third Formants are at the same positions in these two figures, the Formants have moved up to 1500 Hz and 3300 Hz, respectively, by a factor of 3/2 compared to FIGS. 16 and 17, due to the shortening of the vocal tract. The spacing of the main verticals is the same in FIGS. 16 and 18. It is also the same in FIGS. 17 and 19.

The size-shape images of the four vowels are shown in FIGS. 20 to 23 in accordance with the order of the auditory images. In these auditory figures, the distinction between the response to the glottal pulses towards the left of the auditory figures and the Formants towards the right of the auditory figures is enhanced. The pattern of information for the vowels with the original long vocal tract (FIGS. 20 and 21) is essentially the same. The difference is in the position of the right-hand boundary of the auditory figure which is determined by the repetition rate of the wave, and the range is narrower in FIG. 21 for the vowel with the higher pitch. Similarly, the size-shape images for the vowels with the shorter vocal tract (FIGS. 22 and 23) are essentially the same except for the right-hand boundary of the auditory figure.

When the size-shape images of the longer vocal tract and the shorter vocal tract are compared, it can be understood that the response patterns of the four Formants from the bottom are very much similar to each other. The difference is that the patterns of FIGS. 22 and 23 corresponding to the shorter vocal tract are translated to higher frequency as compared with the patterns of FIGS. 20 and 21 corresponding to the longer vocal tract. The fifth and sixth Formants appearing in the size-shape images of FIGS. 20 and 21 corresponding to the longer tract are not observed in FIGS. 22 and 23 as the Formants have been moved by the same amount above the upper limit frequency of 6000 Hz. If the frequency range of the figure is extended upward, these Formants can be seen.

Mellin images of these four vowels are shown in FIGS. 24 to 27 in the same order as the auditory images and the size-shape images. The ordinate of the Mellin image is Mellin coefficient c/2π, which corresponds to spatial frequency in the vertical direction of the size-shape image, and one period in the range of 100 Hz to 6000 Hz corresponds to spatial frequency 1. The value of the Mellin image for a certain value of h is an absolute value obtained after integration of size-shape image in the vertical direction using complex sine wave, and the value becomes larger if it well matches the profile of activities and the spatial frequency.

Referring to FIGS. 20 to 23, up to the integer 5 of the value h in the size-shape image for the vowel 'a', activity is observed at the low spatial frequency where the vocal cord pulse response is not higher than 4 cycles/frequency range. When the value h attains 2 or higher, Formants appear as portions of large values on different bands in the size-shape image. When the value h increases from 2 to 8, the most matching frequency attains a large value of about 6 to 18. When the value h exceeds 8, only one Formant is observed in the size-shape image, and therefore it is understood that a wide strip shaped active range is generated in the Mellin image. This is the most characteristic feature common to FIGS. 20 to 23 representing the Mellin images of four vowels 'a'.

7. Size-Shape Images and Mellin Images of Five Japanese Vowels 'a, i, u, e, o'

A set of five Japanese vowels are analyzed to show how different vowels are represented in the size-shape images and the Mellin images. Using different vocal tract cross section functions (Yang and Kasuya, 1995, above) of the same male speaker and the same vocal tract model. All the vowels are synthesized by driving the vocal cord pulse of 100 Hz, using the vocal tract cross sectional area and vocal tract length as measured. FIGS. 28 to 32 are auditory images, FIGS. 33 to 37 are size-shape images and 38 to 42 are Mellin images of five vowels 'a, e, i, o, u' in this order.

When the auditory image and the size-shape image are compared, it is noticed that the manner of Formant enhancement is varied by the logarithmic transformation of time interval axis. For example, for the vowel 'a' (FIG. 28), the length of continuation of the second Formant resonation is longer by about three times than the fourth Formant. In the size-shape image (FIG. 33), however, the continuation length of the second Formant resonance is comparable to or slightly shorter than the fourth Formant with respect to the axis h of the time frequency product. Without such representation transformation, the role of the higher order Formant is almost invisible even when the Mellin transform is directly performed on the frequency axis. Channel correction in the size-shape image is effective to separate the wavelet impulse response from the response dependent on the nature of the sound source.

Figure 38:
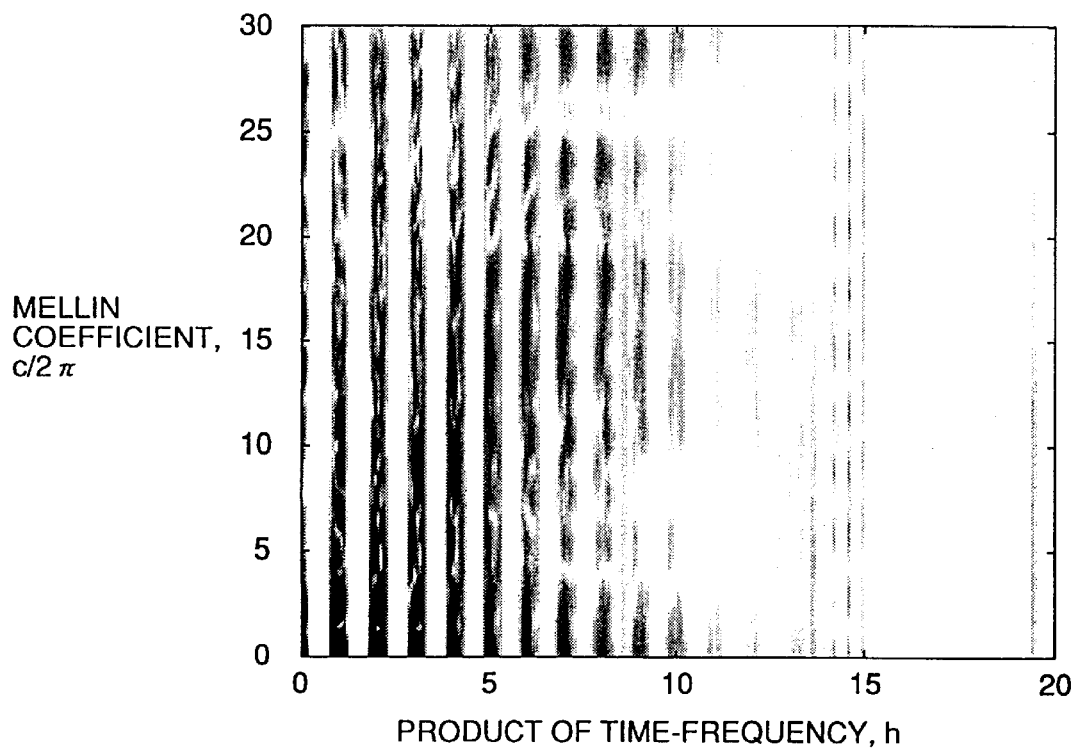
FIG. 38 represents a Mellin image for FIG. 28.
Figure 39:
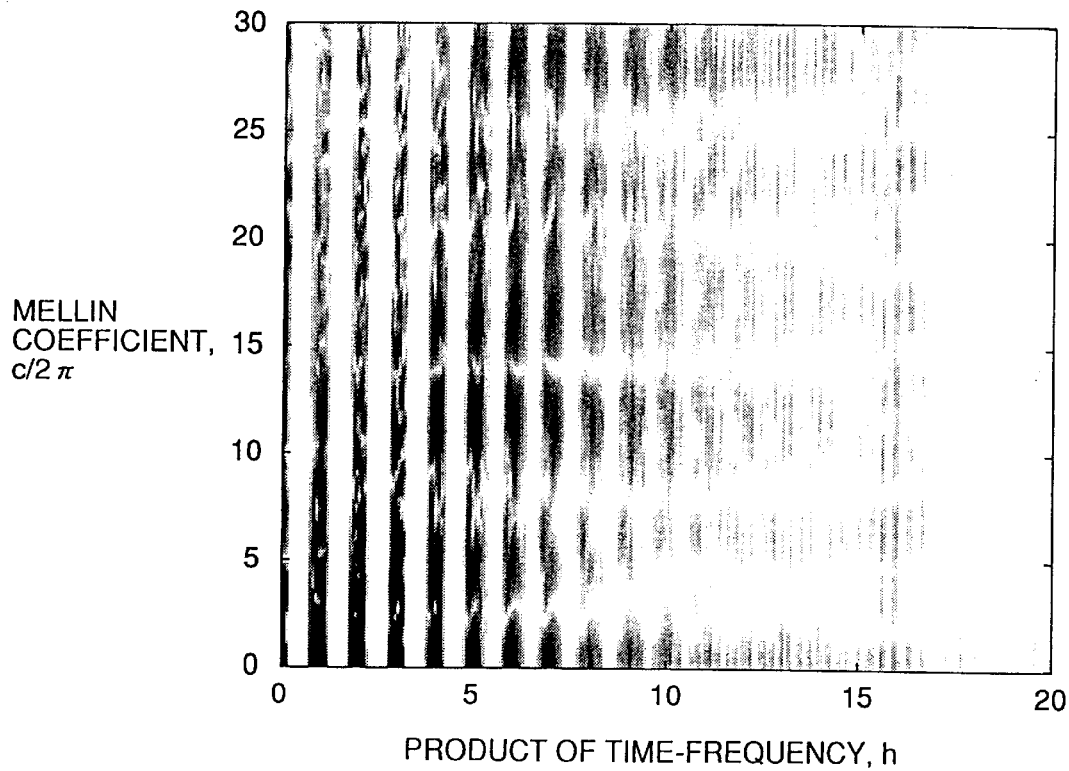
FIG. 39 represents a Mellin image for FIG. 29.

First, the size-shape images and the Mellin images of 'a' (FIGS. 33 and 38) described in the previous section and 'e' (FIGS. 34 and 39) will be compared. The higher order Formants of the size-shape image of 'e' (FIG. 34) are more concentrated than those of 'a' and extends to a higher h value. Therefore, different from the Mellin image of 'a', the Mellin image of 'e' has larger value around the value 4 where spatial frequency c/2π is small and around the values 12 to 16, and the value further extends to higher h.

Figure 40:
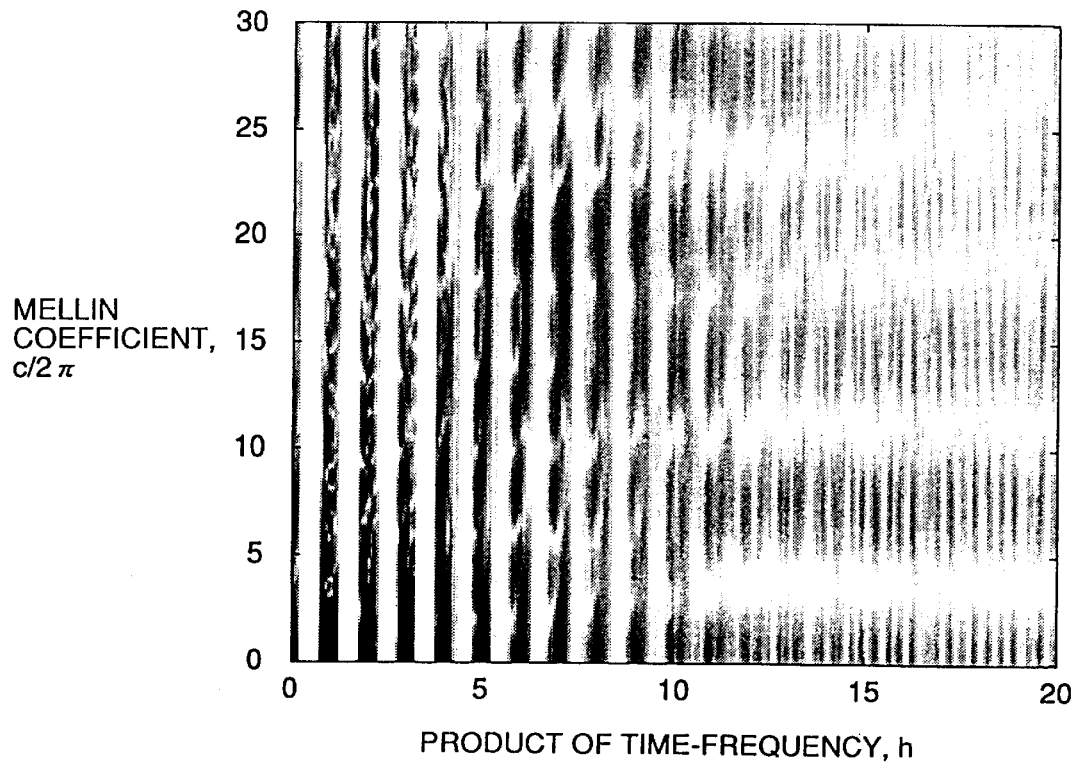
FIG. 40 represents a Mellin image for FIG. 30.

As for the vowels 'i' (FIGS. 35 and 40), the higher order Formants form a group as in 'e' to a higher concentration. Thus, larger value of about 8 of c/2π appears where h is 2 to 6. When the value h is 4 or higher, the active region moves such that c/2π attains 15 to 20. Further, as can be seen from the extension of the resonance range in the size-shape image of 'i', wide strip shaped range extends to a high h value of 15 or higher.

Figure 41:
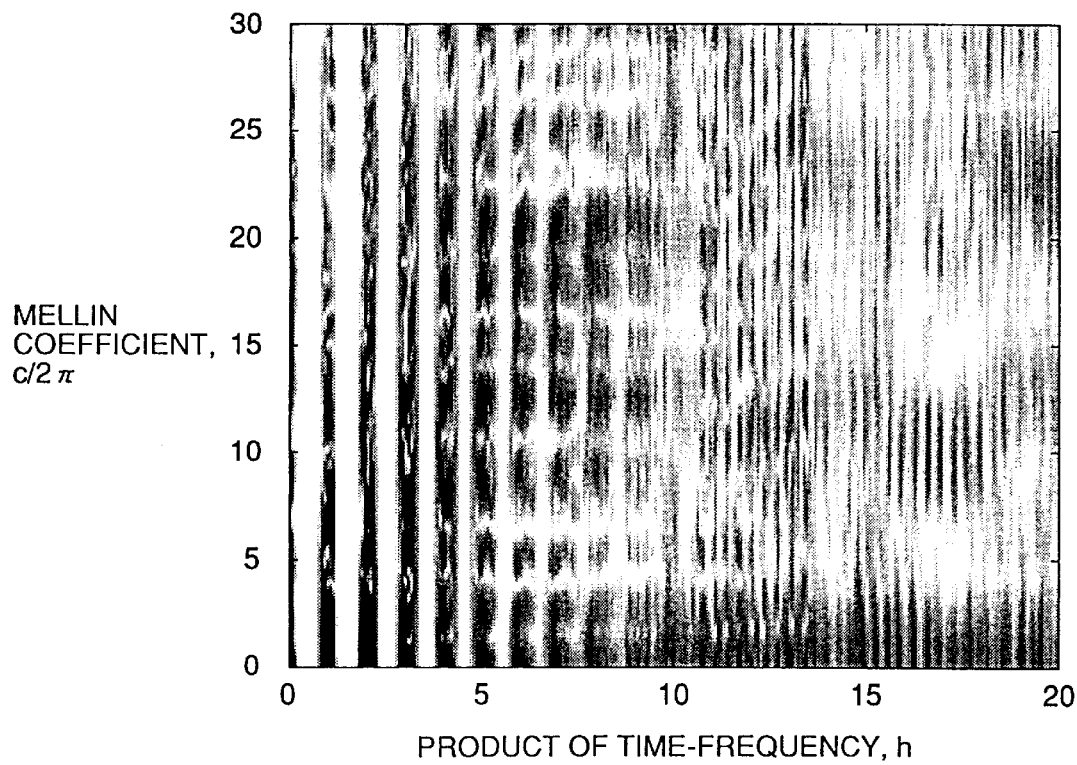
FIG. 41 represents a Mellin image for FIG. 31.

In the size-shape image of 'o' (FIG. 36), there is a large difference in frequency between the set of first and second Formants and the set of remaining three Formants (about 1200 Hz to 2800 Hz). Thus, in the Mellin image of 'o' of FIG. 41, activities where c/2π is 4 or smaller is not large. Activities reflecting the interval between the first and second Formants can be observed where the first Formant exists, that is, in the range where h is up to 5 and c/2π is 5 to 8 in FIG. 36. When the first Formant disappears, activities observed are mainly those reflecting the interval of higher order Formants where c/2π is about 12 to 20. The continuing group of higher order Formants reflects diffuse activities of low spatial frequency where h is high, representing difference from other vowels.

Figure 42:
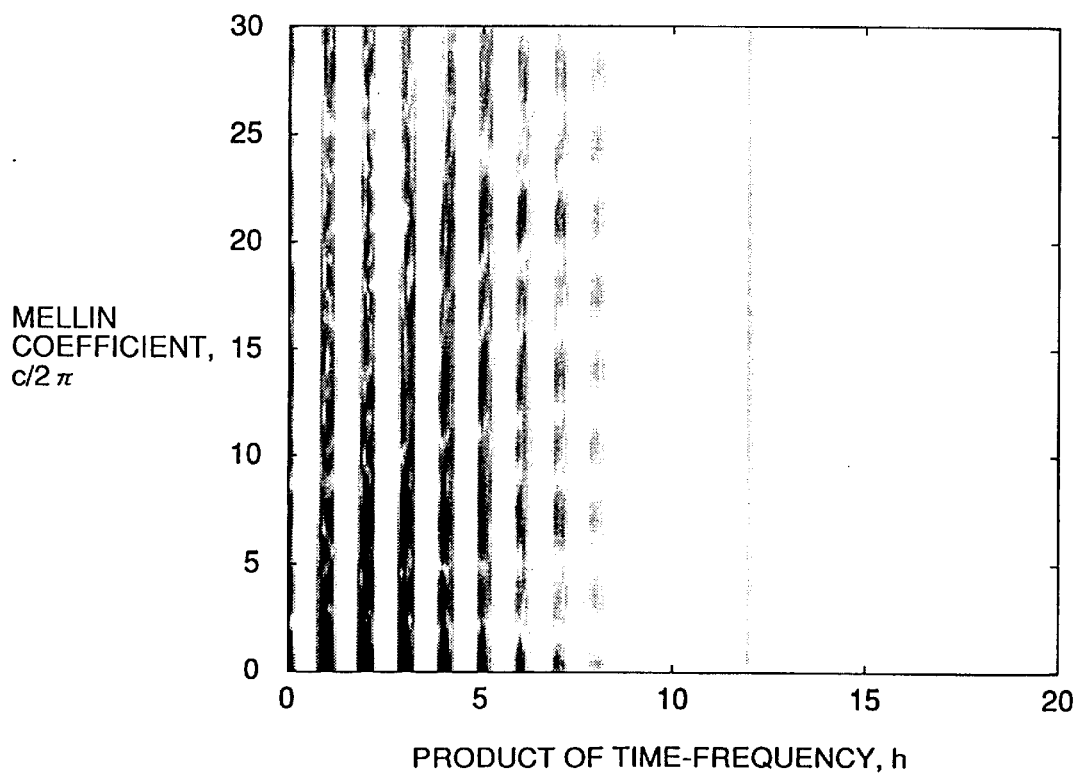
FIG. 42 represents a Mellin image for FIG. 32.

The vowel 'u' (FIGS. 37 and 42) is simpler than other vowels and the resonance bandwidth of the Formants is wide. Therefore, activities do not extend to portions where h has a large value in the size-shape image or Mellin image.

This may be the feature of this vowel. However, a distinguishing feature is lost where h or $c/2\pi$ is large. Where the value h is in the range of 2 to 5, strong activity is observed where $c/2\pi$ is about 7, and when h is 4 to 5, strong activity is observed at about 13. The strip shaped range hardly exist where h is 10 or higher, and compared with other vowels, it is closer to 'a'.

In this manner, the Mellin images of respective vowels are distinctively different, and hence differences can be readily extracted.

8. Speech Recognition Apparatus

The excellent feature of the Mellin image that when the sound source has the same shape the image is almost same and when the sound source is different, the image is distinctively different, has been described above. A speech recognition apparatus of excellent performance can be implemented by using information of such Mellin image. For example, when activity is summed in the direction of the ordinate or the abscissa of the Mellin image, profile of one dimensional vector can be obtained in each direction. By arranging both or either of the vectors on a line can form a one-dimensional vector, the result would be a feature vector representing the feature of an auditory image at a certain time point.

When the feature vectors are calculated at every prescribed interval of the auditory image (for example, about every 5 to 30 ms) and arranged successively on the ordinate in the form of a spectrogram, a representation which may be called a Mellin image spectrogram can be obtained. Together with the size-shape image spectrogram described above, such representation can be directly input to the presently popular speech recognition circuit 19 (FIG. 4). Each profile is a vector representing the sound source information of a time point, and has larger amount of information than the conventional amplitude spectrum. Thus, a speech recognition result 20 superior to that of the prior art can be obtained. This is the most significant advantage of the present invention.

Second Embodiment

Figure 43:
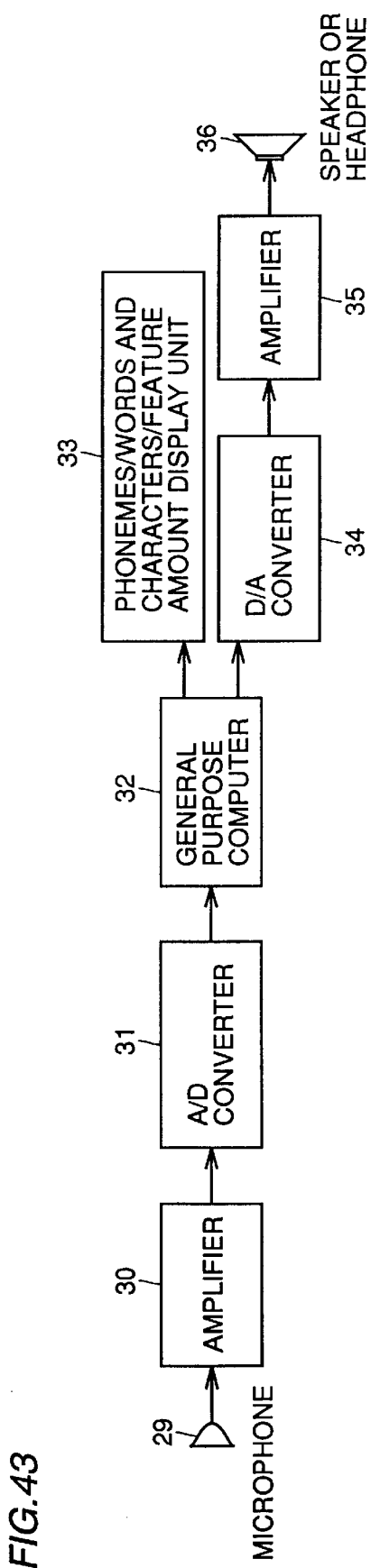
FIG. 43 is a block diagram of a voice training apparatus in accordance with a second embodiment.

FIG. 43 shows an apparatus of an embodiment in which the present invention is applied to a speech training apparatus for learning foreign language or for rehabilitation from some damage, which can be used both by adults and children having different sizes of vocal tracts. The apparatus includes: a microphone 29 for converting an input voice to an electric signal; an amplifier 30 for amplifying the electric signal output from microphone 29; an A/D converter 31 for analog/digital conversion of the electric signal amplified by amplifier 30; a general purpose computer 32 executing a program for performing a speech signal processing, receiving the digital signal output from A/D converter 31; a phonemes/words and characters/features amount display unit 33 for displaying phonemes, words and characters, and amount of features based on the output of general purpose computer 32; a D/A converter 34 for converting a digital audio signal output from general purpose computer 32 to an analog signal; an amplifier 35 for amplifying the audio signal converted to the analog signal by D/A converter 34; and a speaker or a headphone 36 for converting the audio signal applied from amplifier 35 to a sound.

The electric signal representing voice output from microphone 29 is input through amplifier 30 and A/D converter 31 to general purpose computer 32. General purpose computer 32 performs such processing as will be described later on the electric signal, and provides a signal representing the result of the processing to phonemes/words and characters/feature amount display unit 33 as well as to D/A converter 34. The output of general purpose computer 32 is visually presented by the phonemes/words and characters/feature amount display unit 33, and further, presented in auditory manner by speaker or headphone 36 through D/A converter 34 and amplifier 35.

Figure 44:
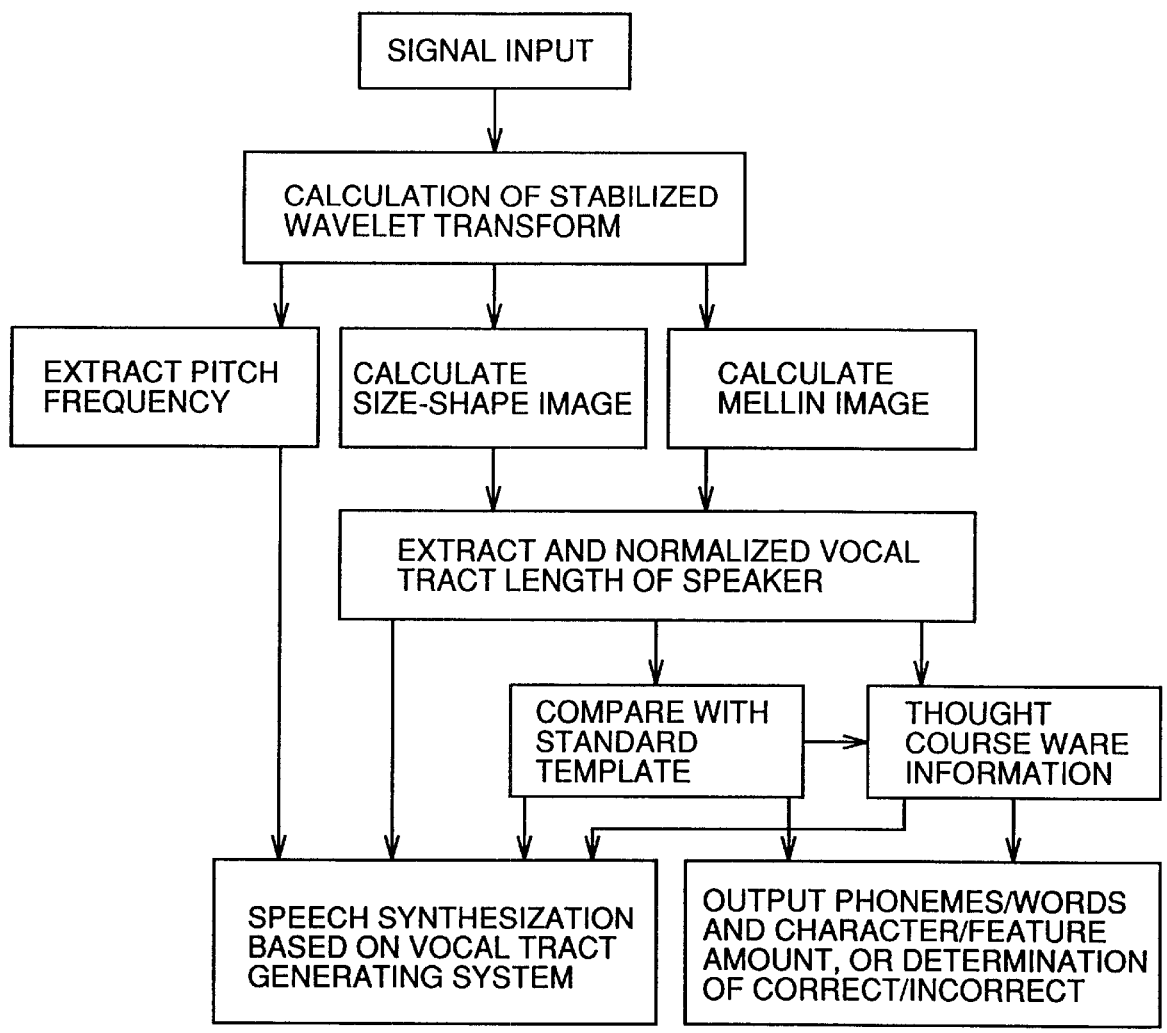
FIG. 44 is a flow chart of the process performed by a general purpose computer in accordance with the second embodiment.

In the general purpose computer, the process in accordance with the flow chart of FIG. 44 takes place. First, the stabilized wavelet transform as described above is performed. Using the resulting information, pitch frequency, size-shape image and Mellin image are calculated in parallel.

In the calculation of size-shape image, the information related to the length of vocal tract of the speaker is calculated, and for the Mellin image, a representation in which the lengths of vocal tract is normalized is calculated. The results are compared with standard templates stored in advance, the phonemes or a series of characters produced by the speaker may be output as visual information, or output as auditory information in the form of a synthesized sound matching the vocal tract length of pitch information of the speaker.

The apparatus which is to be used as a speech training apparatus also provides a visual and auditory presentation from the teaching information such as generation of drills. Therefore, it is not necessary to prepare standard templates for adults and for children separately, nevertheless exact phoneme determination is possible. Therefore, the apparatus is effective for efficient practice.

Third Embodiment

Figure 45:
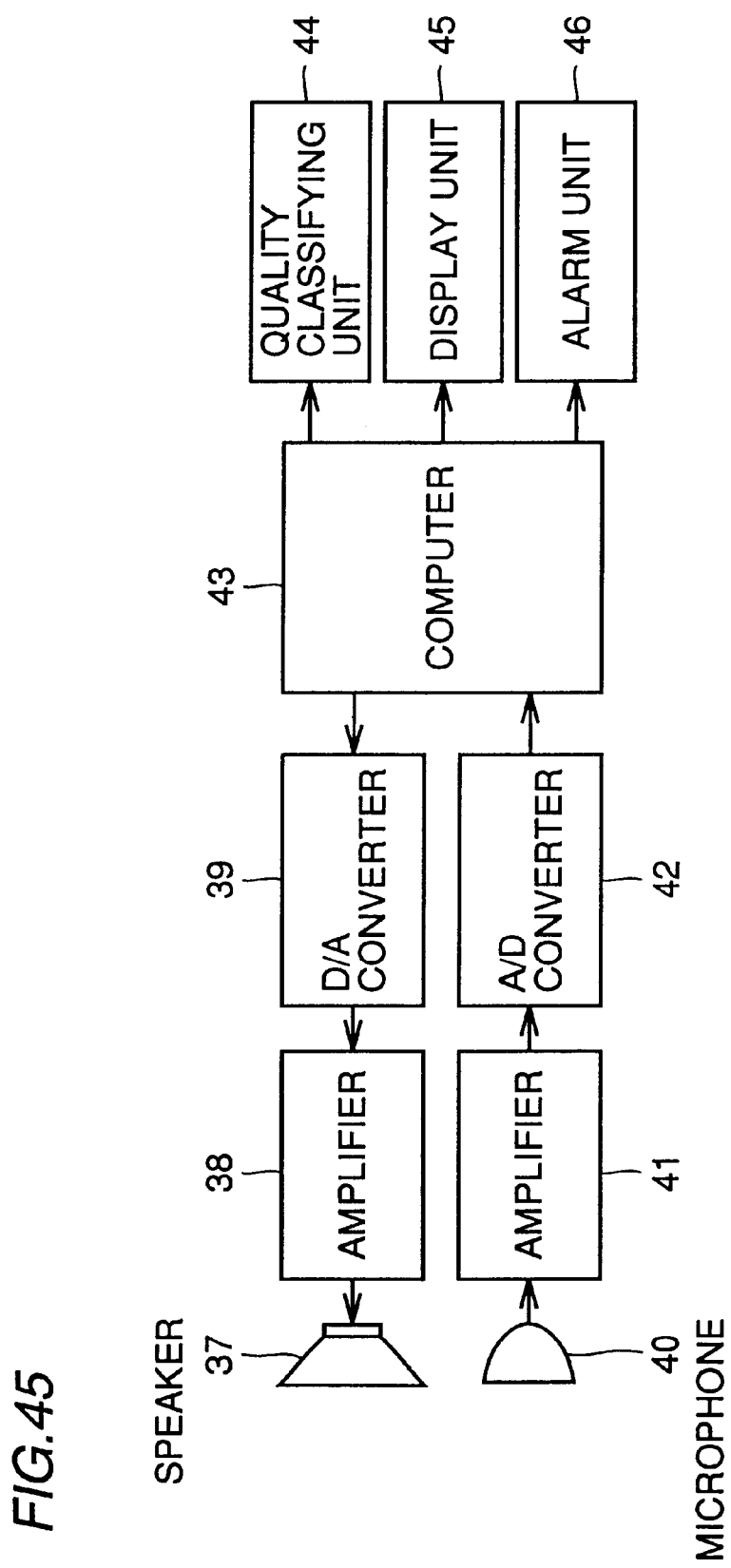
FIG. 45 is a block diagram of a product quality classifying apparatus of a third embodiment and a soner system of a fourth embodiment.

FIG. 45 shows an embodiment of the present invention in which the present invention is applied to an automatic selector based on quality of vegetables, fruits and foods of different sizes. The automatic selector includes: a speaker for emitting sound wave to the object to be selected; an amplifier 38 and a D/A converter 39; a microphone 40 for receiving the sound wave returning from the object of selection; an amplifier 41 for amplifying an output of microphone 40; an A/D converter 42 for converting an output of amplifier 41 to a digital signal; a computer 43 for performing the process, which will be described later, on the signal applied from A/D converter 42; a quality classifier 44 for selecting the object in accordance with a control signal output from computer 43; a display unit 45 for displaying the information output from computer 43; and an alarm unit 46 for giving an alarm in accordance with the output of computer 43.

Figure 46:
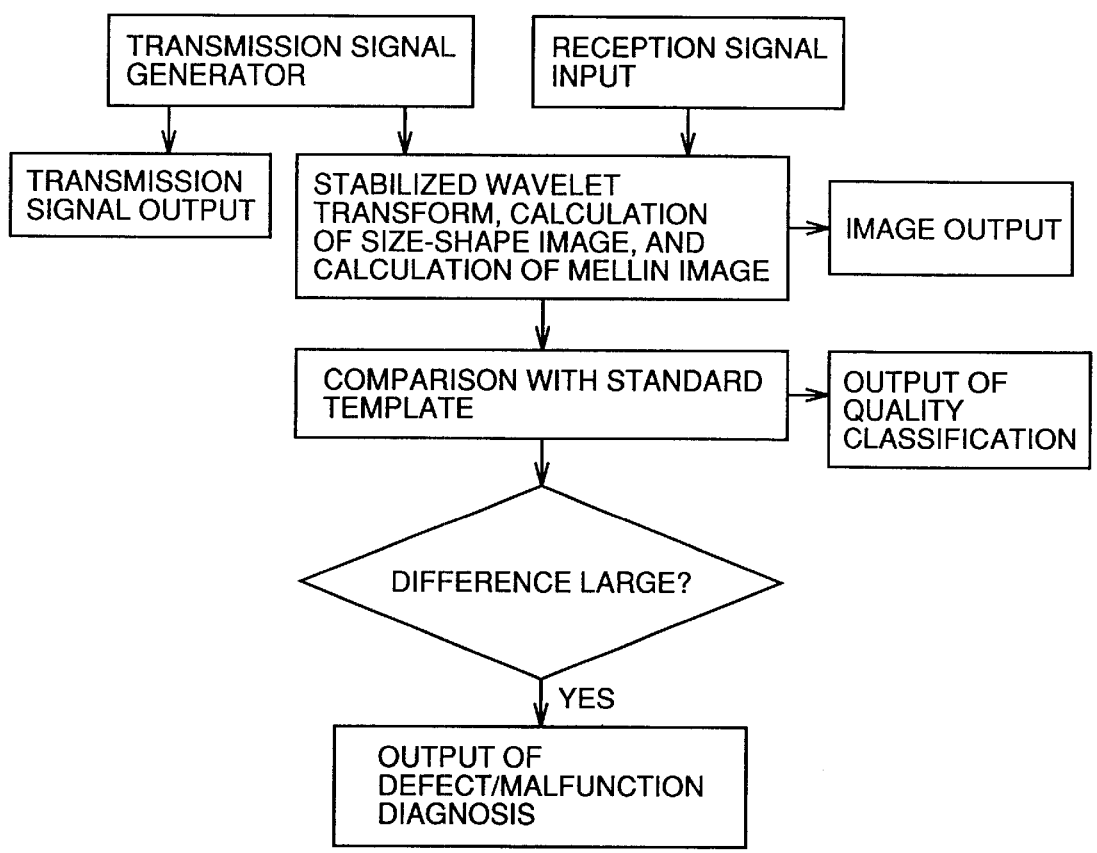
FIG. 46 is a flow chart of the process performed by the computer of the third and fourth embodiments.

The process performed by computer 43 is as shown in FIG. 46. The computer generates a transmission signal for the speech to be emitted to the object from speaker 37, and applies the signal to D/A converter 39. Computer 43 executes a stabilized wavelet transform and calculations of size-shape image and Mellin image based on an output signal generation parameter, and on the received signal applied to computer 43 which is reflected from the object in response to the speech generated from speaker 37, passed through microphone 40 and amplifier 41 and converted to an electric signal by A/D converter 42, so as to provide a representation related to the internal state of the object not dependent on the size of the object. Computer 43 compares the resulting representation with a standard template stored in advance, and determines quality and class of the object, and outputs the result of determination. When the difference between the output and the standard template is larger than a prescribed value, computer 43 determines that the object is defective, and hence provides an output of the diagnosis result through display unit 45 and alarm unit 46.

By the apparatus of the embodiment, effective selection dependent not on the variety of sizes of the object but only on the internal state of the object becomes possible. The system is applicable not only to the objects as listed above but also to defect determination of products such as iron and metal products, porcelain and so on as well as bodily diagnosis.

Fourth Embodiment

The apparatus of the fourth embodiment basically has the same structure as the third embodiment, and further includes display unit 45 (monitor or the like) for representing the images calculated by the computer. By the display unit 45, means of physical presentation of the representation in which the size is normalized is provided, and thus it becomes possible for an operator to directly determine the characteristic of the object. When a unit 46 for making defect determination and giving an alarm is provided, a defect of an apparatus may be automatically diagnosed. Thus, the present invention can further be developed from the third embodiment and becomes applicable generally to soner signal processing.

There are various other applications of the present invention. As a representation not dependent on the size of the object is obtained by the present invention, when the present invention is applied to the field of architecture, acoustic characteristic of a music hall can be predicted when measurement is made in a miniature model of the music hall. Diagnosis of aging of a building using sound wave is also possible. Further, the present invention is also applicable to under water analysis of soner signals.

Fifth Embodiment

Figure 47:
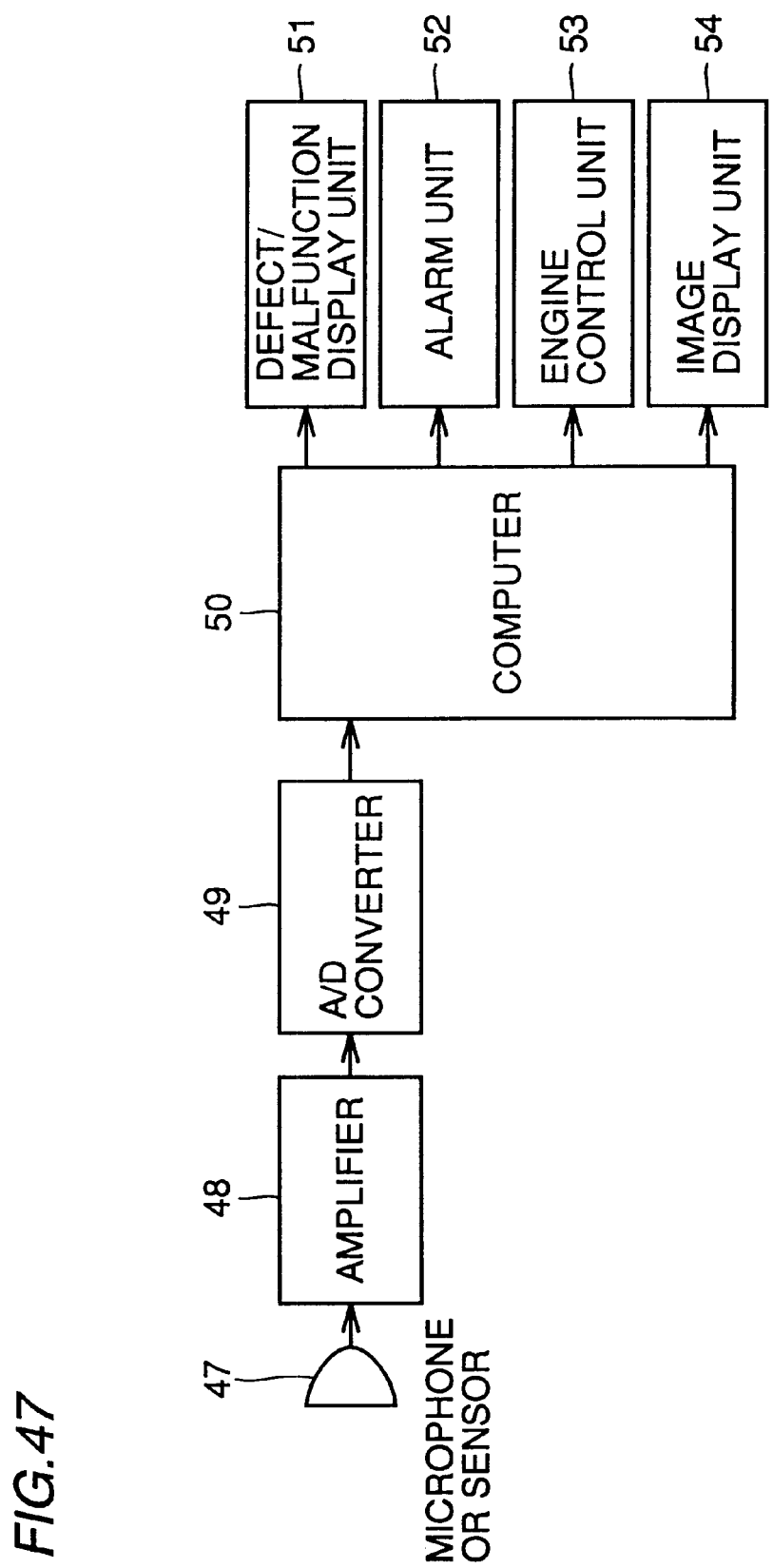
FIG. 47 is a block diagram of an engine malfunction diagnosis apparatus in accordance with a fifth embodiment.

FIG. 47 shows a fifth embodiment of the present invention applied to malfunction diagnosis of combustion engines of different sizes. A vibration sensor attached to a combustion engine of a car, a ship or the like provides an output signal of a microphone 47 as an input to computer 50, through an amplifier 41 and A/D converter 42. A defect or malfunction is determined by computer 50, and a display unit 51, an alarm unit 52 and an engine control unit 53 are controlled by the information. A unit 54 for direct image output may be provided.

Figure 48:
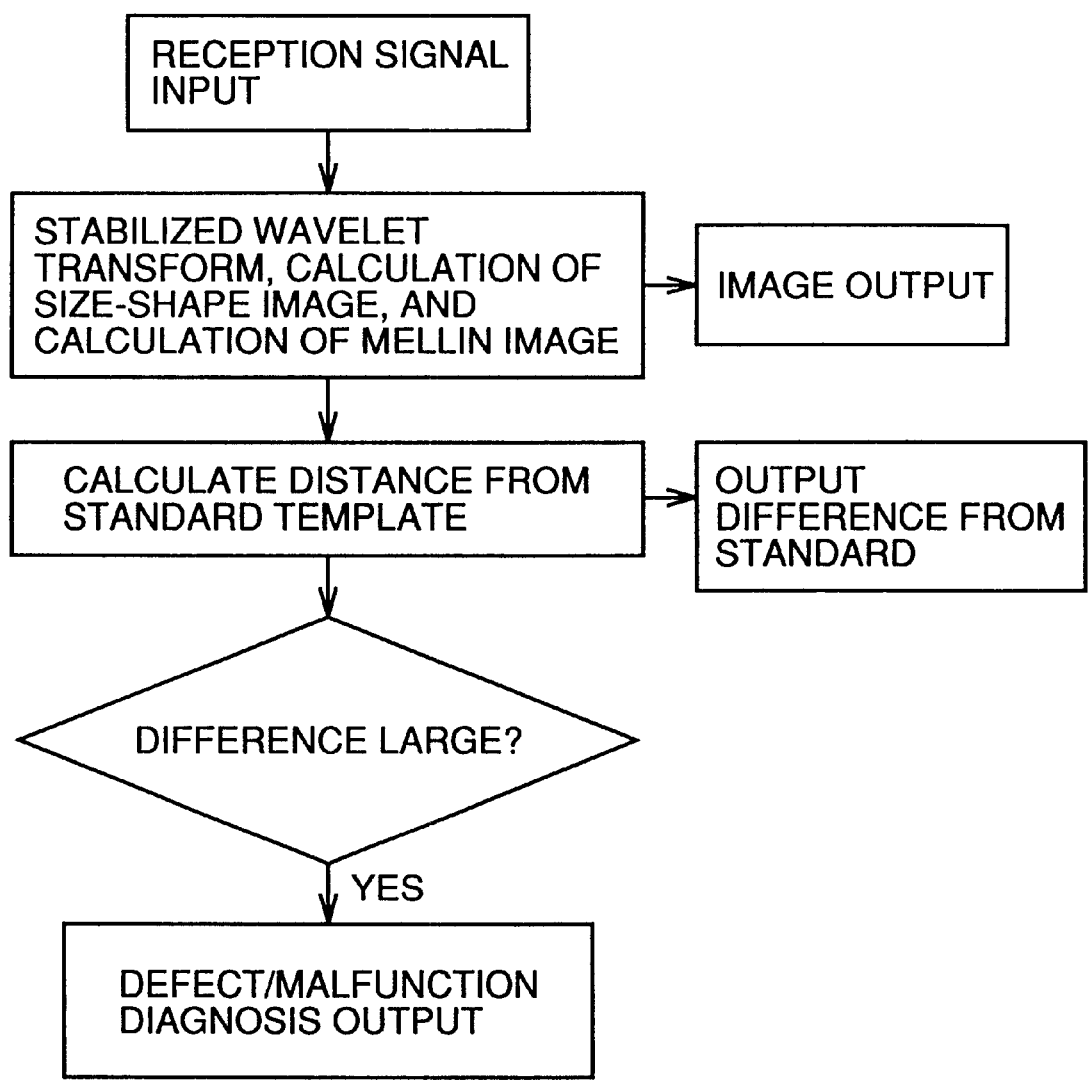
FIG. 48 is a flow chart of the process performed by the computer of the fifth embodiment.

In the computer 50, the process shown in FIG. 48 is performed. Referring to FIG. 48, based on the input pseudo periodic signal, stabilized wavelet transform is performed, and based on the results, size-shape image and Mellin image are calculated. By comparing the images with the standard template stored in advance, the state of the engine is diagnosed and the result is output. At this time, if the apparatus is adapted to provide a binary signal representing presence/absence of a defect as a result, a defect/malfunction display unit or an alarm unit may be controlled by the signal. Alternatively, a distance measure from the standard pattern may be determined in advance, and the distance representing how similar may be calculated and output as a continuous amount. This information would represent the degree of abnormality of engine rotation, for example, and therefore, the information may be used as a signal for controlling the engine control unit. If the image is directly output, an operator can make visual malfunction determination.

Even when the shape of engines are the same, displacements differ as needed. Using the present invention, it becomes possible to determine the state of engines when the engines are of the same family and have the same shape, even if the sizes are different. Therefore, the apparatus for determining engine state in accordance with the present invention enables effective determination of common cause of malfunction, for example, of engines of various sizes.

When an output from a sensor attached to a building is used, for example, the present invention is also effectively used for diagnosing defects of a building. When a seismic wave signal is used, common feature not dependent on the magnitude of the epicenter can be found. According to the present invention, any signal from a signal's source may be used as an input, no matter whether it is artificial or natural, or no matter what physical system is used for measurement of the signal. For example, when a biotic signal such as cardial pulse sound or brain wave signal is picked up, a representation not dependent on the size of the body or head can be obtained, and hence better result of diagnosis may be obtained.

As described above, by the stabilized wavelet-Mellin transform in accordance with the present invention, a signal representation basically independent of the physical size of the sound source (in the case of a speech, representation in which different vocal tract lengths of male, female and child speaker are normalized) or a representation in which self similarity (fractal measure) is normalized is obtained if the data is time sequential data. More specifically, for an event in which a portion constituting a large part has a common structure as the original portion, the same representation can be obtained both for the large portion and the small portion constituting the large portion. This has been difficult in the conventional self regression model or spectrum analysis. Therefore, signal processing overcoming the limit of the conventional time sequential data processing becomes possible. Further, in a sense, it is possible to separate elements which cannot be normalized in this process, and therefore the present invention can effectively be used for individual recognition utilizing speech, for example. In this manner, the present invention is widely applicable to signal processing which requires normalization of the physical size of the sound source or normalization of self similarity.

Although the present invention has been described and illustrated in detail, it is clearly understood that the same is by way of illustration and example only and is not to be taken by way of limitation, the spirit and scope of the present invention being limited only by the terms of the appended claims.

APPENDIX A

The Mellin Transform

The Mellin transform (Titchmarsh, 1948) of a signal, $s(t)(t > 0)$, is defined as $$S(p) = \int_0^\infty s(t) t^{p-1} \, dt, \tag{A1}$$

where p is a complex argument. One of the important properties is $$\text{if } s(t) \Rightarrow S(p), \text{ then } s(at) \Rightarrow a^{-p} S(p), \tag{A2}$$

where the arrow ($\Rightarrow$) indicates "is transformed into" and a is a real dilation constant. That is, the distribution $S(p)$ is just multiplied with a constant $a^{-p}$ when the function $s(t)$ is scaled in time. If p is denoted by $p = p_r + jp_i$, $$a^{-p} = a^{-(p_r + jp_i)} = a^{-p_r} a^{-jp_i} = a^{-p_r} \exp(-jp_i \ln a) \tag{A3}$$

where $j = \sqrt{-1}$, and exp and ln are the exponential and natural logarithmic operators. Since $|a^{-p} S(p)| = |a^{-p_r}| \cdot |S(p)|$, the absolute distribution $|S(p)|$ is not affected by a scaling of the original, except for the constant that specifies the scale of the current signal; nor is it affected when the distribution is normalized.

APPENDIX B

Stabilized Wavelet-Mellin Transform

Signal: s(t)
Periodicity of signal:
$$s(t - kt_p) = s(t), \{t > 0, k = 1, 2, \ldots,\} \quad (B1)$$
Wavelet kernel:
$$g(t) = \gamma(t)\exp(j2\pi f_b t + jc_1 \ln t + j\phi), \{t > 0\} \quad (B2)$$
Wavelet filter:
$$g_{IV}(\alpha f_b, t) = g(\alpha t) = \gamma(\alpha t)\exp(j2\pi f_b \alpha t + jc_1 \ln \alpha t + j\phi) = \gamma(\alpha t)\exp(j2\pi\alpha f_b t + jc_1 \ln t + j\phi_\alpha), \{\forall \alpha | \alpha_{min} \leq \alpha \leq \alpha_{max}\} \quad (B3)$$
$$\phi_\alpha = \phi + c_1 \ln \alpha$$
Wavelet transform:
$$S_W(\alpha f_b, t) = W[s(t)] = \int_0^\infty g_W(\alpha f_b, \tau_1) s(t - \tau_1) d\tau_1 \quad (B4)$$

Compression:
$$S_W(\alpha f_b, t) = \log|S_W(\alpha f_b, t)| \cdot \max\{S_W(\alpha f_b, t), 0\} \quad (B5)$$
$$S_W(\alpha f_b, t) = \log|S_W(\alpha f_b, t)| \cdot \text{sgn}\{S_W(\alpha f_b, t)\}$$
$$S_W(\alpha f_b, t) = |S_W(\alpha f_b, t)|^\beta \cdot \max\{S_W(\alpha f_b, t), 0\}, \{\beta | 0 < \beta \leq 1\} \quad (B6)$$
$$S_W(\alpha f_b, t) = |S_W(\alpha f_b, t)|^\beta \cdot \text{sgn}\{S_W(\alpha f_b, t)\}, \{\beta | 0 < \beta \leq 1\}$$
Stabilized Wavelet Transform:
$$A_I(\alpha f_b, \tau) = \sum_{k=0}^\infty S_W(\alpha f_b, \tau + kt_p) e^{-\xi\tau} e^{-k\eta t_p}, \{\forall \tau | \tau_{min} \leq \tau \leq \tau_{max}\} \quad (B7)$$

Source Figure:
$$A_F(\alpha f_b, \tau) = (A_I(\alpha f_b, \tau_2), \quad (B8)$$
$$\{\exists k, \tau, \tau_2 | kt_p \leq \tau_2 \leq (k+1)t_p, 0 \leq \tau \leq t_p\}$$
Constraint for integration:
$$\alpha f_r \cdot \tau = h \quad (B9)$$
Mellin transform:
$$M_I(h, p) = M[A_F(h/\tau, \tau)] = \int_0^{t_p} A_F(h/\tau, \tau) \tau^{p-1} d\tau \quad (B10)$$
$$= \int_0^{t_p} A_F(h/\tau, \tau) e^{(p-1)\ln r} d\tau$$
$$p = -jc + \left(\mu + \frac{1}{2}\right) \quad (B11)$$
$$M_I(h, c) = \int_0^{t_p} A_F(h/\tau, \tau) e^{(-jc+\mu-\frac{1}{2})\ln r} d\tau \quad (B12)$$

APPENDIX C

Stabilized Wavelet-Mellin Transform based on Auditory Image Model

Auditory filter:
$$g_c(t) = \alpha t^{n-1} \exp(-2\pi b ERB(f_r)t)\exp(j2\pi f_r t + jc_1 \ln t + j\phi), \{t > 0\} \quad (C1)$$
$$ERB(f_r) = 24.7 + 0.108 f_r$$
$$f_r \approx \alpha f_b \{f_r | f_r > 500 \text{ Hz}\} \quad (C2)$$
$$g_c(f_r, t) \approx g_W(\alpha f_b, t), \{\forall \alpha | \alpha_{min} \leq \alpha \leq \alpha_{max}\} \quad (C3)$$
Auditory wavelet transform:
$$S_W(\alpha f_b, t) = W[s(t)] = \int_0^\infty g_W(\alpha f_b, \tau_1) s(t - \tau_1) d\tau_1 \quad (C4)$$
Adaptation/Compression:
$$S_W(\alpha f_b, t) \approx \log|S_W(\alpha f_b, t)| \cdot \max\{S_W(\alpha f_b, t), 0\} \quad (C5)$$
$$S_W(\alpha f_b, t) \approx |S_W(\alpha f_b, t)|^\beta \cdot \max\{S_W(\alpha f_b, t), 0\}, \{\beta | 0 < \beta \leq 1\} \quad (C6)$$
Stabilized Auditory Image:
$$A_I(\alpha f_b, \tau) = \sum_{k=0}^\infty S_W(\alpha f_b, \tau + kt_p) e^{-\xi\tau} e^{-k\eta t_p}, \{\forall \tau | \tau_{min} \leq \tau \leq \tau_{max}\} \quad (C7)$$
Filter alignment:
$$A_{IA}(\alpha f_b, \tau) = A_I(\alpha f_b, \tau_2 - k/\alpha f_b), \{\exists k | k = 0, 1, 2, \ldots\} \quad (C8)$$
Auditory Figure (AF):
$$A_F(\alpha f_b, \tau) = A_{IA}(\alpha f_b, \tau_2), \quad (C9)$$
$$\{\exists k, \tau, \tau_2 | kt_p \leq \tau_2 \leq (k+1)t_p, 0 \leq \tau \leq t_p\}$$
AF with log time-interval:
$$A_{FL}(\alpha f_b, \ln \tau) = A_F(\alpha f_b, \tau) \quad (C10)$$

APPENDIX C-continued

Stabilized Wavelet-Mellin Transform based on Auditory Image Model

Impulse alignment in Log AF & Size Shape Image(SSI):
$$A_{SSI}(\alpha f_b, h) = A_{FL}(\alpha f_b, \ln \tau + \ln \alpha f_b) \quad (C11)$$
Impulse Profile of SSI:
$$P_{AI}(h) = \int_{\alpha_{min}}^{\alpha_{max}} W(\alpha f_b, h) \cdot A_{SSI}(\alpha f_b, h) d\alpha \quad (C12)$$
Spectral Profile of SSI:
$$P_{AS}(\alpha f_b) = \int_{h_{min}}^{h_{max}} W(\alpha f_b, h) \cdot A_{SSI}(\alpha f_b, h) dh \quad (C13)$$
Sinusoidal weighting along log-frequency axis:
$$W(\alpha f_b, h, c) = e^{\{jc-(\mu-\frac{1}{2})\}\ln \alpha f_b} \quad (C14)$$
Mellin Image:
$$M_I(h, c) = \int_{\alpha_{min} f_b}^{\alpha_{max} f_b} A_{SSI}(\alpha f_b, h) e^{\{jc-(\mu-\frac{1}{2})\}\ln \alpha f_b} d(\alpha f_b) \quad (C15)$$
Showing Equivalence:
Constraint from Eq. (B9): $\ln \alpha f_b + \ln \tau = \ln h$ (C16)
$$\frac{1}{\alpha}\frac{d\alpha}{d\tau} = -\frac{1}{\tau} \quad (C17)$$
$$M_I(h, c) = \int_{\alpha_{min}}^{\alpha_{max}} A_{SSI}(\alpha f_b, h) e^{\{jc-(\mu-\frac{1}{2})\}\ln \alpha f_b} f_b d\alpha \quad (C18)$$
$$= \int_{\alpha_{min}}^{\alpha_{max}} A_{SSI}(\alpha f_b, h) e^{\{jc-(\mu+\frac{1}{2})\}\ln \alpha f_b} (1/\alpha) d\alpha$$
$$= \int_0^{t_p} A_F(\alpha f_b, \tau) e^{\{jc-(\mu+\frac{1}{2})\}(\ln h - \ln r)} (-1/\tau) d\tau$$
$$= \left\{-e^{\{jc-(\mu+\frac{1}{2})\}\ln h}\right\} \int_0^{t_p} A_F(h/\tau, \tau) e^{\{-jc+(\mu-\frac{1}{2})\}\ln r} d\tau$$

What is claimed is:

1. A machine-implemented method of signal processing, comprising the steps of:
   receiving an input signal representing a source of vibration;
   wavelet-transformingthe input signal; and
   extracting features of said input signal by performing a Mellin transform on the output of said wavelet-transforming step in synchrony with periodicity or pseudo-periodicity of said input signal.

2. The machine-implemented method of signal processing according to claim 1, wherein said feature extraction step includes the steps of:
   transforming an expression corresponding to a running spectrum obtained by said wavelet transform step to a time-interval/logarithmic-frequencyrepresentation by stabilizing in time in synchrony with the input signal while maintaining the precise structure of the response waveform; and
   performing a process corresponding to the Mellin transform on said time-interval/logarithmic-frequencyrepresentation, along an ordinate or abscissa where the value of a product or ratio of the time interval and the frequency is constant.

3. The machine-implemented method of signal processing according to claim 2, further comprising the step of applying an output of the frequency analysis of a signal converted to a computer processable format taking into consideration auditory features, to said step of the Mellin transform.

4. The machine-implementedmethod of signal processing according to claim 1, further comprising the step of applying the output of a frequency analysis of a signal converted to a computer processable format taking into consideration auditory features, to said step of the Mellin transform.

5. The machine-implemented method of signal processing according to claim 1, wherein said features represent properties of the input signal relating to the source of vibration.

6. The machine-implemented method of signal processing according to claim 1, wherein the input signal corresponds at least in part to a voice of a person.

7. The machine-implementedmethod of signal processing according to claim 1, wherein the steps of wavelet-transforming and extracting features are each performed using a computer.

8. A signal processing apparatus comprising:
wavelet transform means for wavelet-transforming an input signal representing a source of vibration which has been converted to a computer processable predetermined format; and
feature extraction means for extracting signal features by Mellin-transforming the output of said wavelet transform in synchrony with said input signal.

9. The signal processing apparatus according to claim 8, wherein
said feature extracting means includes
means for transforming a representation corresponding to a running spectrum obtained by said wavelet transform means to a time-interval/logarithmic-frequency representation by stabilizing in time in synchrony with the input signal, while maintaining the precise structure of a the waveform, and
means for performing a process corresponding to the Mellin transform on said time-interval/logarithmic-frequencyrepresentation along a line on which a value of a product or a ratio between time interval and frequency is constant.

10. The signal processing apparatus according to claim 9, further comprising means for applying an output of the frequency analysis of the signal which has been converted to computer processable format taking into consideration auditory features, to said Mellin transform.

11. The signal processing apparatus according to claim 8, further comprising means for applying an output of the frequency analysis of the signal which has been converted to computer processable format taking into consideration auditory features, to said Mellin transform.

12. A signal processing apparatus, comprising:
means for obtaining, in a stabilized time-interval/ logarithmic-frequency representation with the origin specified by an input signal representing a source of vibration which has been converted to a computer processable format, a logarithmic time-interval/ logarithmic-frequencyrepresentation with the time interval axis being subjected to logarithmic transformation; and
means for transforming said logarithmic time-interval/ logarithmic-frequency representation to a new representation having the product of time interval and frequency as the abscissa and logarithmic frequency as the ordinate, and for performing integral transformation on the representation along the ordinate or the abscissa to extract features of the vibration.

13. The signal processing apparatus according to claim 12, further comprising means for representing a representation space obtained by said integral transform as a time sequence of a representation vector at a certain time point.

14. The signal processing apparatus according to claim 13, further comprising means for applying the output of a frequency analysis of the signal which has been converted to computer processable format taking into consideration auditory features, to said Mellin transform.

15. A machine-implementedmethod of signal processing, comprising the steps of:
receiving an input signal representing a source of vibration;
obtaining, in a stabilized time-interval/logarithmic-frequencyrepresentation with the origin specified by periodicity or pseudo-periodicity of the input signal, a logarithmic time-interval/logarithmic-frequencyrepresentation with time interval axis being subjected to logarithmic transform; and
converting said logarithmic time-interval/logarithmic-frequencyrepresentation to a new representation having the product of time interval and frequency as the abscissa and logarithmic frequency as the ordinate, and performing an integral transform on the representation along the ordinate or abscissa to extract features of the vibration.

16. The machine-implemented method of signal processing according to claim 15, further comprising the step of representing a representation space obtained by said integral transform as a time sequence of a representation vector of a certain time point.

17. The machine-implementedmethod of signal processing according to claim 16, further comprising the step of applying the output of a frequency analysis of a signal converted to a computer processable format taking into consideration auditory features, to said step of the Mellin transform.

18. The machine-implementedmethod of signal processing according to claim 15, wherein the input signal corresponds at least in part to a voice of a person.

19. The machine-implemented method of signal processing according to claim 15, wherein the features represent properties of the input signal relating to the source of vibration.

20. The machine-implementedmethod of signal processing according to claim 15, wherein the steps of obtaining and converting are each performed using a computer.

* * * * *

UNITED STATES PATENT AND TRADEMARK OFFICE
CERTIFICATE OF CORRECTION

PATENT NO. : 6,675,140 B1
DATED : January 6, 2004
INVENTOR(S) : Toshio Irino et al.

It is certified that error appears in the above-identified patent and that said Letters Patent is hereby corrected as shown below:

Title page,
Item [73], Assignee, add -- Medical Research Council, 20, Park Crescent, London, W1N4A1, United Kingdom --

Signed and Sealed this

First Day of June, 2004

JON W. DUDAS
*Acting Director of the United States Patent and Trademark Office*